(12) United States Patent
Inuma et al.

(10) Patent No.: US 6,549,237 B1
(45) Date of Patent: Apr. 15, 2003

(54) IMAGE SENSING APPARATUS CAPABLE OF SEEING IMAGE DISPLAYED ON DISPLAY DEVICE THROUGH FINDER

(75) Inventors: Mutsumi Inuma, Yokohama (JP); Mikihiro Fujimoto, Yokohama (JP); Shuichi Idera, Kawasaki (JP); Kyoji Tamura, Yokohama (JP); Toshiyuki Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/118,162

(22) Filed: Jul. 16, 1998

(30) Foreign Application Priority Data

| Jul. 29, 1997 | (JP) | ............................................ 9-203214 |
| Jul. 29, 1997 | (JP) | ............................................ 9-203215 |
| Nov. 10, 1997 | (JP) | ............................................ 9-321960 |

(51) Int. Cl.$^7$ .......................... H04N 5/222; H04N 5/225
(52) U.S. Cl. .............................. 348/333.06; 348/333.03; 348/333.09; 348/340; 348/341; 348/375; 348/376; 396/374; 396/383

(58) Field of Search ..................... 348/207.99, 333.01, 348/333.06, 333.07, 333.08, 333.09, 333.1, 333.12, 335, 336, 337, 340, 341, 373–376; 358/906, 909.1; 396/373, 374, 378, 381, 383–386; H04N 5/222, 5/225

(56) References Cited

U.S. PATENT DOCUMENTS

| 5,099,265 A | * | 3/1992 | Lee ............................ 396/374 |
| 5,161,025 A | * | 11/1992 | Nakao .................... 348/333.05 |
| 5,300,976 A | * | 4/1994 | Lim ........................ 348/333.1 |
| 5,315,334 A | * | 5/1994 | Inana ........................ 348/373 |
| 5,739,859 A | * | 4/1998 | Hattori ................. 348/333.06 |

* cited by examiner

Primary Examiner—Ngoc-Yen Vu
(74) Attorney, Agent, or Firm—Morgan & Finnegan, LLP

(57) ABSTRACT

An image sensing apparatus having a display device mounted rotatable about an axis on a side of the image sensing apparatus for displaying a sensed image. When the display device is folded up by the side of the image sensing apparatus, a mirror reflects an image displayed on the display device toward a finder, so that the displayed image can be seen though the finder.

22 Claims, 45 Drawing Sheets

FIG. 17
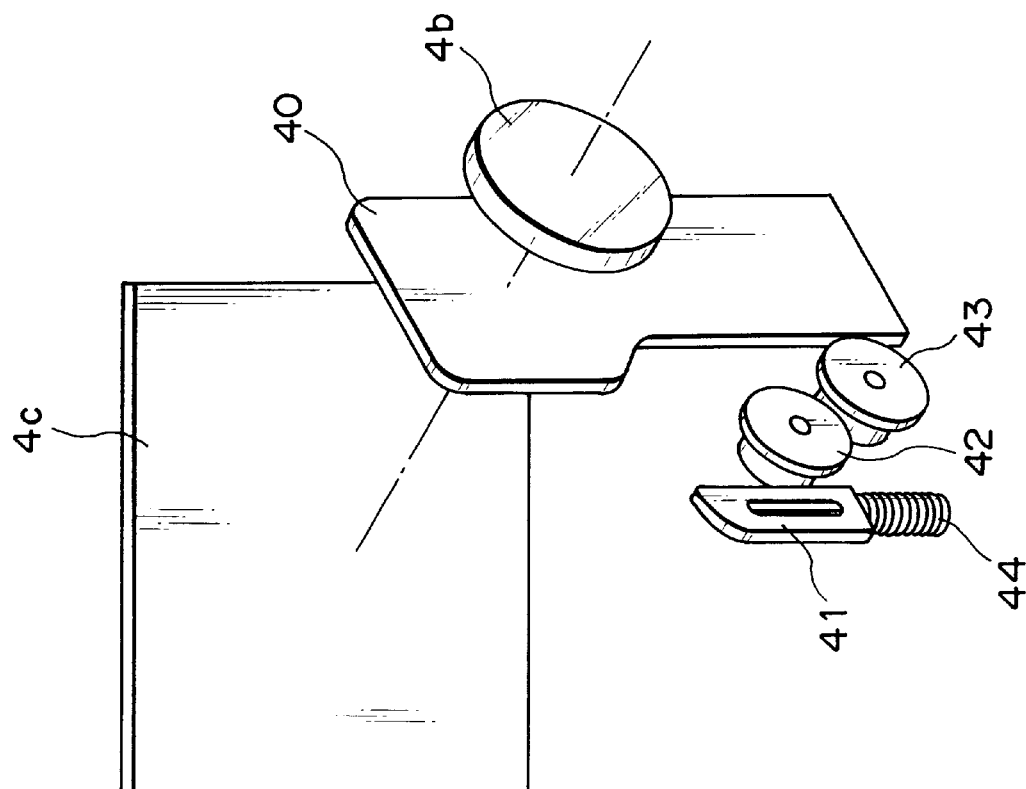
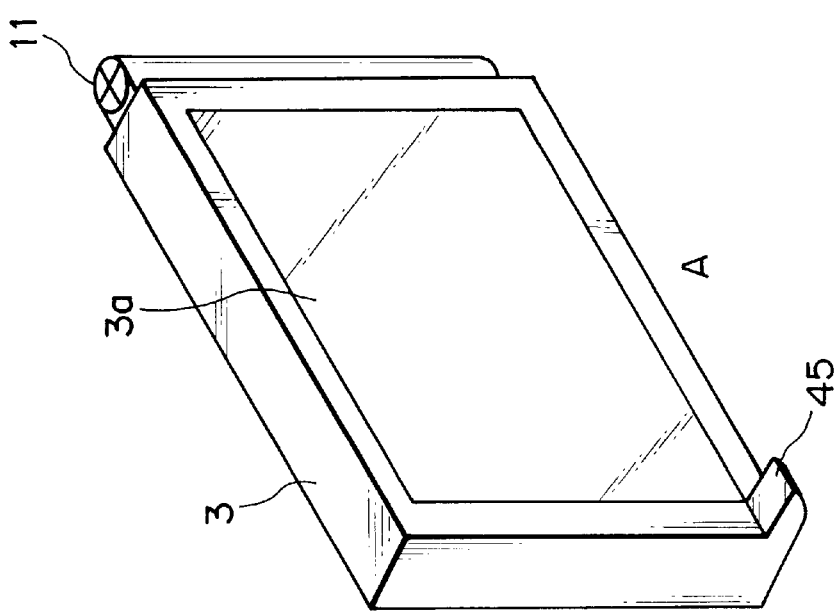

TO SIGNAL PROCESSING CIRCUIT

TO SIGNAL PROCESSING CIRCUIT

TO SIGNAL PROCESSING CIRCUIT

TO SIGNAL PROCESSING CIRCUIT

IMAGE SENSING APPARATUS CAPABLE OF SEEING IMAGE DISPLAYED ON DISPLAY DEVICE THROUGH FINDER

BACKGROUND OF THE INVENTION

The present invention relates to an image sensing apparatus, such as a video camera and an electronic camera, having a display monitor.

To check an image sensing condition of a conventional image sensing apparatus, such as a video camera and an electronic camera, by monitoring a display, mainly there are two ways; one is to monitor an image displayed on, e.g., a liquid crystal display or a cathode ray tube (CRT) display through an eye lens system (finder); and the other is to directly monitor an image displayed on a relatively large liquid crystal display, generally, two to four inches.

In an image sensing apparatus having only a finder including an eye lens system, a user has to keep looking into the finder while sensing images. This imposes a burden on the user especially when sensing images for a long time. Further, it is not possible for a plurality of individuals to monitor an image simultaneously.

Whereas, in an image sensing apparatus only having a relatively large liquid crystal display, an image on the display is easy to see while sensing images and a plurality of individuals can monitor the image at the same time. However, in a bright environment, an image displayed on the liquid crystal display is not clearly seen.

Accordingly, an image sensing apparatus having both a large liquid crystal monitor and a finder for monitoring a sensed image has been produced. In such the image sensing apparatus, a plurality of individuals can monitor a sensed image simultaneously by using the large liquid crystal display, further, in a bright environment, a sensed image can be properly monitored by observing the sensed image through the finder.

However, more energy is consumed in an image sensing apparatus having both a large liquid crystal display and a finder than an image sensing apparatus having either the display or the finder, which shortens operating time of the image sensing apparatus when a battery supplies the power to drive the image sensing apparatus.

SUMMARY OF THE INVENTION

The present invention has been made in consideration of the above situation, and has as its first object to reduce energy consumption of an image sensing apparatus having functions of both a large display and a finder.

According to the present invention, the foregoing first object is attained by providing an image sensing apparatus comprising: a display device, mounted rotatable about an axis on a side of the image sensing apparatus, for displaying a sensed image; a finder; and a reflecting member which reflects an image displayed on the display device toward the finder when the display device is in a first state, wherein the first state is that the display device is folded up by the side of the image sensing apparatus.

Further, it is the second object of the present invention to make a safe image sensing apparatus.

According to the present invention, the foregoing second object is attained by configuring the above image sensing apparatus so that the reflecting member of the image sensing apparatus rotates in the same direction as a rotation of the display device, coupled with the rotation of the display device.

According to another aspect of the present invention, the image sensing apparatus further comprises a shield, wherein the shield blocks light from the finder when the display device is in a second state.

According to another aspect of the present invention, the image sensing apparatus further comprises optical dispersion means provided between the display device and the reflecting member.

According to another aspect of the present invention, the image sensing apparatus further comprises a lock means for locking the display device in the first state, wherein, when the finder is settled inside of the image sensing apparatus, the lock means releases the display device.

According to another aspect of the present invention, the image sensing apparatus further comprises a shield for blocking light when the finder is settled inside of the image sensing apparatus.

According to another aspect of the present invention, the shield of the image sensing apparatus is moved outside of a path of the finder when the finder is inserted into the image sensing apparatus.

Furthermore, it is the third object of the present invention to decrease the size of an image sensing apparatus.

According to the present invention, the foregoing third object is attained by providing an image sensing apparatus comprising: an image sensing device for sensing an image; a first reflecting member for reflecting incoming light toward the image sensing means; a display device, mounted rotatable about an axis on a side of the image sensing apparatus, for displaying a sensed image; a finder; and a second reflecting member, provided on the back of the first reflecting member, which reflects an image displayed on the display device toward the finder when the display device is in a first state.

Further, it is the fourth object of the present invention to display a sensed image in a proper luminous condition.

According to the present invention, the foregoing fourth object is attained by providing the image sensing apparatus further comprising: determination means for determining whether or not the display device is in the first state; and control means for controlling display conditions of the display device depending upon a determination result by the determination means.

According to another aspect of the present invention, the image sensing apparatus further comprises: determination means for determining whether or not the display device is in the first state; and illumination means for illuminating the display device when the determination means determines that the display device is in the first state.

According to another aspect of the present invention, the image sensing apparatus further comprises: luminosity measurement device for measuring luminosity in the vicinity of the display device; and illumination means for illuminating the display device when the luminosity measured by the luminosity measurement device is lower than a predetermined level.

According to another aspect of the present invention, the image sensing apparatus has an opening for letting light entering the image sensing apparatus when the display device is in the first state.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a schematic illustration showing the operation, corresponding to FIG. 15, of the shield of the image sensing apparatus according to the third embodiment of the present invention;

DETAILED DESCRIPTION OF THE PREFERRED EMBODIMENTS

Preferred embodiments of the present invention will be described in detail in accordance with the accompanying drawings.

First Embodiment

Figure 1:
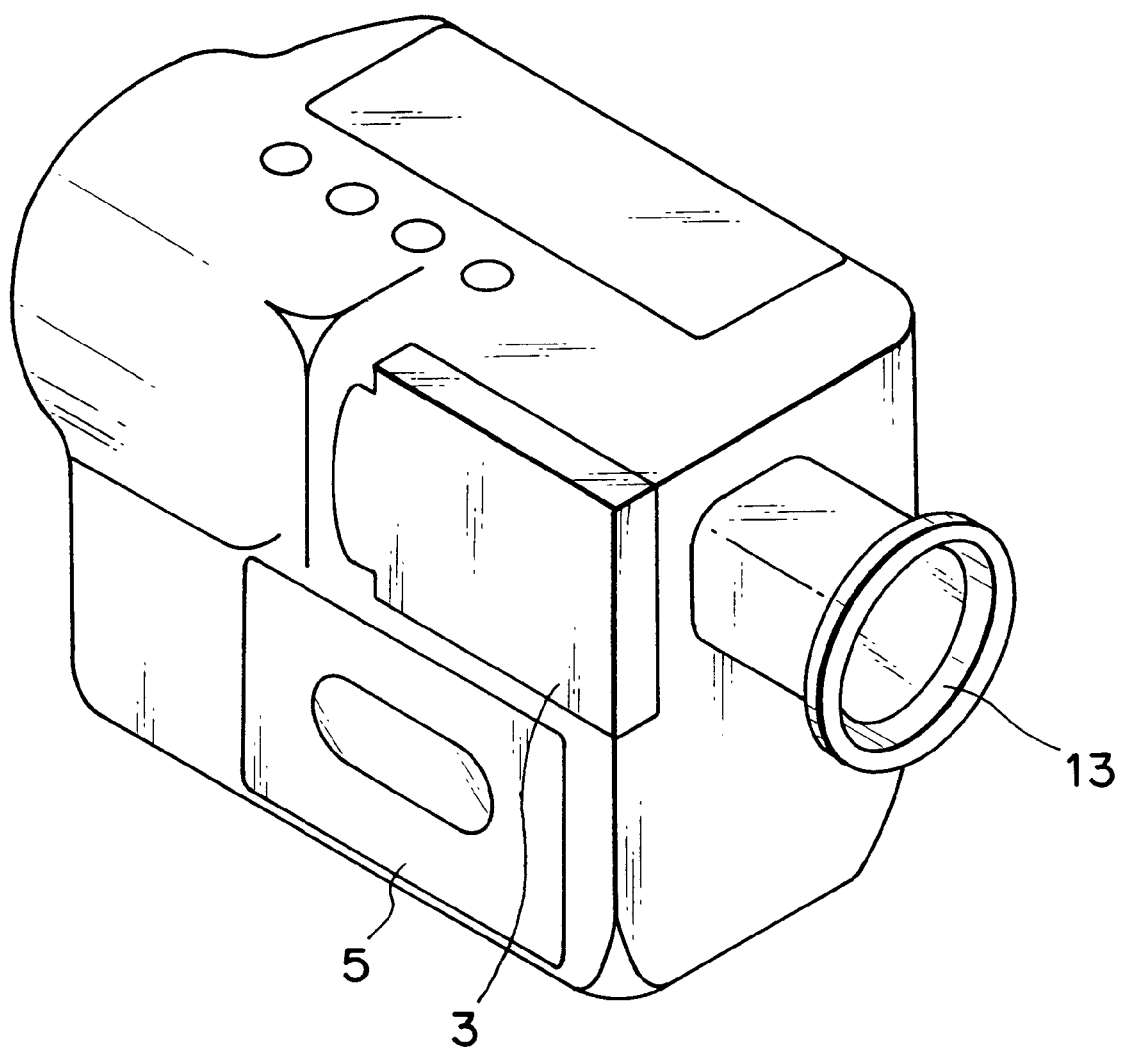
FIG. 1 is an external view of an image sensing apparatus according to a first embodiment of the present invention.

FIG. 1 is an external view of an image sensing apparatus according to the first embodiment. In FIG. 1, reference numeral 3 denotes a liquid crystal display (LCD) as a display device. In FIG. 1, the LCD 3 is folded up by the side of the image sensing device (a folded state). Further, reference numeral 13 denotes a finder, and a screen of the LCD 3 in the folded state is seen through the finder 13 with the help of other internal elements which will be described later in detail. Reference numeral 5 denotes a battery as a power source of the image sensing apparatus, and it is arranged below the finder.

Figure 2:
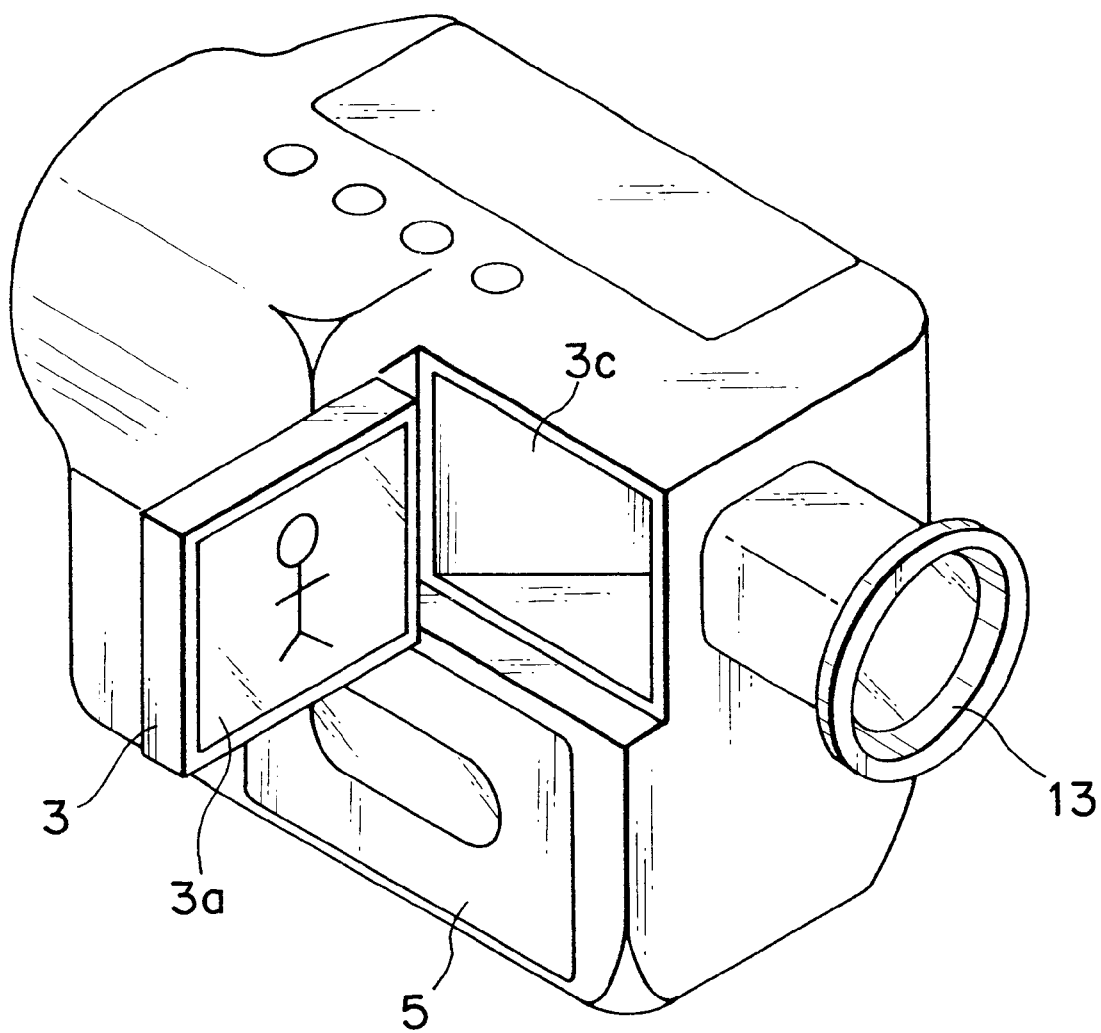
FIG. 2 is an external view of the image sensing apparatus according to the first embodiment of the present invention.

FIG. 2 shows the image sensing apparatus shown in FIG. 1 after the LCD 3 is rotated to a position where the screen 3a can be seen directly.

Figure 3:
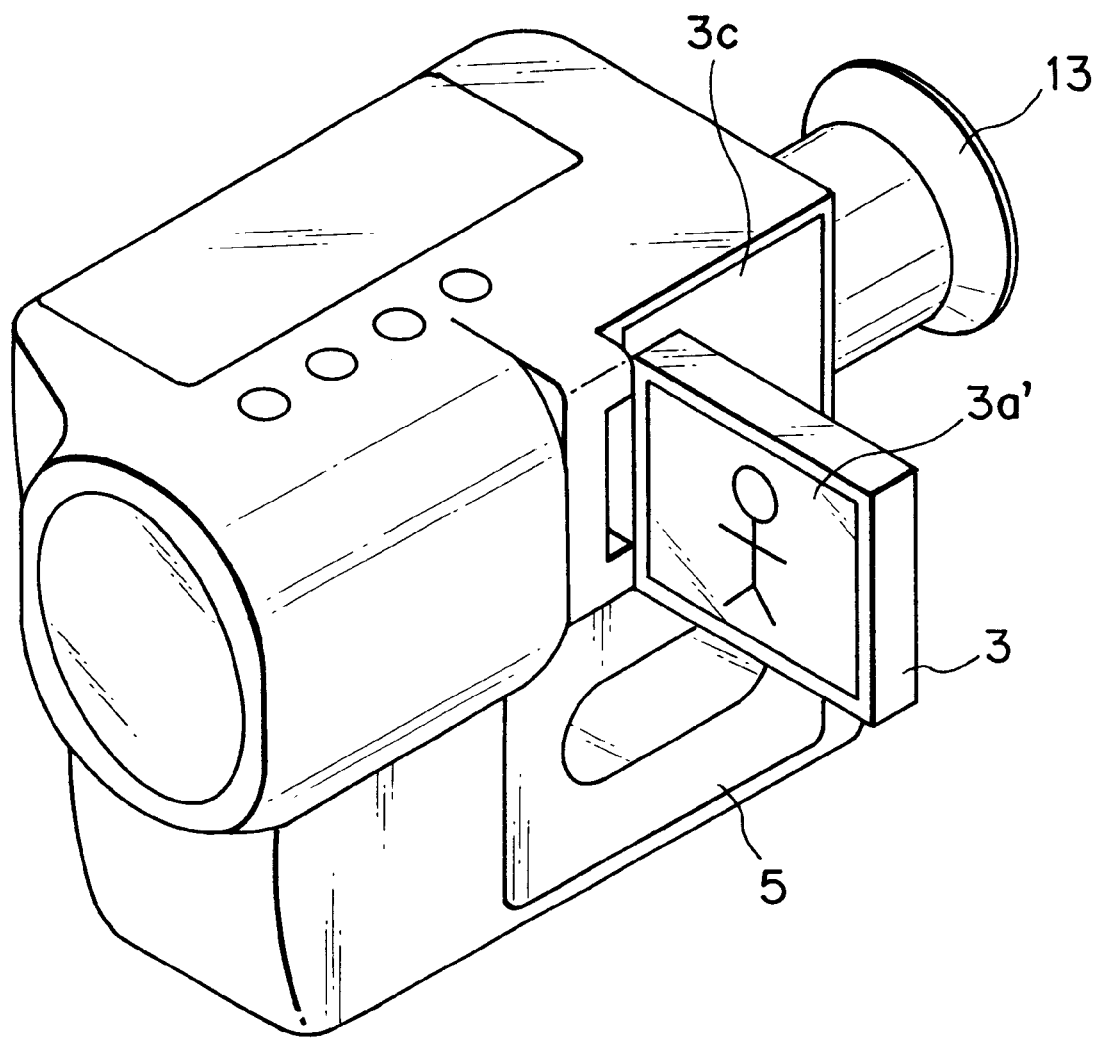
FIG. 3 is an external view of the image sensing apparatus according to the first embodiment of the present invention.

FIG. 3 is an external view of the image sensing apparatus when the LCD 3 is rotated so that the screen 3a faces an object.

Figure 4:
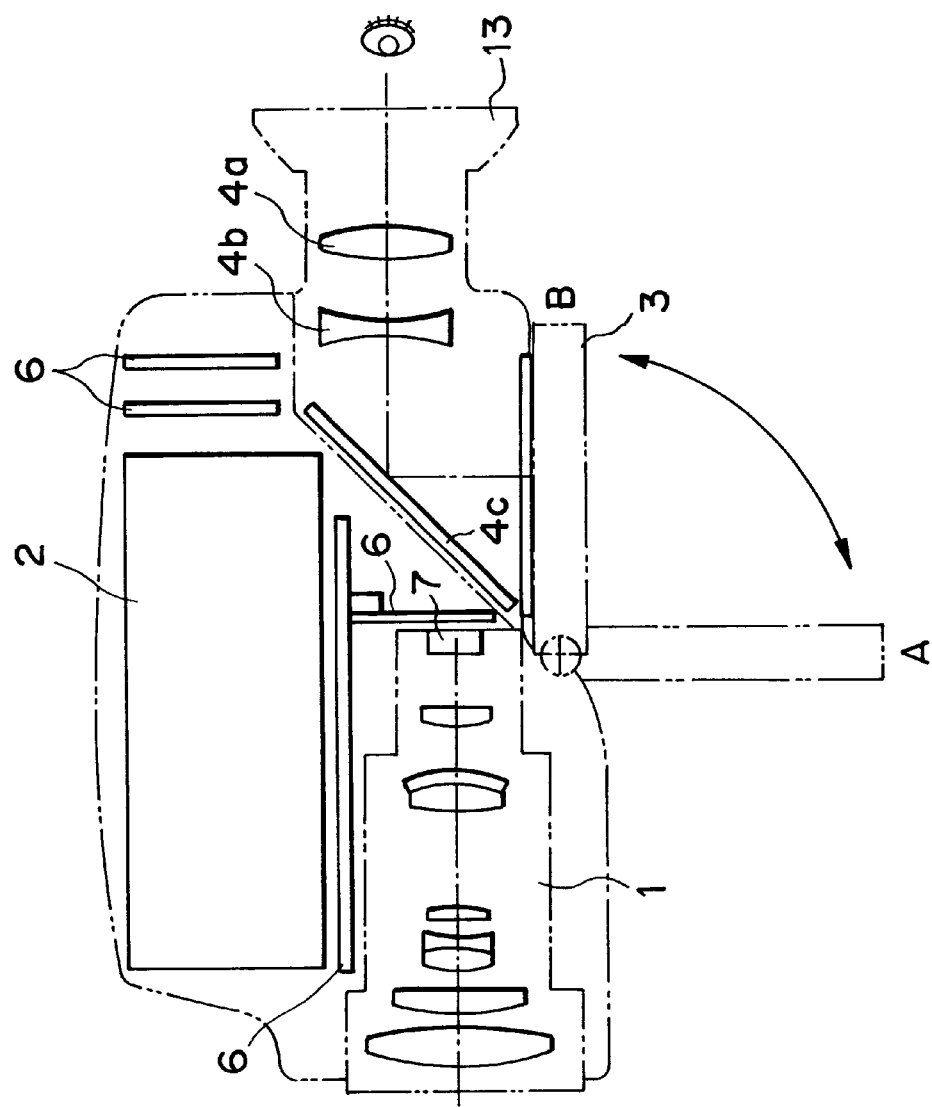
FIG. 4 is a view showing an internal mechanism of the image sensing apparatus seen from the side according to the first embodiment of the present invention.

FIG. 4 is a perspective view of the image sensing apparatus seen from the side according to the first embodiment. In FIG. 4, reference numeral 1 denotes a lens unit which includes a zoom lens, a focusing lens, and an iris diaphragm. Reference numeral 2 denotes a recording unit for recording on a magnetic tape, for instance. The recording unit 2 is arranged approximately parallel to the optical axis of the lens unit 1.

Further, reference numeral 6 denotes signal processing boards; 7, an image sensing device for converting an optical image of an object into electric signals; 4c, a mirror for reflecting a displayed image on the screen 3a at a right angle when the LCD 3 is at a position B (the LCD 3 is in the folded state); 4a, a convex lens; and 4b, a concave lens. The convex lens 4a and the concave lens 4b configure an inverse Galileian finder (finder 13) and the image reflected by the mirror 4c can be seen at a proper size through the finder 13.

The LCD 3 is supported on the side of the image sensing apparatus so as to be rotatable from the position A to the position B. When the LCD 3 is in the position A, the user can directly see an image on the LCD 3. Whereas, when the LCD 3 is in the position B, The user can see an image on the LCD 3 reflected by the mirror 4c through the finder 13.

In the first embodiment, the screen 3a of the LCD 3 has the size of 2 to 4 inches, and the size of the mirror 4c has to be large enough to reflect the entire image displayed on the screen 3a. Accordingly, the recording unit 2 is arranged in the front portion of the image sensing apparatus of the present invention, thereby securing enough space for the mirror 4c. With this configuration, the size of the image sensing apparatus of the present invention is kept as small as a conventional image sensing apparatus having both an electric view finder and a monitor.

Further, when the LCD 3 is in the position A, it an be rotated about an axis which is normal to the side of the image sensing apparatus so as to face the screen 3a to an object, as shown in FIG. 3.

Figure 5:
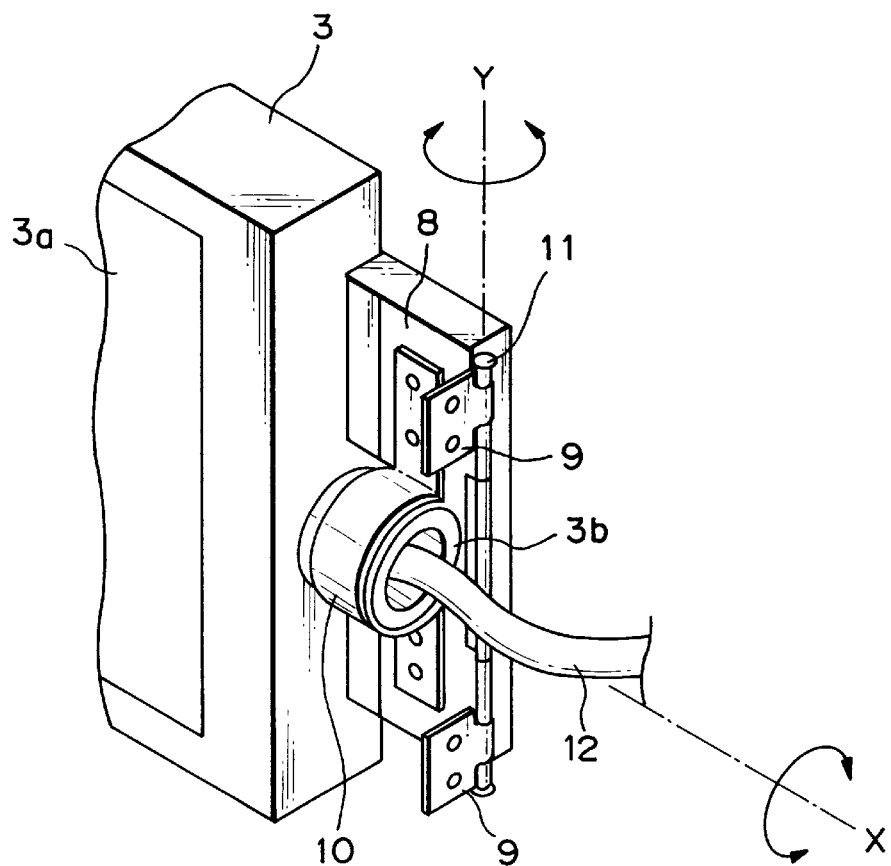
FIG. 5 shows a mechanism of a hinge unit.

FIG. 5 shows a detailed configuration of a hinge unit which enables the LCD 3 to rotate as described above.

In FIG. 5, reference numeral 3b denotes a rotation shaft for enabling the LCD 3 to rotate about an X axis so as to face the screen 3a to an object as shown in FIG. 3. Reference numerals 8 and 9 denote fastening plates fastened on the LCD 3 and on the side of the main body of the image sensing apparatus, respectively, for attaching the LCD 3 to the main body of the image sensing apparatus. Reference numeral 10 denotes a blade spring, for controlling rotational friction, which fastens the rotation shaft 3b to the fastening plate 8.

Figure 6:
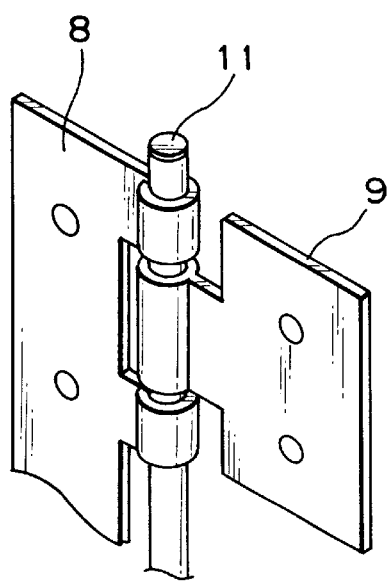
FIG. 6 shows the mechanism of the hinge unit.

Further, the fastening plates 8 and 9 are supported by a shaft 11 so as to be freely rotated (see FIG. 6). With the hinge unit as described above, for rotating the LCD 3 about the X axis, it is rotated about the rotation shaft 3b with a fixed friction. Similarly, for rotating the LCD 3 about the Y axis, it is rotated about the shaft 11 with a fixed friction.

The rotation shaft 3b has a hollow inside for a cable 12, for outputting signals from the signal processing boards 6 to the LCD 3, to pass through the shaft 3b.

In the hinge unit as shown in FIG. 5, a switch x for detecting rotation of 180 degrees of the LCD 3 about the X axis (i.e., detecting that the LCD 3 faces an object as shown in FIG. 3) and a switch y for detecting that the LCD 3 is either in the position A or B are provided, although the switches x and y are not shown in FIG. 5.

Figure 7:
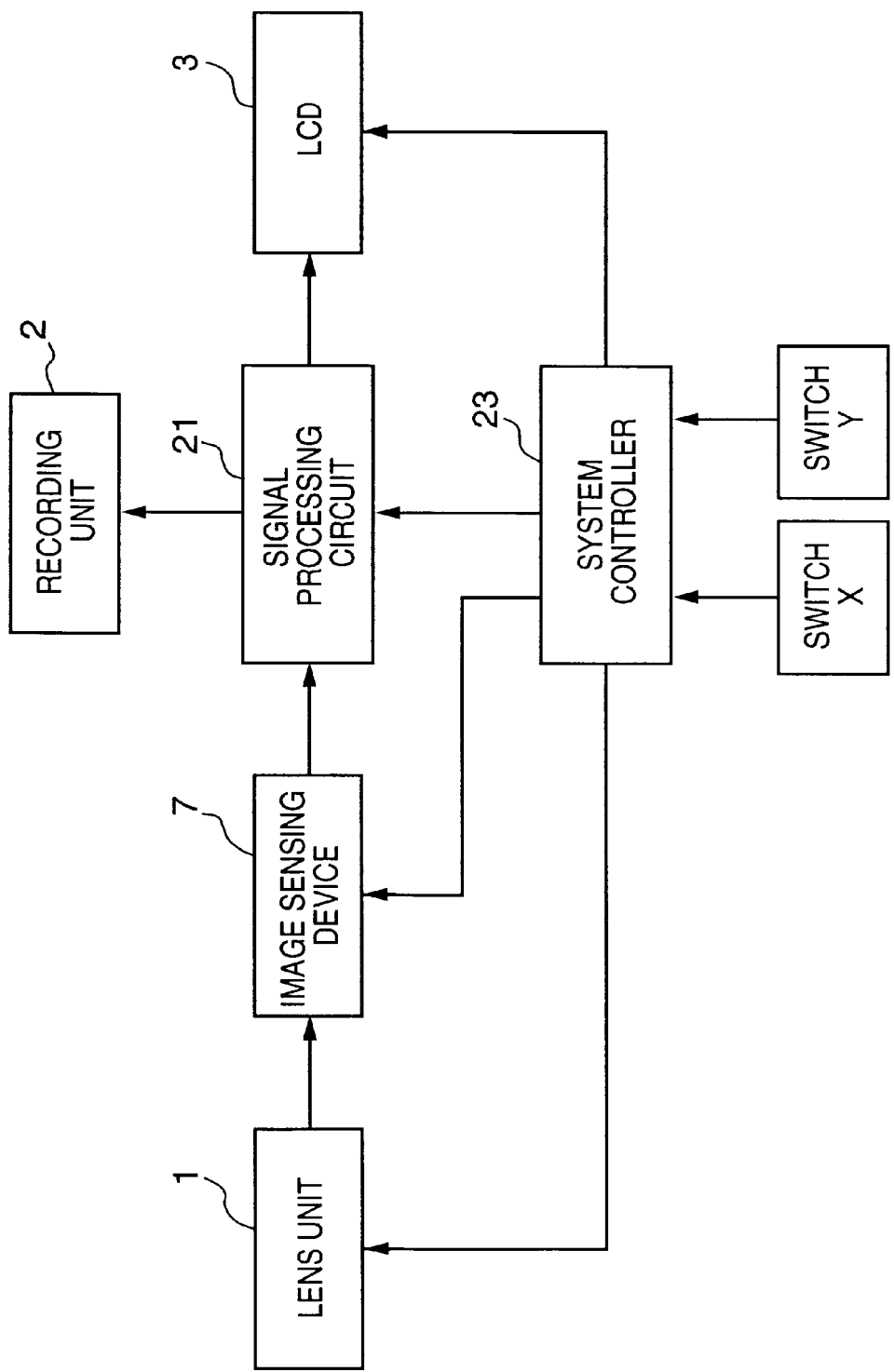
FIG. 7 is a block diagram illustrating a configuration of the image sensing apparatus according to the first embodiment of the present invention.

FIG. 7 is a block diagram illustrating a configuration of the image sensing apparatus according to the first embodiment.

Referring to FIG. 7, a system controller 23 controls the entire operation of the image sensing apparatus. An optical image of an object entering through the lens unit 1 is converted into electric signals by the image sensing device 7, further converted into standardized signals conforming to, e.g., NTSC, by a signal processing circuit 21. The signals obtained by the signal processing circuit 21 are outputted to the recording unit 2 and/or the LCD 3. In the recording unit 2, the signals outputted from the signal processing circuit 21 are recorded on a recording medium, such as a magnetic tape. In the LCD 3, a sensed image is displayed on the basis of the signals outputted from the signal processing circuit 21. Note, the signal processing circuit 21 and the system controller 23 are integrated in a circuit on the signal processing boards 6.

With the aforesaid configuration, when the switch y detects that the LCD 3 is in the position B, namely, the folded state, the system controller 23 reverses the order of the image signals, outputted from the signal processing circuit 21, in the horizontal direction so that a mirror image is displayed on the screen 3a. Accordingly, a correct image is observed through the finder 13 since an image displayed on the screen 3a is reflected by the mirror 4c.

According to the above operation, by seeing an image displayed on the screen 3a through the finder 13, it is possible to clearly see the image when the user is in a bright environment, such as an outside of a building during daytime, since external light is shielded from the screen 3a.

Further, when the switch x determines that the screen 3a faces an object as shown in FIG. 3, the system controller 23 reverses the order of the image signals outputted from the signal processing circuit 21 upside down.

According to the first embodiment of the present invention as described above, an image displayed on the LCD 3 can be seen through the finder 13; therefore, energy consumption of the image sensing apparatus of the present invention is reduced comparing to a conventional image sensing apparatus having both an electric view finder and a liquid crystal display.

Second Embodiment

According to the configuration as shown in FIG. 4, when the LCD 3 is in the position A where an image displayed on the LCD 3 is directly seen, light enters the main body of the image sensing apparatus from an opening (opening 3c shown in FIGS. 2 and 3). It is very dangerous for the user to accidentally look into the finder 13 in this state, especially, when direct sunlight is incoming through the opening 3c.

The second embodiment is addressed to solving the foregoing problem, and the opening 3c is shielded to block light when the LCD 3 is in the position A.

Figure 8:
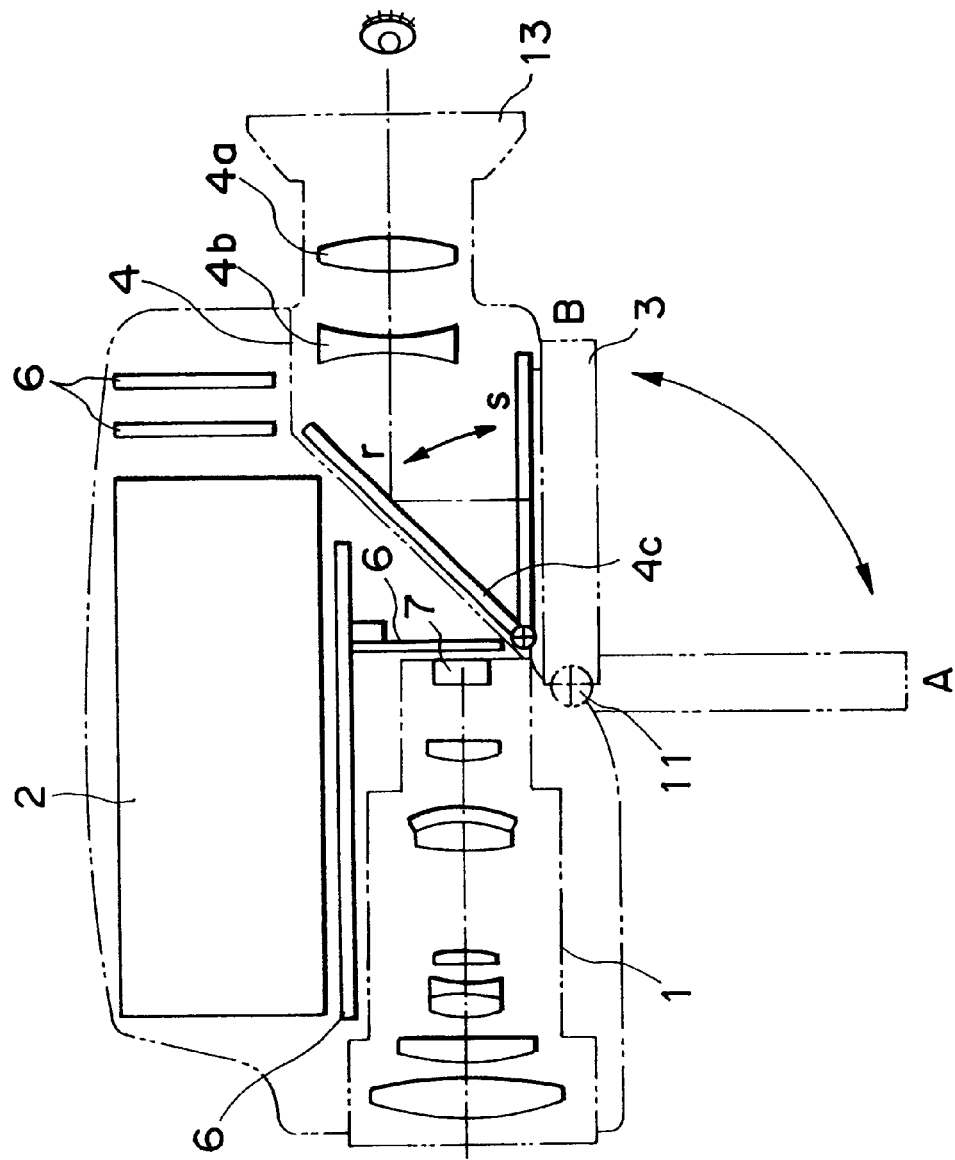
FIG. 8 is view showing an internal mechanism of an image sensing apparatus seen from the side according to a second embodiment of the present invention.

FIG. 8 is view showing an internal mechanism of an image sensing apparatus seen from the side according to the second embodiment. Referring to FIG. 8, as the LCD 3 rotates from the position B (in the folded state) to the position A, the mirror 4c moves from a position r to a position s to shield the opening 3c. The other elements in FIG. 8 are the same as those explained with reference to FIG. 4; therefore, explanation of those is omitted.

Figure 9:
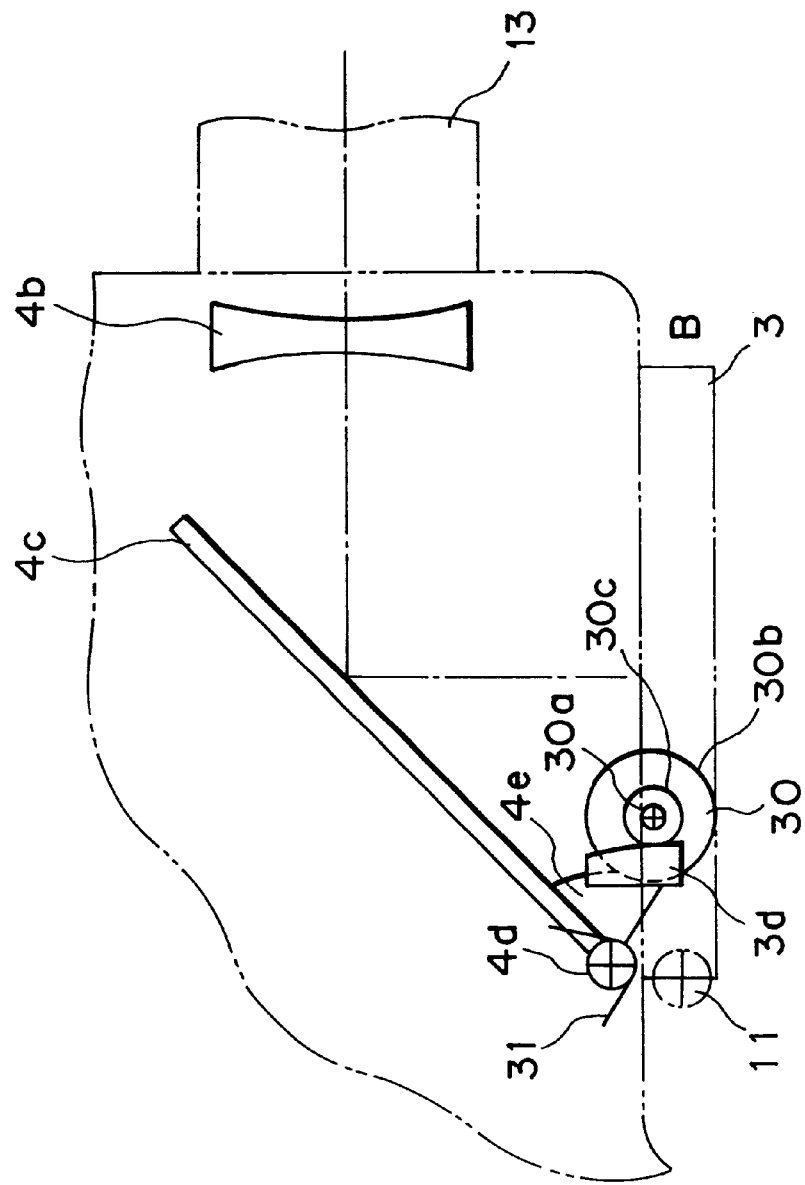
FIG. 9 is a view showing position relationship between a liquid crystal display and a mirror of the image sensing apparatus seen from the top according to the second embodiment of the present invention.
Figure 10:
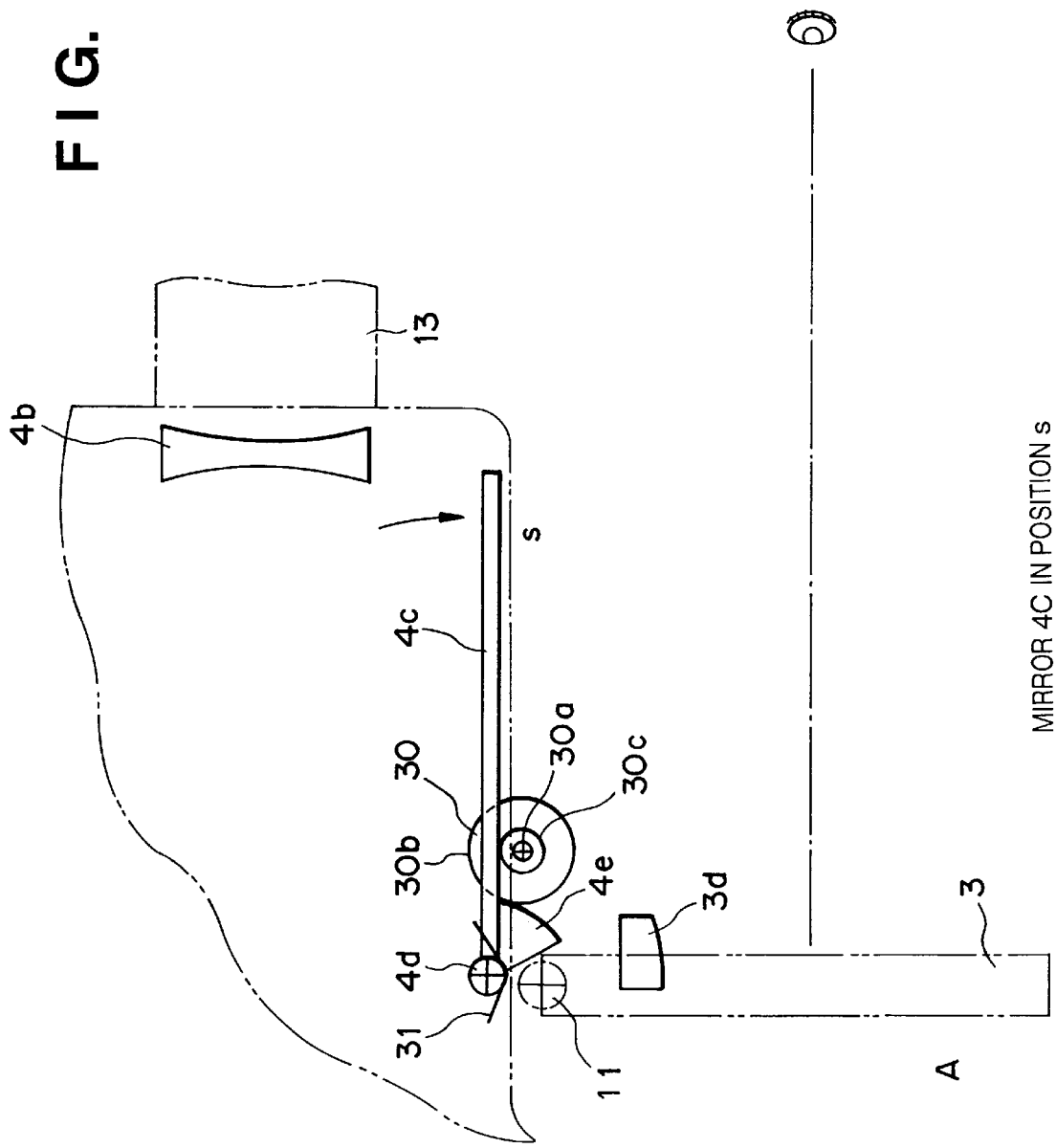
FIG. 10 is a view showing position relationship between the liquid crystal display and the mirror of the image sensing apparatus seen from the top according to the second embodiment of the present invention.
Figure 11:
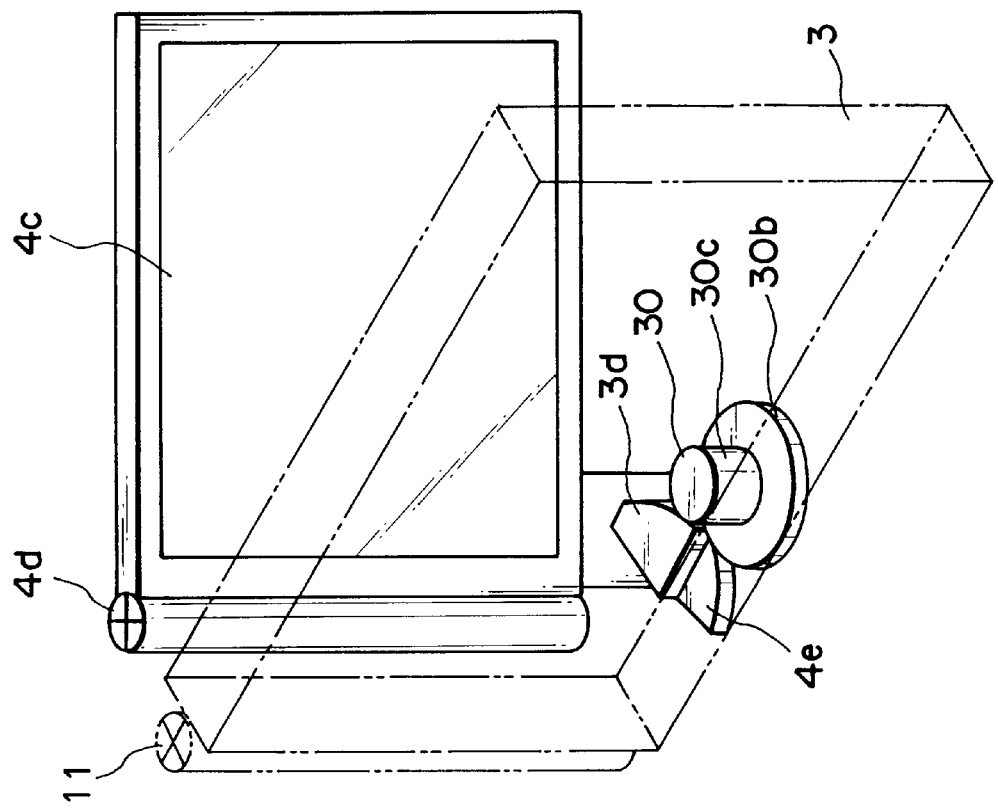
FIG. 11 is a perspective view showing detailed rotation mechanism of the liquid crystal display and the mirror.
Figure 12:
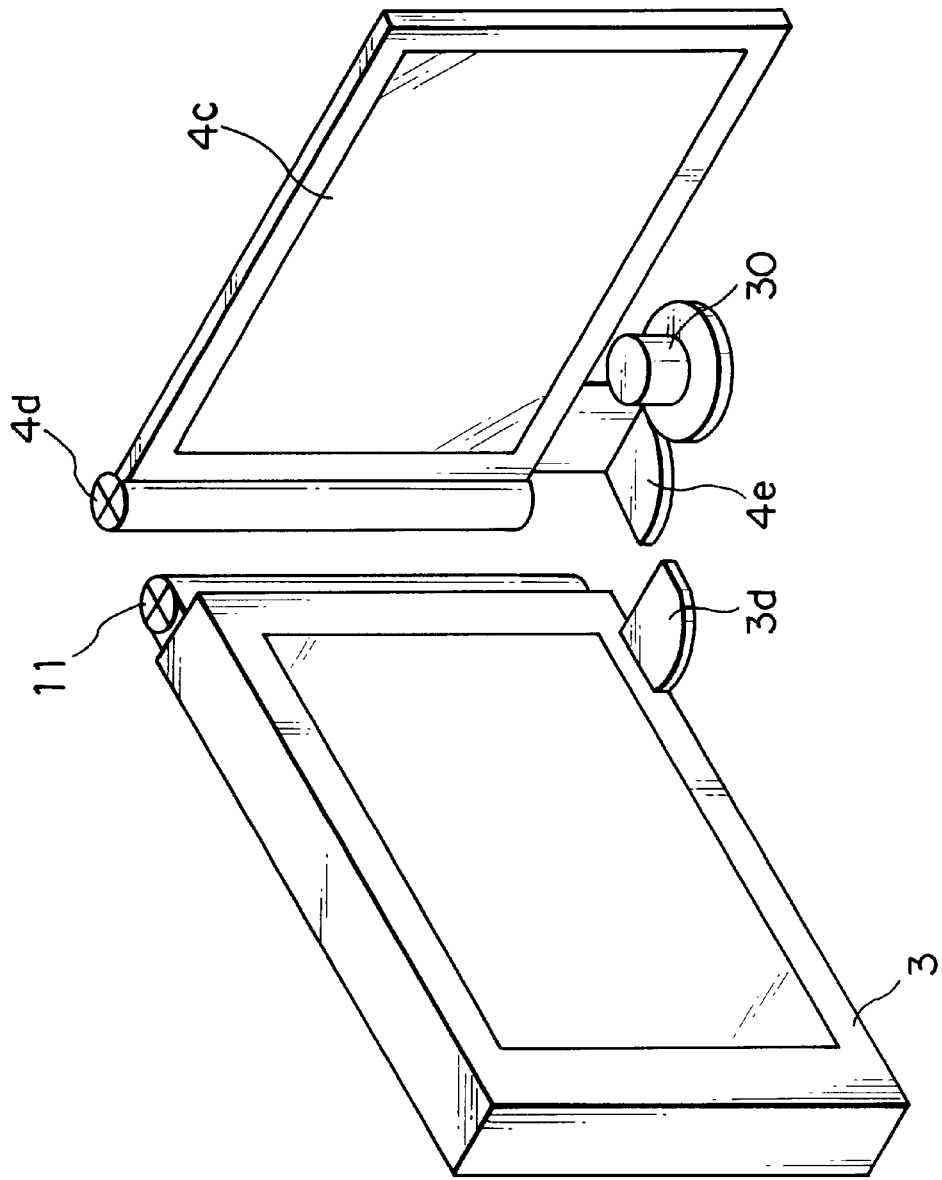
FIG. 12 is a perspective view showing detailed rotation mechanism of the liquid crystal display and the mirror.

FIGS. 9 and 10 are top schematic views showing position relationship between the LCD 3 and the mirror 4c, which moves in connection with the LCD 3, when the LCD 3 is in the position B and position A, respectively. Further, FIGS. 11 and 12 are perspective views showing detailed rotation mechanism of the LCD 3 and the mirror 4c according to the second embodiment.

Referring to FIGS. 8 to 12, the LCD 3 is rotatable from the position A to the position B, shown in FIG. 8, about the shaft 11, and the mirror 4c rotates about a shaft 4d within an angle of about 45 degrees from the position r to the position s. Further, a helical torsion coil spring 31 is provided on the shaft 4d, and pushes the mirror 4c toward the position s.

Further, a dual gear 30 is rotatable about a shaft 30a, and a first gear 30b of the gear 30 is engaged with a gear 4e provided in the mirror 4c.

With the configuration as described above, when the LCD 3 is in the position A as shown in FIG. 10, the mirror 4c is kept in the position s pushed by the spring 31 and the opening 3c is closed. Accordingly, light is blocked from entering the main body of the image sensing apparatus, thereby providing the safe image sensing apparatus.

Further, referring to FIG. 9, when the LCD 3 is rotated from the position A to the position B, a second gear 30c of the dual gear 30 is engaged with a gear 3d before the LCD 3 arrives at the position B, and the rotation is transferred to the gear 4e. Then, the mirror 4c moves toward the position r against the force of the spring 31. When the mirror 4c is in the position r, an image on the screen 3a can be seen through the finder 13.

Note, in the above description of the second embodiment, the shaft 4d and the gear 4e are integrally formed on the mirror 4c, however, a supporting member, having the shaft 4d and the gear 4e, for supporting the mirror 4c may be provided.

According to the second embodiment as described above, in addition to the advantage obtained in the first embodiment, a safe image sensing apparatus is provided.

Third Embodiment

In the second embodiment, the opening 3c is shielded when the LCD 3 is in the position A (the state in which an image on the LCD 3 can be directly seen). In the third embodiment, a shield is provided between the finder 13 and the mirror 4c to block light reflected by the mirror 4c.

Figure 13:
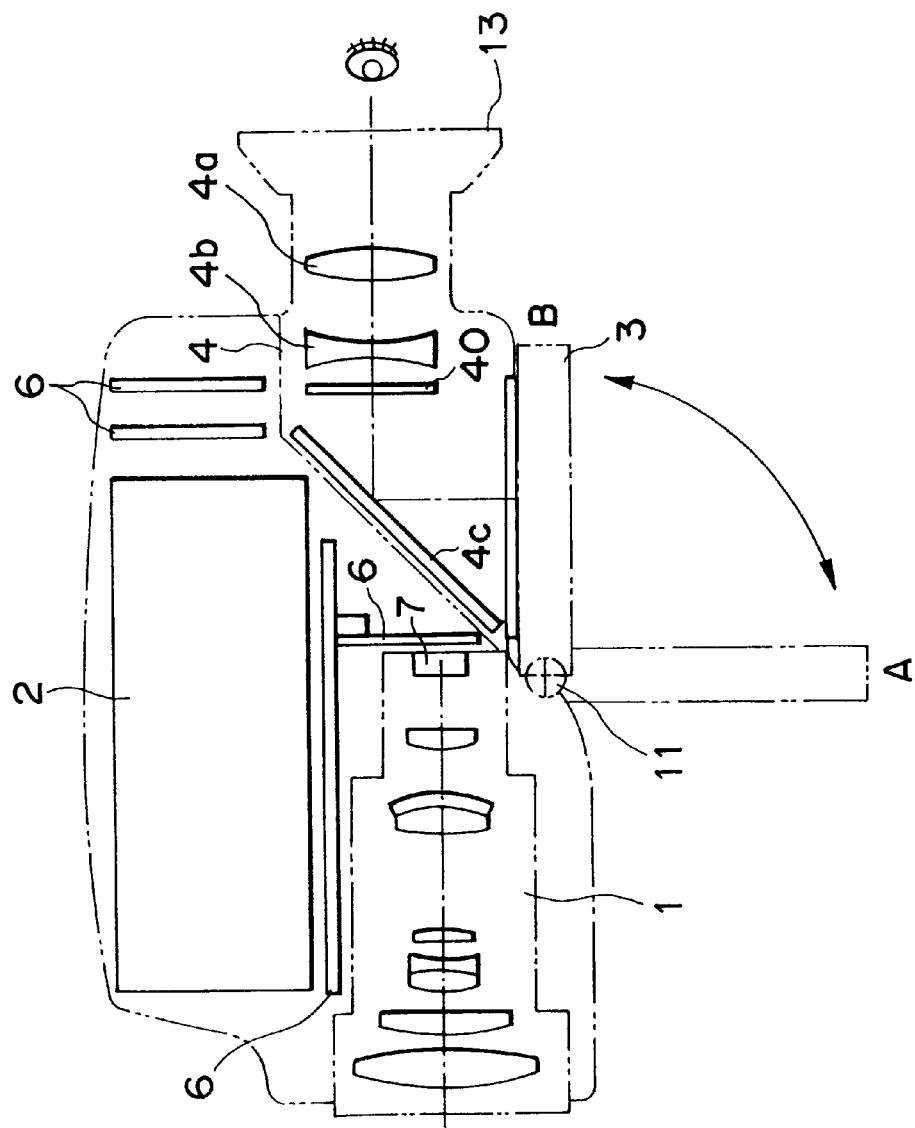
FIG. 13 is view showing an internal mechanism of an image sensing apparatus seen from the side according to a third embodiment of the present invention.

FIG. 13 is a perspective view showing an internal mechanism of an image sensing apparatus seen from the side according to the third embodiment. Elements are the same as those explained in the first embodiment except a shield 40 provided between the mirror 4c and the concave lens 4b. The shield 40 blocks light from the finder 13 when the LCD 3 is in the position A, and does not block light from the finder 13 when the LCD 3 is in the position D.

Figure 14:
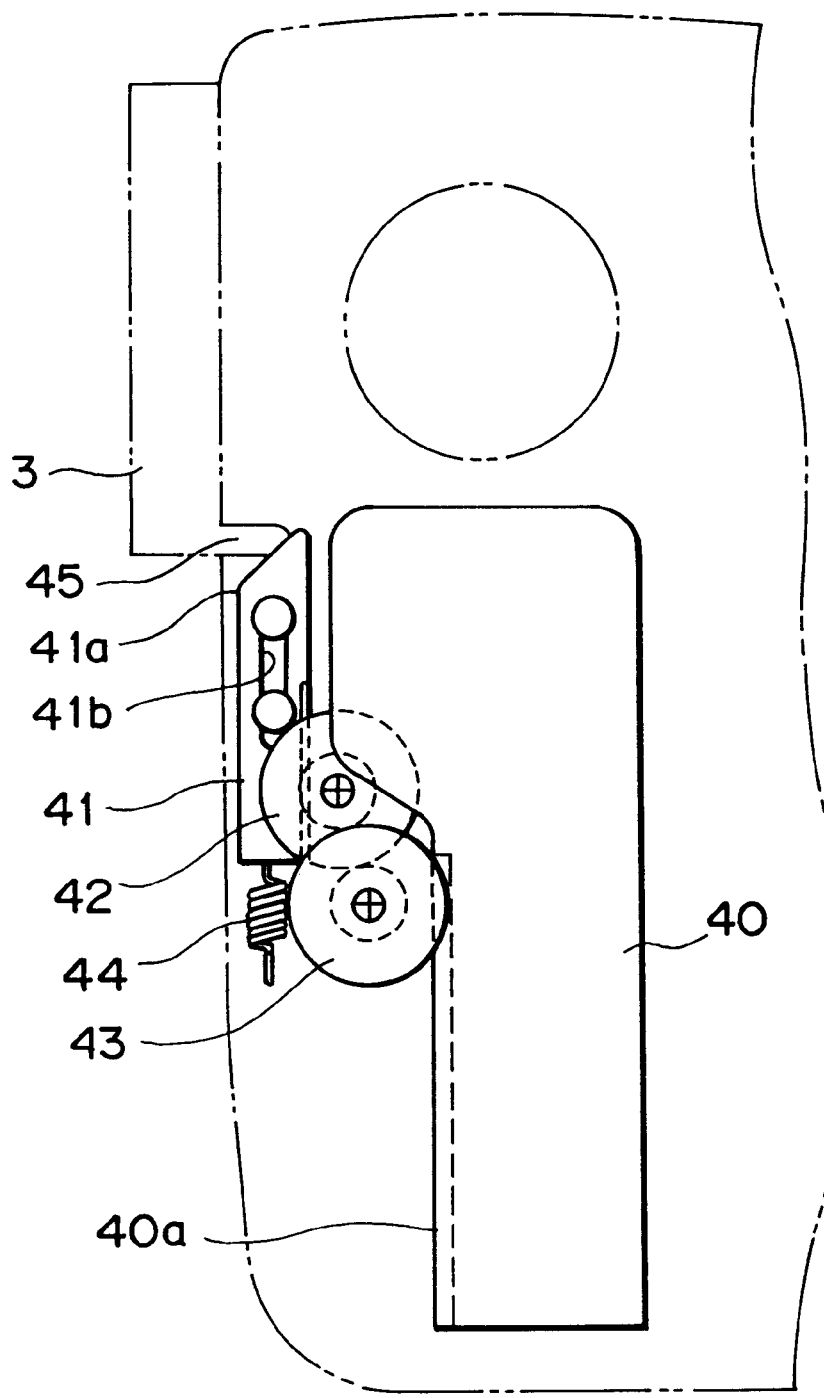
FIG. 14 is an explanatory view for showing an operation of a shield of the image sensing apparatus seen from the back according to the third embodiment of the present invention.
Figure 15:
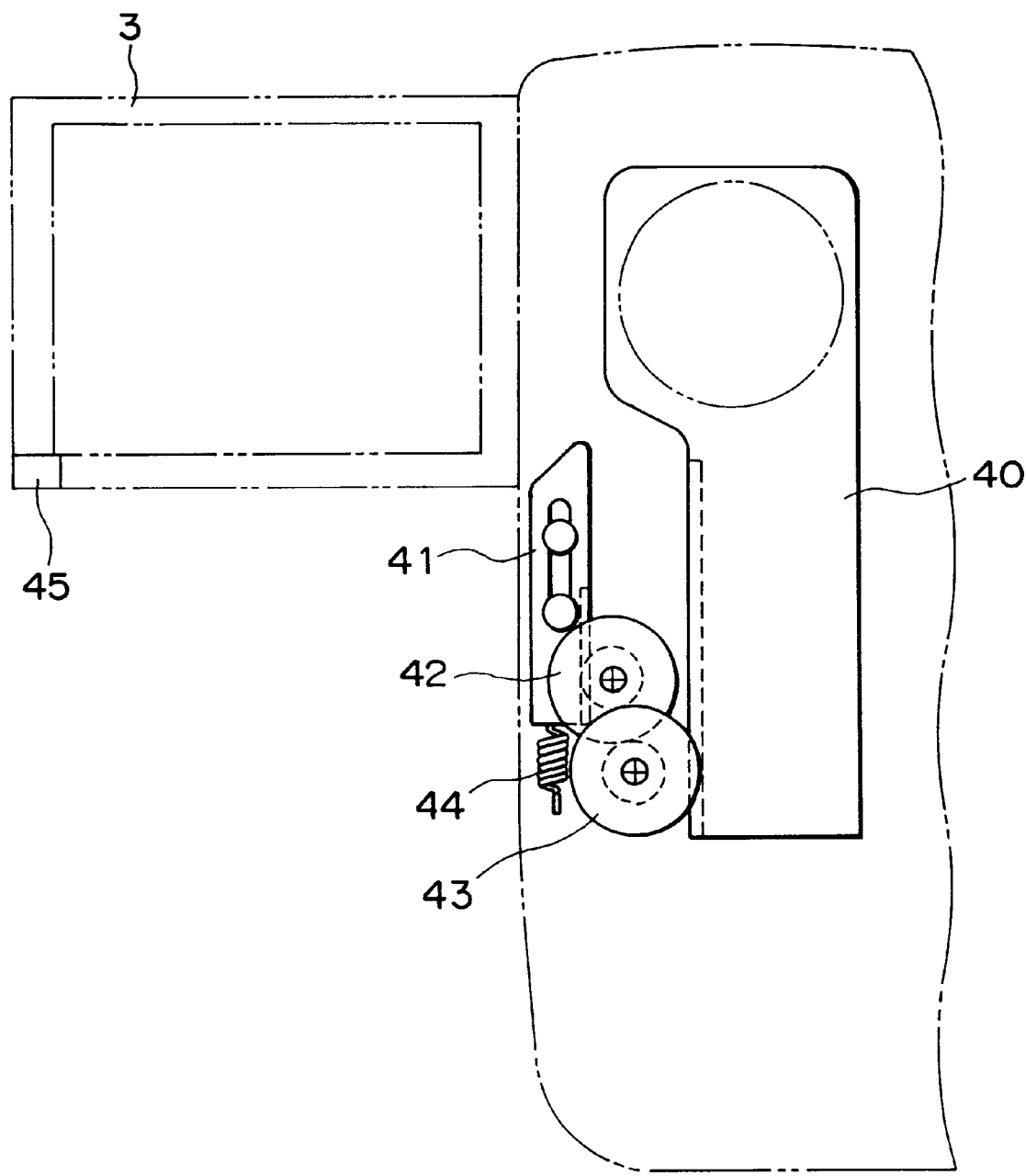
FIG. 15 is an explanatory view for showing an operation of the shield of the image sensing apparatus seen from the back according to the third embodiment of the present invention.
Figure 16:
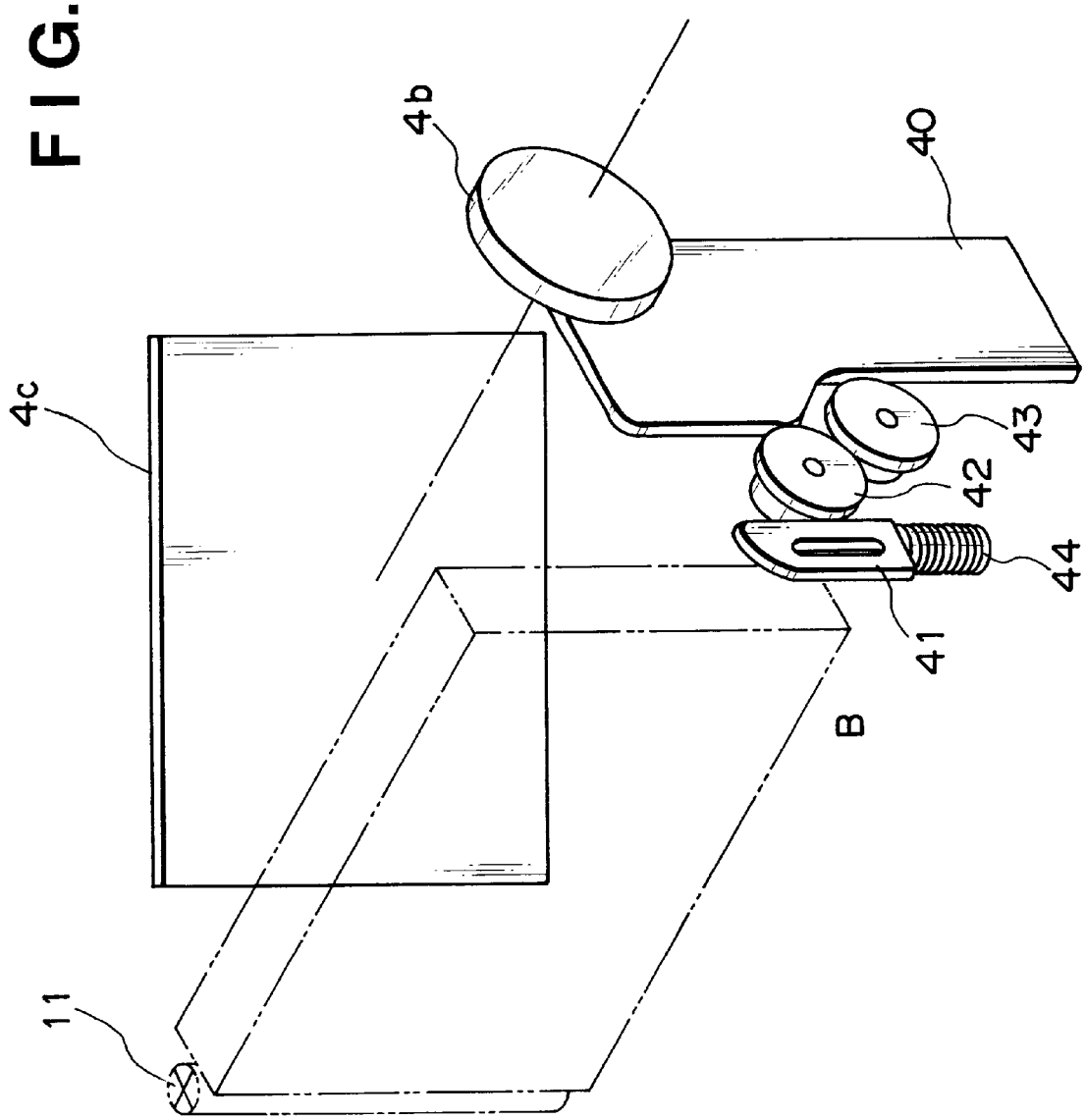
FIG. 16 is a schematic illustration showing the operation, corresponding to FIG. 14, of the shield of the image sensing apparatus according to the third embodiment of the present invention.

FIG. 14 is an explanatory view for showing an operation of the shield 40 when the LCD 3 is in the position B, and FIG. 15 is an explanatory view for showing an operation of the shield 40 when the LCD 3 is in the position A. Further, FIGS. 16 and 17 are schematic illustration showing the operations of the shield 40 corresponding to FIGS. 14 and 15, respectively.

Referring to FIGS. 13 to 17, a slide lever 41 slides in the vertical direction, and has a cam surface 41a and a rack 41b. The slide lever 41 is always pushed upward by a compression spring 44. A gear 42 is a dual gear, and one gear meshes with rack 41b of the slide lever 41 and the other gear meshes with a gear 43. The gear 43 is also a dual gear, and one gear meshes with the gear 42, and the other gear meshes with rack provided in the shield 40.

In the foregoing configuration, when the LCD 3 is rotated about the shaft 11 from the position A to the position B, a projection 45 on the bottom-left corner of the LCD 3 in FIGS. 15 and 17 touches the cam surface 41a of the slide lever 41, thereby presses the slide lever 41 downward against the force of the compression spring 44. The force against the spring 44 is transferred to the shield 40 via the gears 42 and 43, and the shield 40 slides downward accordingly. As a result, when the LCD 3 is in the position B, the shield 40 is moved below light path of an image reflected by the mirror 4c; thus, an image displayed on the LCD 3 can be seen through the finder 13.

Conversely, when the LCD 3 is rotated about the shaft 11 from the position B to the position A, the slide lever 41 is pushed upward by the compression spring 44. The force applied on the slide lever 41 is transferred to the shield 40 via the gears 42 and 44, thereby the shield 40 is moved upward. As a result, when the LCD 3 is in the position A, light entered from the opening 3c is blocked by the shield 40; thus, danger of incoming light converging via the finder 13 is removed.

According to the third embodiment as described above, in addition to the advantage obtained in the first embodiment, a safe image sensing apparatus is provided.

Fourth Embodiment

Next, the fourth embodiment is explained. In the second and third embodiments, the image sensing apparatuses are configured so as to prevent light from entering the finder 13 when the LCD 3 is in the position A. In the fourth embodiment, dispersion glass is fit into the opening 3c.

Figure 18:
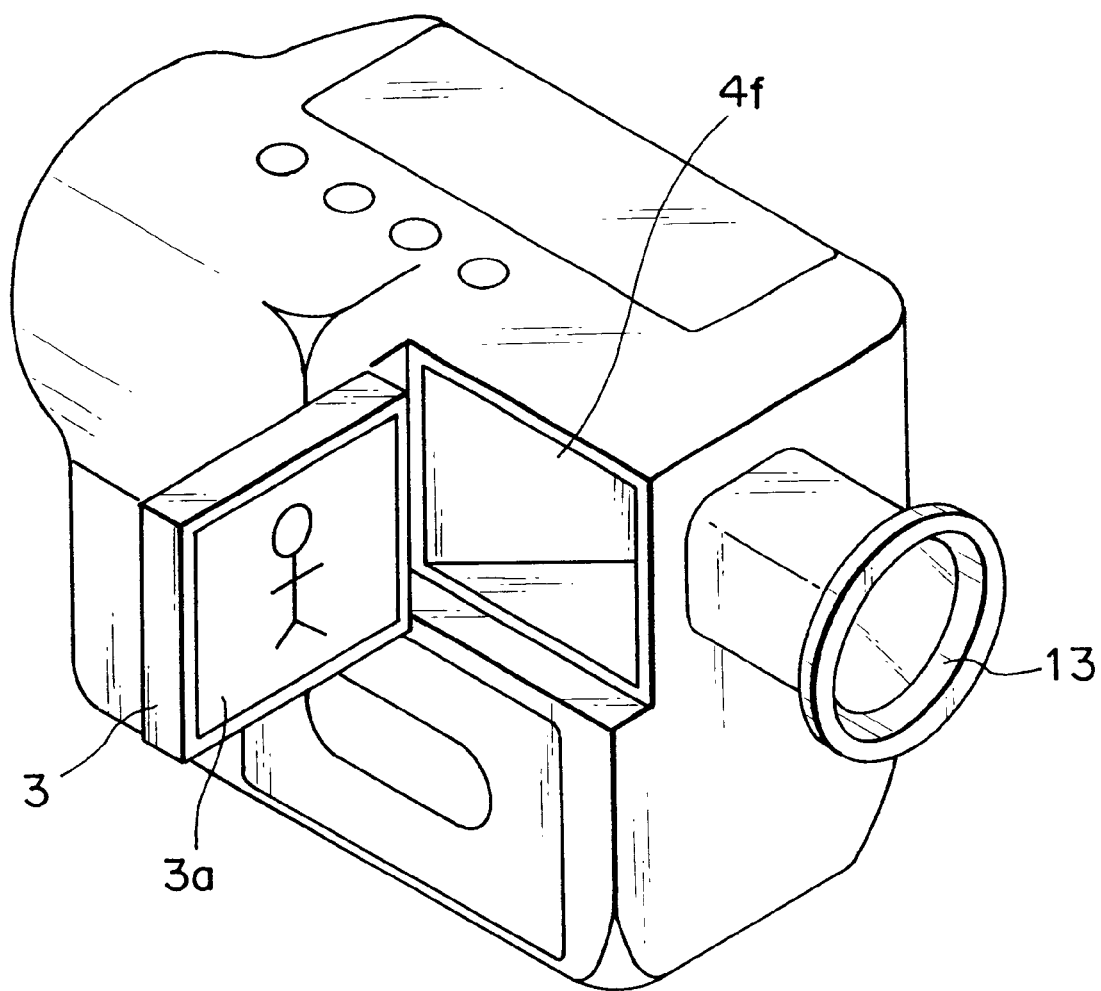
FIG. 18 is an external view of an image sensing apparatus according to a fourth embodiment of the present invention.
Figure 19:
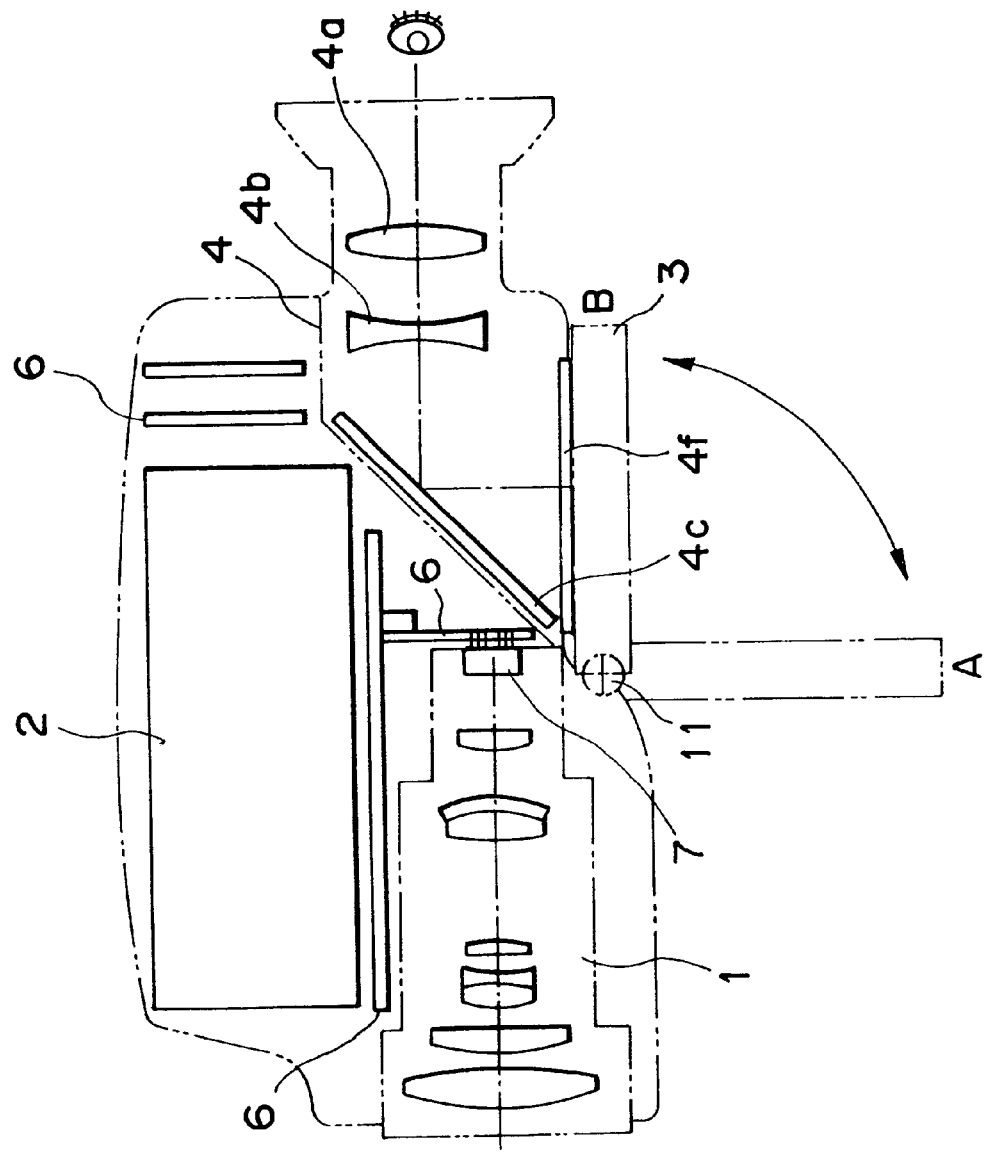
FIG. 19 is a view showing an internal mechanism of the image sensing apparatus seen from the side according to the fourth embodiment of the present invention.

FIG. 18 is an external view of an image sensing apparatus according to the fourth embodiment of the present invention, and FIG. 19 is a perspective view showing an internal mechanism of the image sensing apparatus. In FIGS. 18 and 19, units and elements except dispersion glass 4f are the same as those described with reference to FIG. 4 in the first embodiment; therefore, explanation of them are omitted.

As shown in FIGS. 18 and 19, the dispersion glass 4f is fit in the opening 3c. The dispersion glass 4f has thickness of, e.g., about 1.1 to 1.2 mm. Coarseness of the surface of the dispersion glass 4f may be selected between #800 and #1200, for instance, depending upon the resolution of the LCD 3, so that the image displayed on the LCD 3 is observed through the finder 13 in good condition. When the LCD 3 is in the position A, light entering the main body of the image sensing apparatus is dispersed by the dispersion glass 4f and the quantity of light is reduced. Thus, the dispersion glass 4f serves as a safety member which prevents the eye of the user from being damaged even when the user accidentally see a bright light source, such as the sun, through the finder When the LCD 3 is in the position B, the user sees the screen 3a via the dispersion glass 4f from the finder 13. Especially, if an eye lens system is a magnifying system, the user sees a magnified pixels of the screen 3a. In this case, the coarseness of an image displayed on the screen 3a is reduced due to the optical characteristics of the dispersion glass 4f; therefore, the image of improved quality can be observed through the finder 13.

According to the fourth embodiment as described above, in addition to the advantage obtained in the first embodiment, damage to the eye of the user is reduced by the dispersion glass when the user accidentally sees a bright light source through the finder 13 when the LCD 3 is in the position A. Furthermore, an image of improved quality can be observed through the finder 13 when the LCD 3 is in the position B.

Fifth Embodiment

Next, the fifth embodiment is explained with reference to drawings.

In the first to fourth embodiments as described above, the finder 13 protrudes by some amount from the back of the main body of the image sensing apparatus. When a user directly sees an image displayed on the LCD the amount of projection of the finder 13 from the main body of the image sensing apparatus does not change although the finder 13 is not used to see the image, and the projecting finder 13 may be obstructive to watch the LCD 3. Further, the projecting shape of the finder 13 deteriorates portability.

The fifth embodiment is addressed to solving the foregoing problem.

Figure 20:
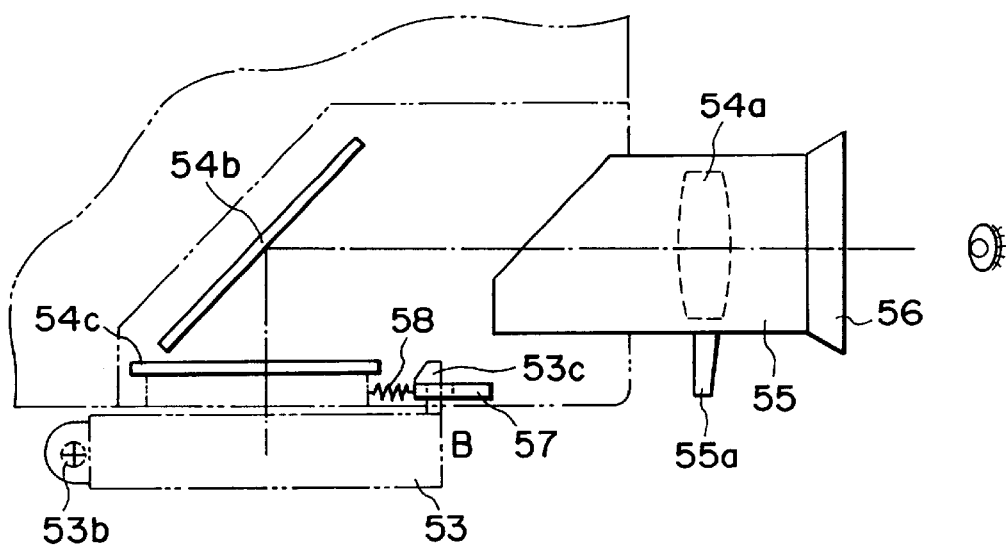
FIG. 20 is a perspective view of a part of an image sensing apparatus when a liquid crystal display is at a position B according to a fifth embodiment of the present invention.
Figure 21:
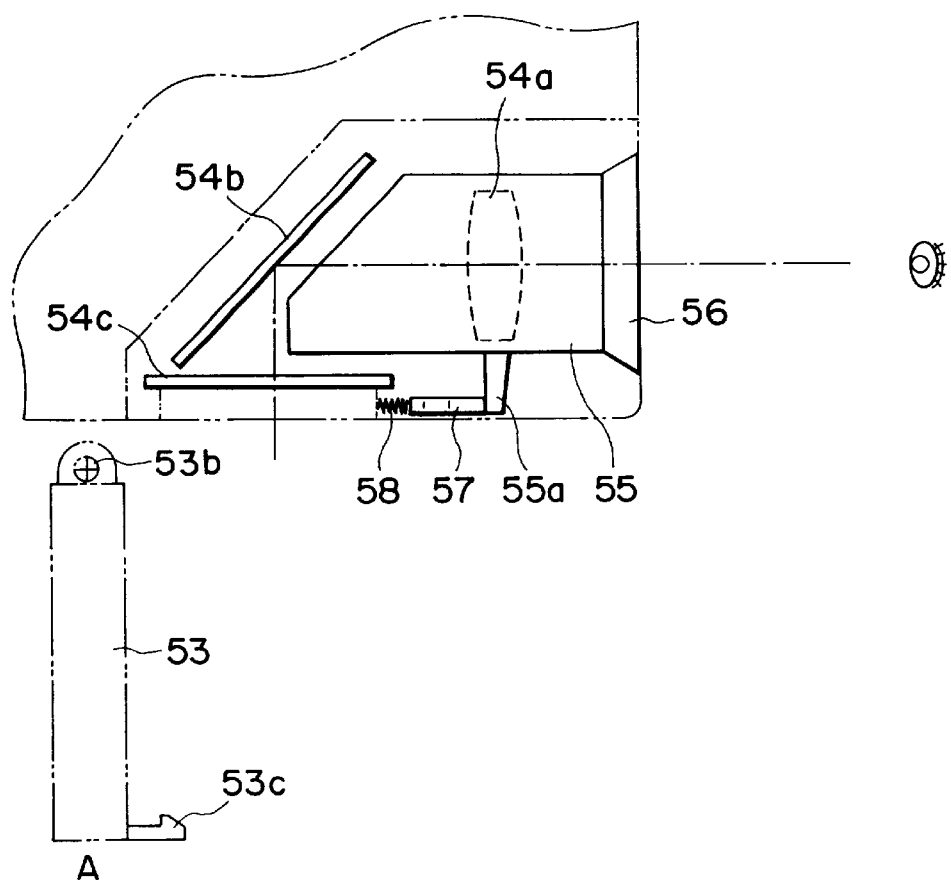
FIG. 21 is a perspective view of the part of the image sensing apparatus when the liquid crystal display is at a position A according to the fifth embodiment of the present invention.
Figure 22:
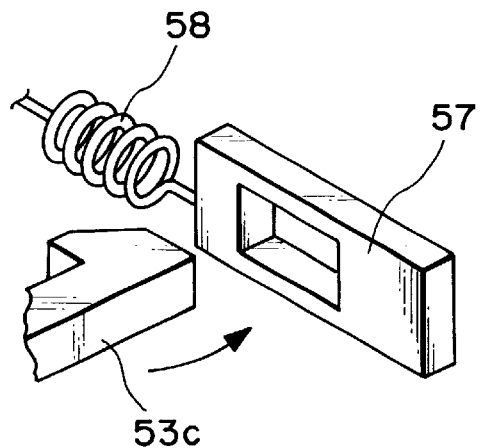
FIG. 22 shows a lock mechanism according to the fifth embodiment of the present invention.

FIG. 20 is a perspective view of a part of an image sensing apparatus according to the fifth embodiment of the present invention when an LCD 53 is in the position B, and FIG. 21 is a perspective view of the same part of the image sensing apparatus as shown in FIG. 20 when the LCD 53 is in the position A. FIG. 22 shows a lock mechanism shown in FIG. 20.

Referring to FIG. 20, the LCD 53 is in the position B (i.e., in the folded state). An image displayed on the LCD 53 is reflected by a mirror 54b by 90 degrees. Then, the image is formed by an eyepiece 54a at a position of an eye. Note, since the image displayed on the LCD 53 is reflected by the mirror 54b, it is necessary to display a mirror image of a sensed image on the LCD 53. Therefore, a position detection switch (not shown) which turns on when the LCD 53 is in the position B is provided.

Reference numeral 54c denotes a protection glass to prevent dust from entering the main body of the image sensing apparatus.

Further, a hook-shaped lock claw 53c is provided on the LCD 53, and a lock plate 57 having an engagement hole is provided in the main body of the image sensing device. The lock plate 57 is pushed toward the back of the image sensing device by a compression spring 58. In FIG. 20, the lock claw 53c of the LCD 53 is engaged and locked by the lock plate 57. FIG. 22 is an enlarged view for showing the lock mechanism.

The finder comprises the eyepiece 54a, a lens-barrel 55 for holding the eyepiece 54a, and an eye cup 56, and is capable of sliding along the optical axis of the eyepiece 54a between the position where the finder is settled inside of the main body of the image sensing apparatus (shown in FIG. 21) and the projecting position (shown in FIG. 20).

Referring to FIG. 21, by sliding the finder into the main body of the image sensing apparatus, a projection 55a which is a part of the lens-barrel 55 pushes the lock plate 57 to slide toward the front against the spring 58, thereby the lock is released and the LCD 53 can be rotated toward the position A. Further, the position detection switch (not shown) is turned off when the LCD 53 is rotated, and an normal image, instead of a mirror image, starts displayed on the LCD 53.

According to the fifth embodiment as described above, the LCD 53 can not be opened unless the finder is settled inside of the main body of the image sensing apparatus. In other words, when the user directly sees an image displayed on the LCD 53, the finder is always settled inside of the main body of the image sensing apparatus. Therefore, the finder does not disturb the user while watching the LCD 53.

Sixth Embodiment

Next, the sixth embodiment is explained with reference to drawings.

According to the first and third embodiment, dust may enter the finder 13 through the opening 3c. However, when the opening 3c is shielded by the mirror 4c as described in the second embodiment or by a glass as described in the fourth and fifth embodiment, the user touching the mirror 4c or the glass, and the mirror 4c or the glass would be stained. With the stains, when the LCD 3 or 53 is moved to the position B and the user sees an image displayed on the LCD 3 or 53 through the finder 13, the image would not look clear because of the stains.

The sixth embodiment is addressed to solving the foregoing problem.

Figure 23:
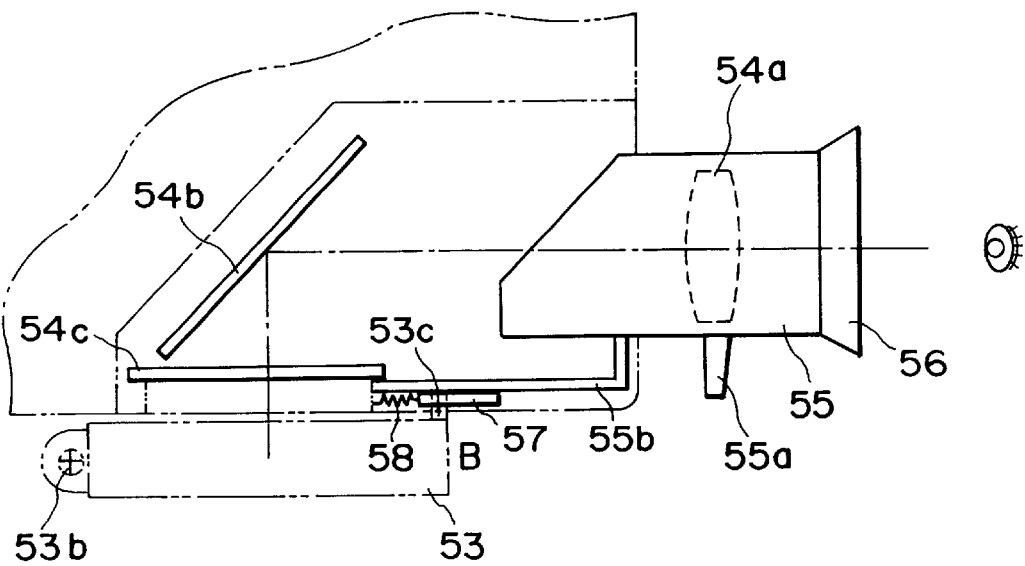
FIG. 23 is a perspective view showing an internal mechanism of a part of an image sensing apparatus when a liquid crystal display is at a position B according to a sixth embodiment of the present invention.
Figure 24:
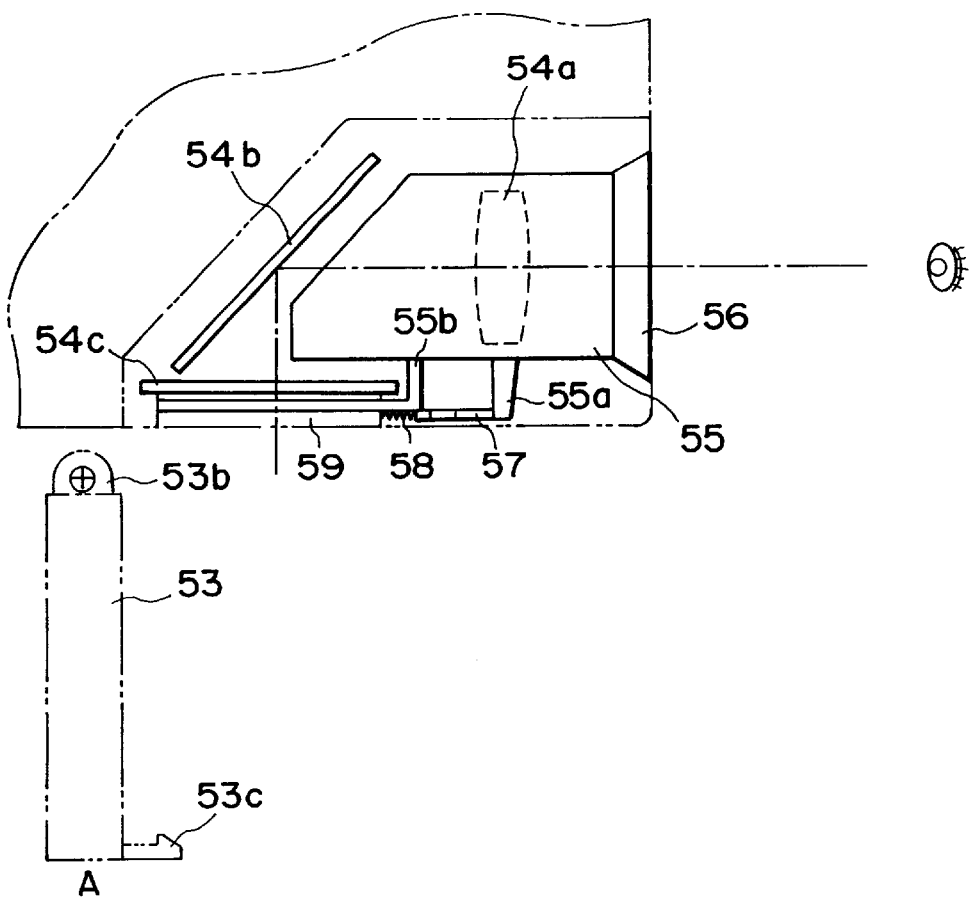
FIG. 24 is a perspective view showing the internal mechanism of the part of the image sensing apparatus when the liquid crystal display is at a position A according to the sixth embodiment of the present invention.
Figure 25:
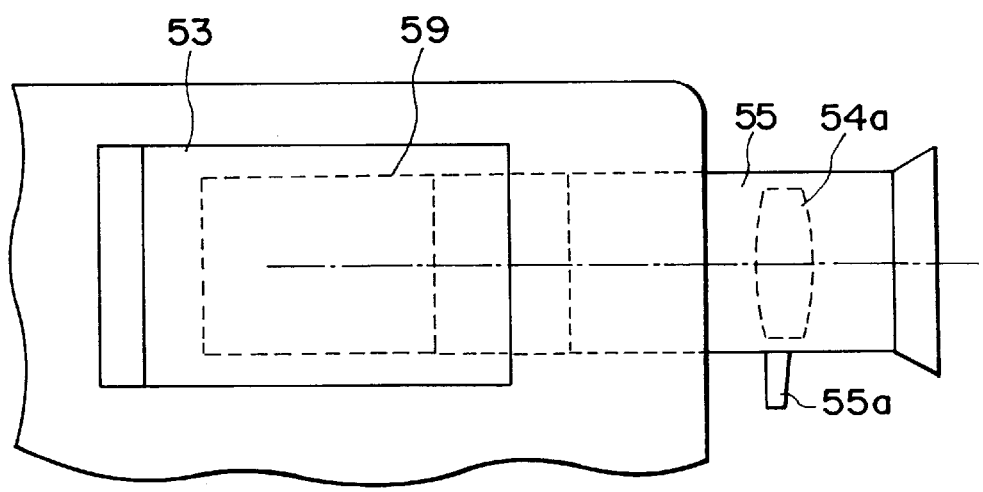
FIG. 25 is a view showing a part of the image sensing apparatus including an opening.

FIG. 23 is a perspective view showing an internal mechanism of a part of an image sensing apparatus according to the sixth embodiment of the present invention when the LCD 53 is in the position B, and FIG. 24 is a perspective view showing the internal mechanism of the same part of the image sensing apparatus shown in FIG. 23 when the LCD 53 is in the position A. FIG. 25 shows a part of the image sensing apparatus shown in FIG. 23 including an opening. In FIGS. 23 to 25, the same elements and units as those in FIGS. 20 and 21 are referred to by the same reference numerals, and explanation of them is omitted.

Referring to FIG. 23, the LCD 53 is in the position B (i.e., in the folded state). An image displayed on the LCD 53 is reflected by the mirror 54b by 90 degrees. Then, the image is formed by the eyepiece 54a at a position of an eye. Note, since the image displayed on the LCD 53 is reflected by the mirror 54b, it is necessary to display a mirror image of a sensed image on the LCD 53. Therefore, a position detection switch (not shown) which turns on when the LCD 53 is in the position B is provided.

To the lens-barrel 55, a shield 55b capable of covering an opening 59 of the main body of the image sensing apparatus when the finder is settled inside of the main body of the image sensing apparatus is attached, and the shield 55b slides as the finder slides along the optical axis. Further, similarly to the fifth embodiment, when the finder is completely settled inside of the main body of the image sensing apparatus, the projection 55a which is a part of the lens-barrel 55 pushes the lock plate 57 to slide toward the front against the spring 58, thereby the lock is released. Accordingly, when using the finder, the shield 55b is moved out from the opening 59; whereas, when the LCD 53 is in the position A as shown in FIG. 24, the finder is settled inside of the main body of the image sensing apparatus, and the shield 55b completely covers the opening 59.

According to the sixth embodiment as described above, when the LCD 53 is in the position A, no light, such as direct sunlight, enters through the opening 59. In this state, therefore, if the user looks into the finder, the user sees nothing in the finder. Further, since the shield 55b covers the protection glass 54c which is fit to the opening 59, it is possible to prevent the user from touching the protection glass 54c and the glass 54c is kept from dirt and stains.

Seventh Embodiment

The seventh embodiment of the present invention will be described below with reference to drawings.

Figure 26:
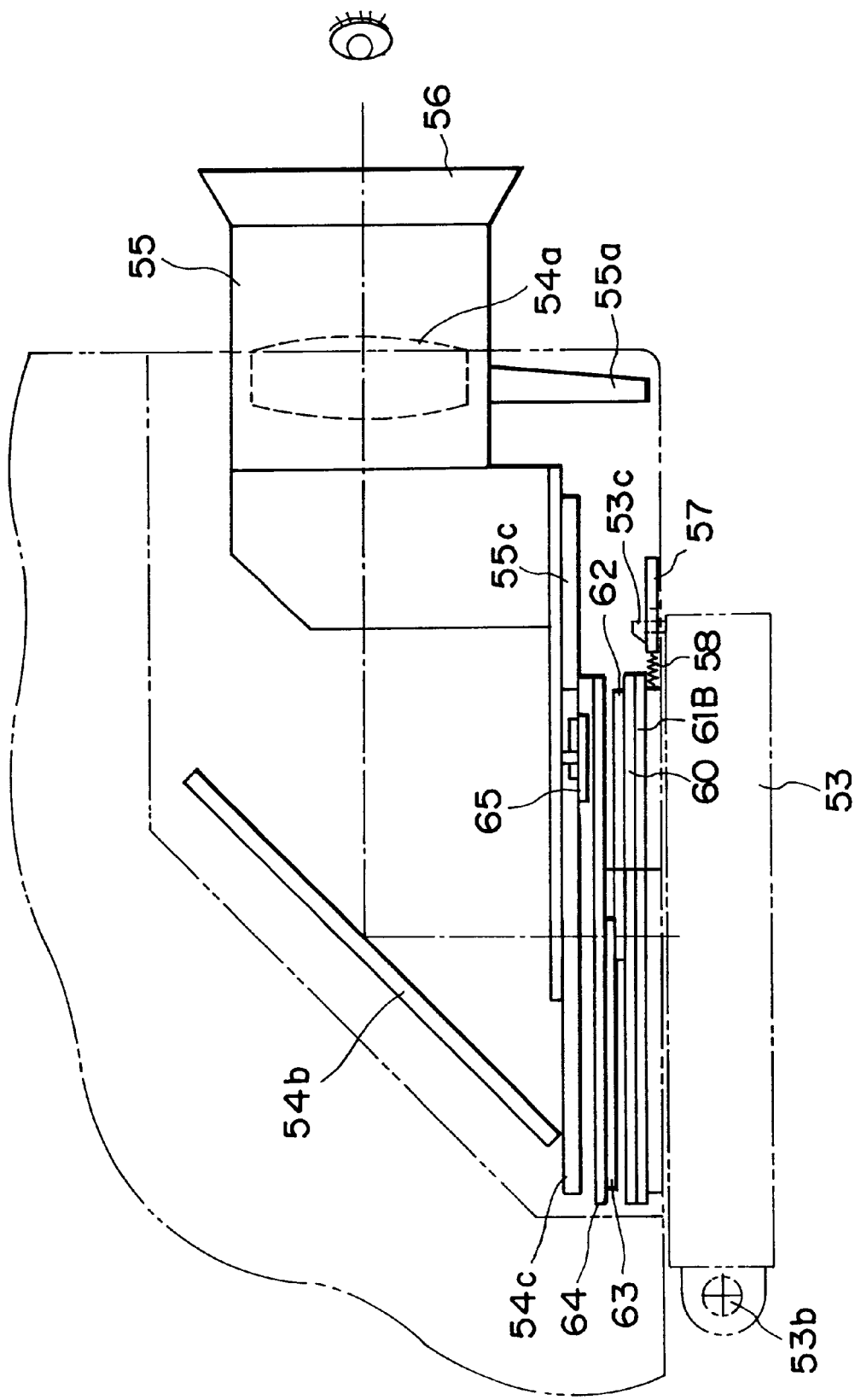
FIG. 26 is a perspective view showing an internal mechanism of a part of an image sensing apparatus when a liquid crystal display is at a position B according to a seventh embodiment of the present invention.
Figure 27:
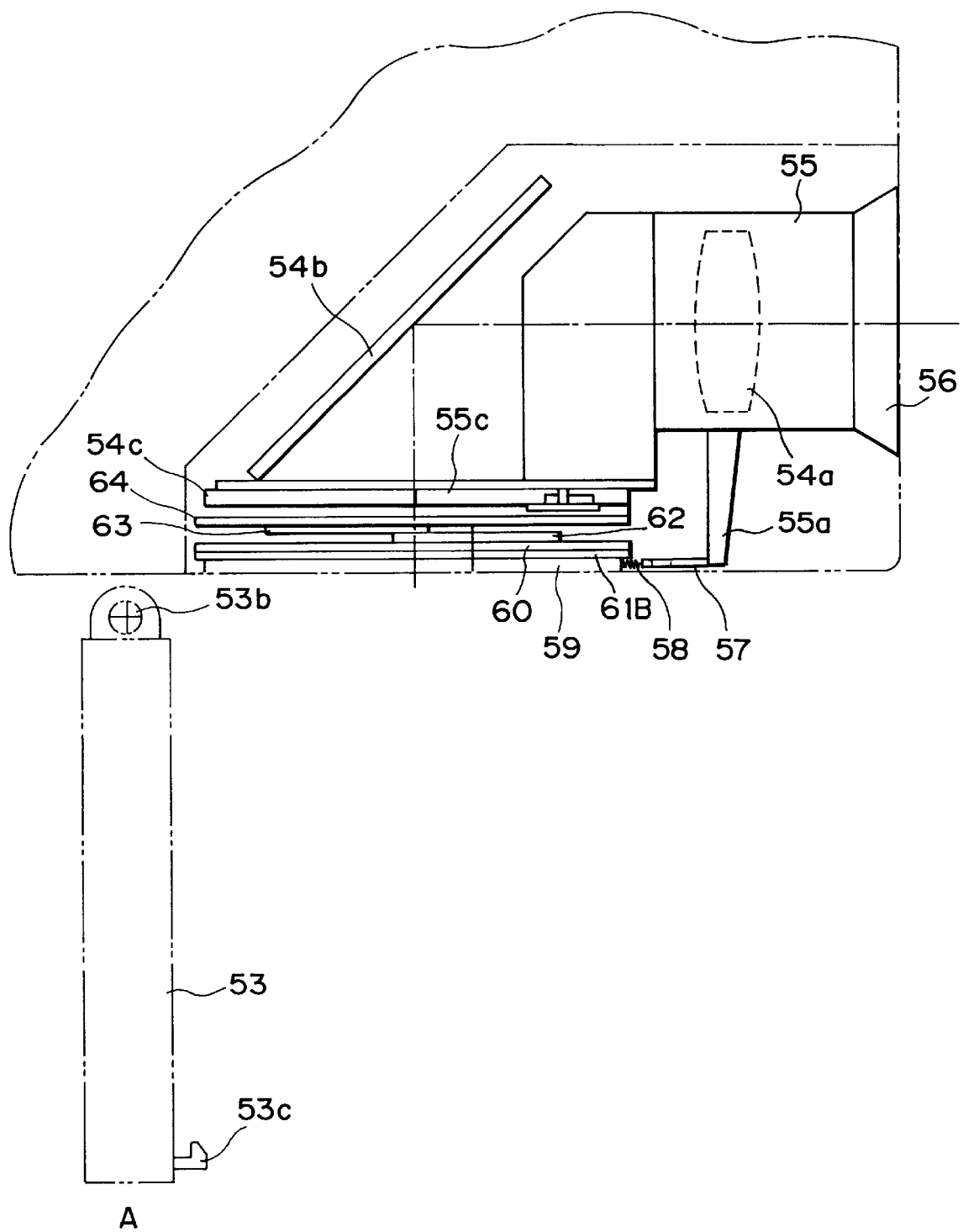
FIG. 27 is a perspective view showing the internal mechanism of the part of the image sensing apparatus when the liquid crystal display is at a position A according to the seventh embodiment of the present invention.
Figure 28:
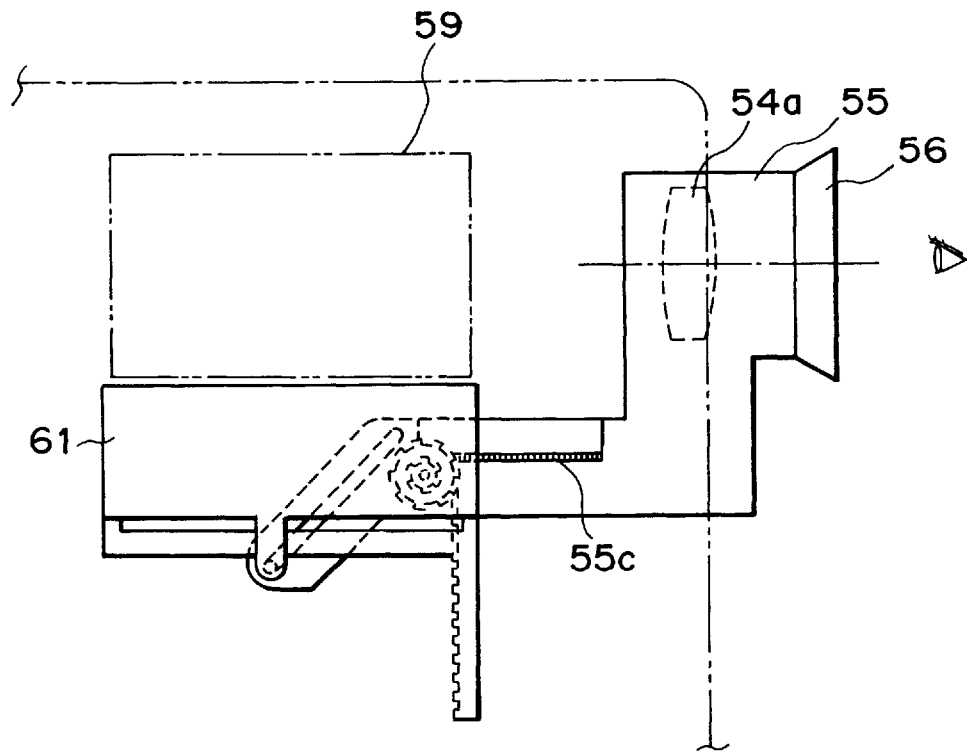
FIG. 28 is a view showing a part of the image sensing apparatus including an opening.
Figure 29:
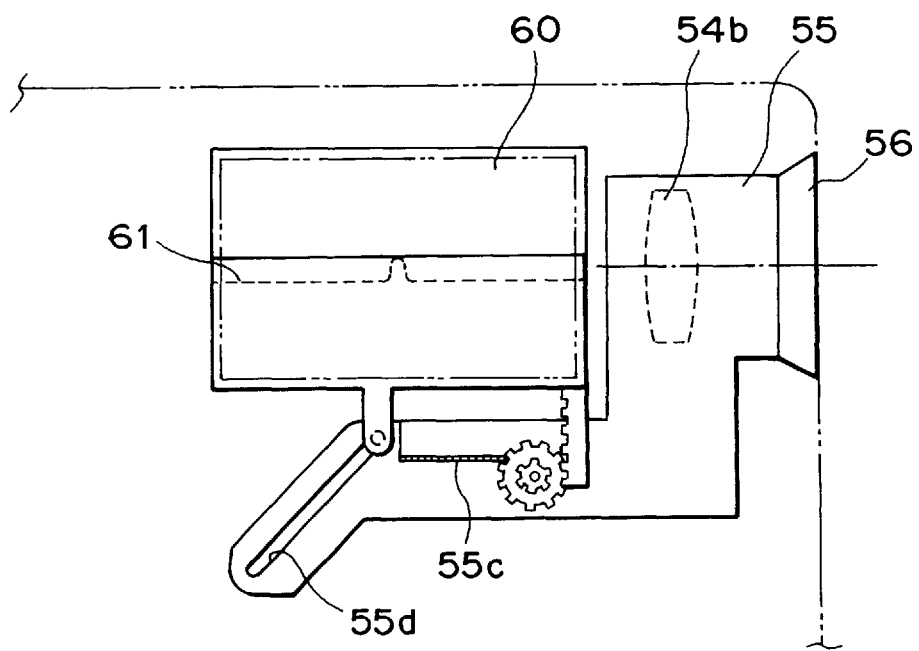
FIG. 29 is a view showing the part of the image sensing apparatus including the opening when a finder is settled inside of the main body of the image sensing apparatus.
Figure 30:
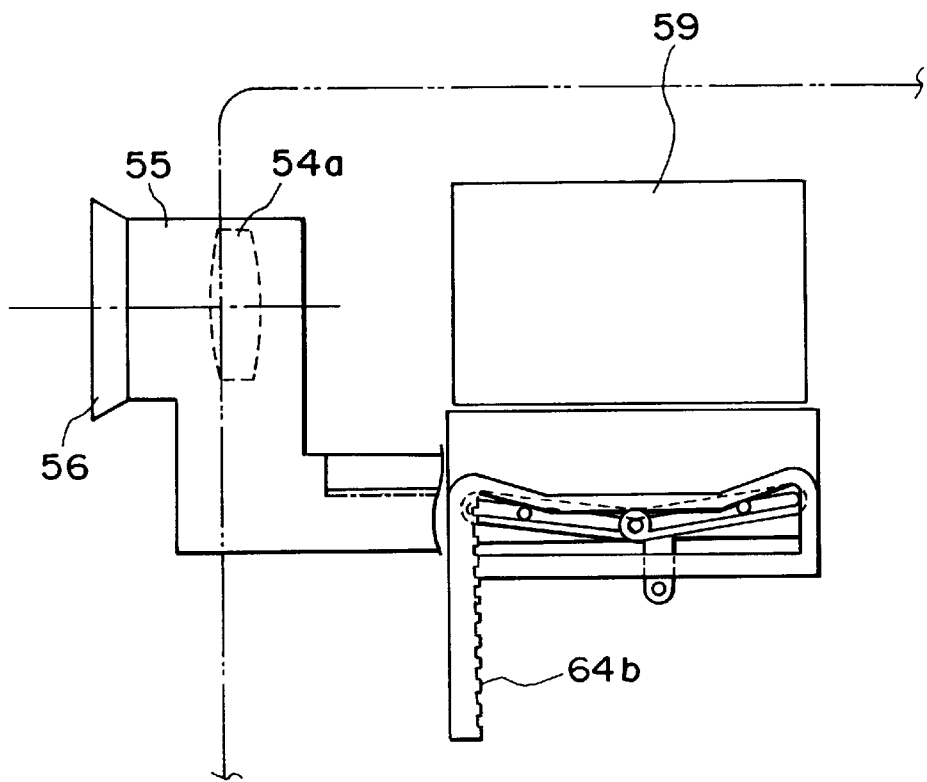
FIG. 30 is a view showing the part of the image sensing apparatus including the opening seen from the opposite side to that in FIG. 28.
Figure 31:
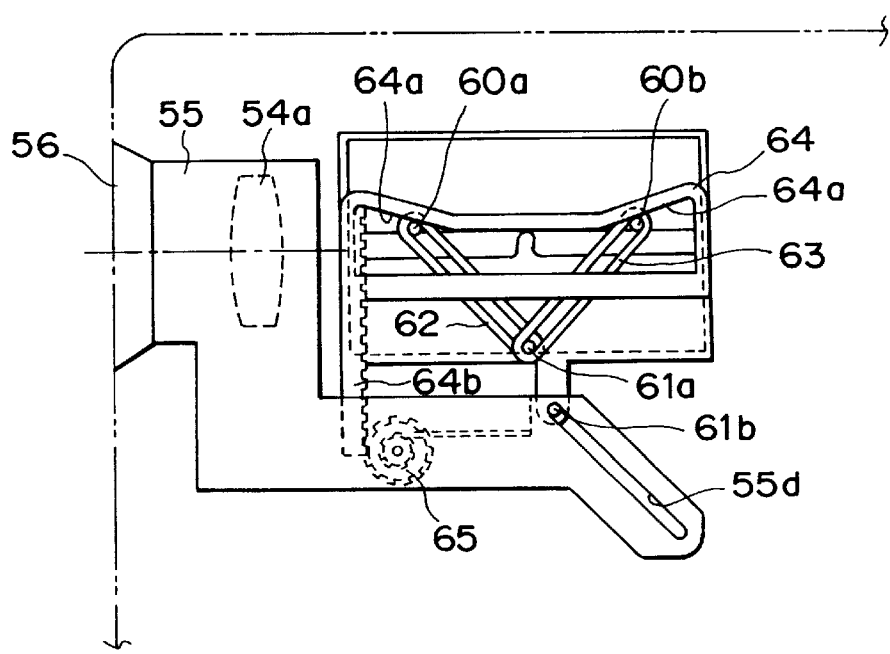
FIG. 31 is a view showing the part of the image sensing apparatus including the opening seen from the opposite side to that in FIG. 29.

FIG. 26 is a perspective view showing an internal mechanism of a part of an image sensing apparatus according to the seventh embodiment of the present invention when an LCD 53 is in the position B, and FIG. 27 is a perspective view showing the internal mechanism of the same part of the image sensing apparatus shown in FIG. 26 when the LCD 53 is in the position A. FIG. 28 is shows a part of the image sensing apparatus shown in FIG. 26 including an opening. FIG. 29 is a view showing the part of the image sensing apparatus including the opening when the finder is settled inside of the main body of the image sensing apparatus. FIG. 30 is a view showing the part of the image sensing apparatus including the opening seen from the opposite side to that in FIG. 28, and FIG. 31 is a view showing the part of the image sensing apparatus including the opening seen from the opposite side to that in FIG. 29. In FIGS. 26 to 31, the same elements and units as those in FIGS. 20 and 21 are referred to by the same reference numerals, and explanation of them is omitted.

Referring to FIGS. 26 and 27, the LCD 53 is rotatable from the position B (in the folded state), to the position A where the LCD 53 and the main body of the image sensing apparatus make an angle of about 90 degrees about the shaft 53b, similarly to the above embodiments. The finder comprises the eyepiece 54a, the lens-barrel 55, and the eye cup 56, and is capable of sliding along the optical axis of the eyepiece 54a. The mirror 45a is set so that its surface makes an angle of 45 degrees with respect to the optical axis of the eyepiece 54a. Further, near the opening portion 59, the protection glass 54c is set for preventing dust from entering the main body of the image sensing apparatus.

In the image sensing apparatus having the above configuration, when the LCD 53 is in the position B, an image displayed on the LCD 53 passes through the protection glass 54c, is reflected by the mirror 54b by 90 degrees, and the eyepiece 54a forms the image at the position of an eye. In this state, it is necessary to display a mirror image of a sensed image on the LCD 53, as described in the foregoing embodiments.

Further, in the side of the opening 59 of the protection glass 54c, an upper slide plate 60 and a lower slide plate 61, which partly overlap each other, are supported so as to be movable in the vertical direction of the image sensing apparatus. On the backside of the lower slide plate 61 (FIG. 31), ends of two levers 62 and 63 are supported by a shaft 61a so as to be rotatable, and the other ends of the levers 62 and 63 are separately supported by shafts 60a and 60b on the backside of the upper slide plate 61. A helical torsion coil spring (not shown) is set around the shaft 61a of the lower slide plate 61, and the two levers 62 and 63 are always pushed toward in the different directions.

Further, on the backside of the levers 62 and 63, a cam plate 64, having a cam surface 64a, which moves while touching the shaft 60a and 60b of the upper slide plate 60 is provided so as to be capable of sliding. In a part of the cam plate 64, a rack 64b is provided. The rack 64b meshes with an outer gear of a dual gear 65 which is supported by a shaft projecting from the main body of the image sensing apparatus. An inner gear of the dual gear 65 meshes with a rack 55c provided outside of the lens-barrel 55. A cam groove 55d is curved on the lens-barrel 55 so that an engaging boss 61b at an end of the slide plate 61 slides inside the cam groove 55d.

Next, an operation of taking out the finder from the position inside the main body of the image sensing apparatus, having the above configuration, to a projecting position where the finder is used is explained.

When the finder is settled inside of the main body of the image sensing apparatus (FIGS. 29 and 31), the opening 59 is shielded by the upper slide plate 60 and the lower slide plate 61. When pulling out the finder, the lower slide plate 61 slides below the opening 59 lead by the cam groove 55d of the lens-barrel 55. At the same time, the dual gear 65 which meshes with the rack 55c of the lens-barrel 55 rotates, and the cam plate 64 which meshes with the outer gear of the dual gear 65 slide downward. Then, the upper slide plate 60 having two shafts 60a and 60b which slides on the cam surface 64a of the cam plate 64 also moves downward against the motion of the levers 62 and 63 which tend to move upward due to force of the helical torsion coil spring.

As a result, the slide plates 60 and 61 completely moves out from the opening 59 when the finder is in the projecting position, and an image displayed on the LCD 53 can be seen through the finder.

Regarding an operation of pushing the finder into the main body of the image sensing apparatus from the projecting position, the operation is the reverse of the aforesaid operation. Then, if the finder is pushed toward the main body of the image sensing apparatus again, the upper slide plate 60 and the lower slide plate 61 shield the opening 59. Note, similarly to the fifth end sixth embodiment, when the finder is completely settled inside of the main body of the image sensing apparatus, the projection 55a which is a part of the lens-barrel 55 pushes the lock plate 57 to slide toward the front against the spring 58, thereby the lock is released.

According to the seventh embodiment as described above, when a user watches the LCD, light, such as direct sunlight, does not enter from the opening 59. In this state, therefore, if the user looks into the finder, the user sees nothing in the finder. Further, since the shield 55b covers the protection glass 54c which is fit to the opening 59, it is possible to prevent the user from touching the protection glass 54c and the glass 54c is kept from dirt and stains.

Note, in the sixth and seventh embodiments, the opening 59 is shielded by the protection glass; however, the protection glass it not always necessary in the present invention.

Eighth Embodiment

Next, the eighth embodiment of the present invention is explained with reference to drawings.

Figure 32:
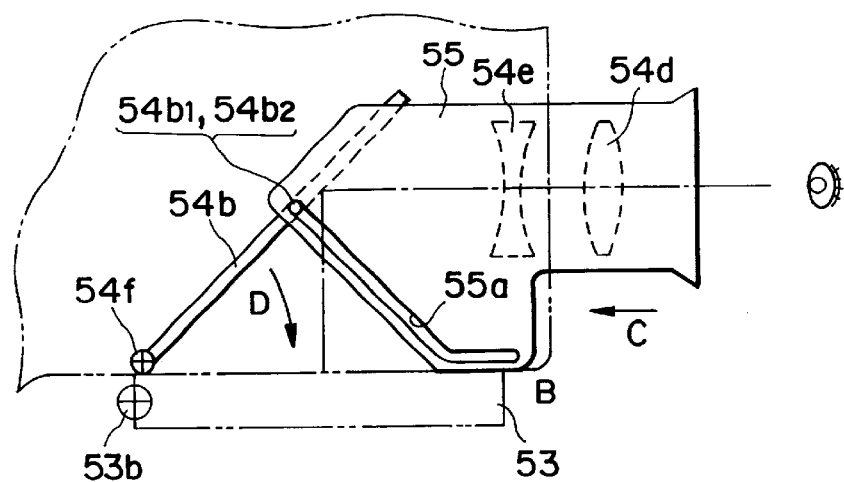
FIG. 32 is a perspective view showing an internal mechanism of a part of an image sensing apparatus when a liquid crystal display is at a position B according to an eighth embodiment of the present invention.
Figure 33:
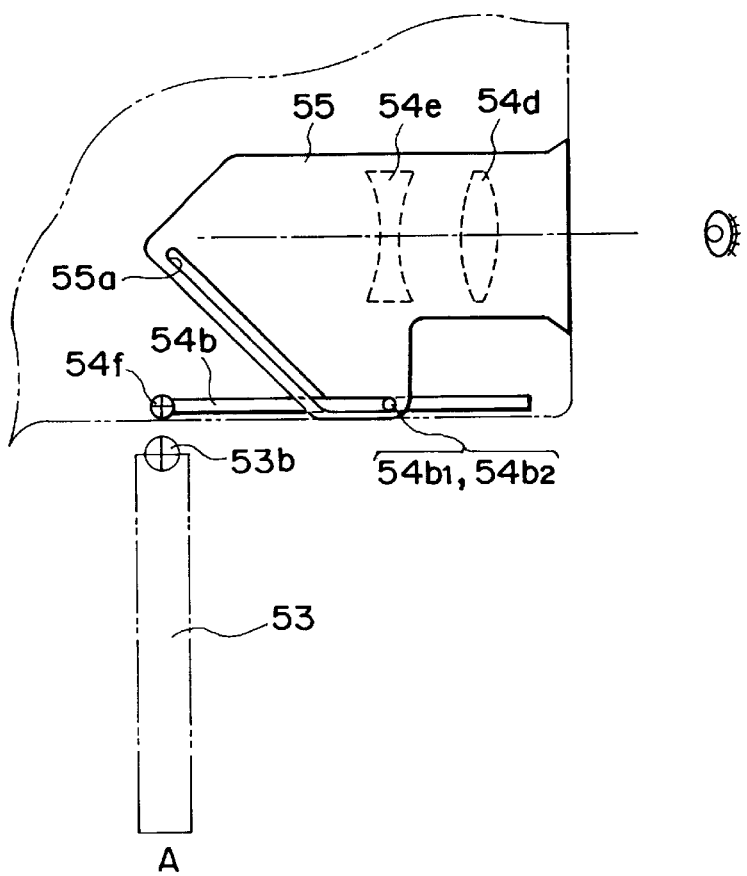
FIG. 33 is a perspective view showing the internal mechanism of the part of the image sensing apparatus when the liquid crystal display is at a position A according to the eighth embodiment of the present invention.
Figure 34:
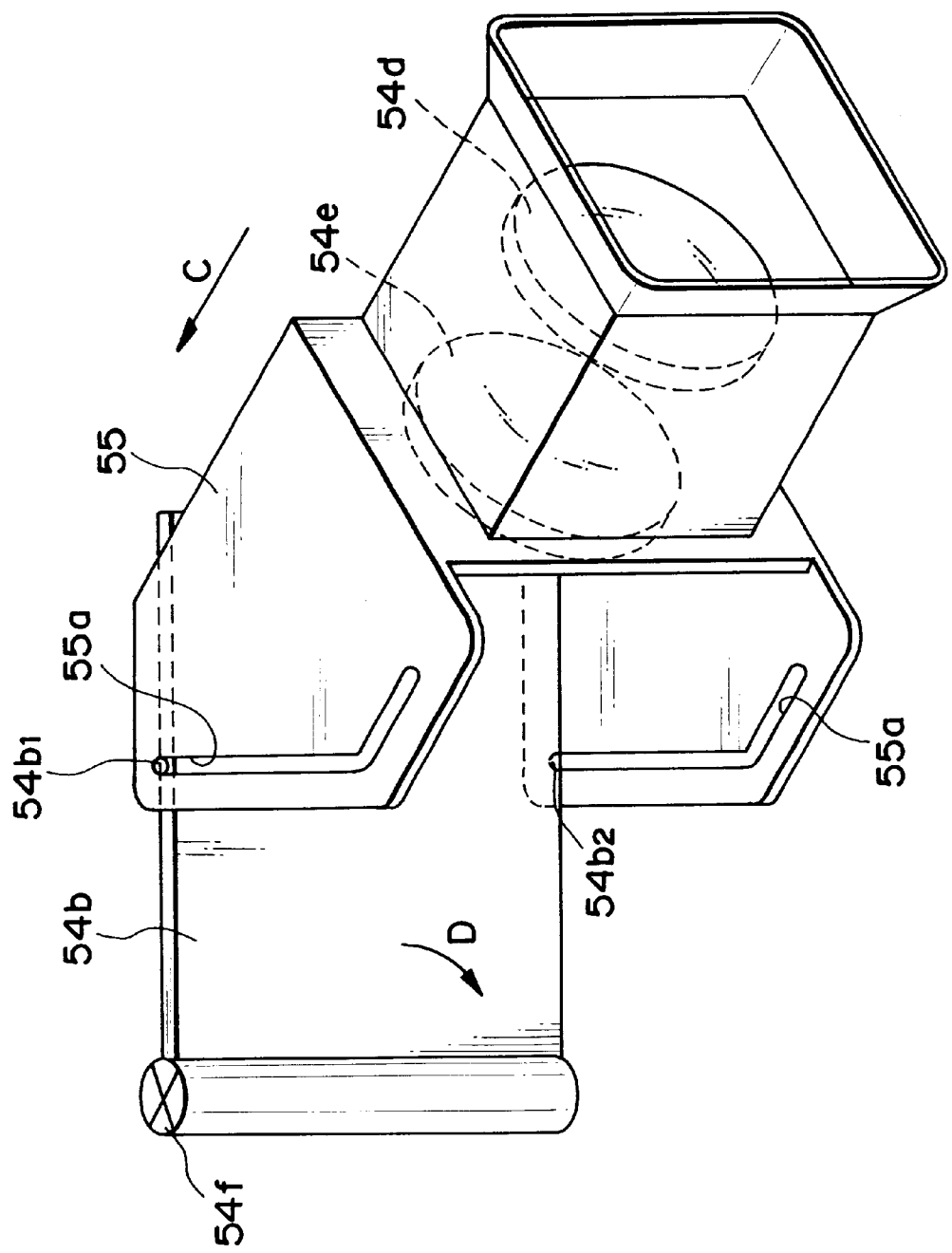
FIG. 34 is a perspective view of the part of the image sensing apparatus as shown in FIG. 32.

FIG. 32 is a perspective view showing an internal mechanism of a part of an image sensing apparatus according to the eighth embodiment of the present invention when an LCD 53 is in the position B, and FIG. 33 is a perspective view showing an internal mechanism of the same part of the image sensing apparatus shown in FIG. 32 when the LCD 53 is in the position A. FIG. 34 is a perspective transparent view of the same part of the image sensing apparatus shown in FIG. 32. In FIGS. 32 to 34, the same elements and units as those in FIGS. 20 and 21 are referred to by the same reference numerals, and explanation of them is omitted.

Referring to FIG. 32, a convex lens 54d and a concave lens 54e together have a predetermined power and are held at a predetermined interval inside of the lens-barrel 55. The lens-barrel is movable along the optical axis of the lenses 54d and 54e, namely, in the direction of an arrow C in FIG. 32, by a predetermined amount. Further, the mirror 54b is rotatable about a shaft 54f. Two bosses $54b_1$ and $54b_2$ projecting from the mirror 54b on the sides at symmetry positions are engaged with cam grooves $55a_1$ and $55a_2$ on the lens-barrel 55, thus move along the cam grooves $55a_1$ and $55a_2$.

When the LCD 53 is in the position A where an image displayed on the LCD 53 is directly seen, as shown in FIG. 33, the finder is useless. Accordingly, the lens-barrel 55 is moved in the direction of the arrow C shown in FIG. 32, by a predetermined amount to insert it into the main body of the image sensing apparatus. As the lens-barrel 55 is pushed inside, the mirror 54b rotates in the direction of an arrow D (shown in FIGS. 32, 34) about the shaft 54f caused by the movement of the bosses $54b_1$ and $54b_2$ guided by the cam grooves $55a_1$ and $55a_2$.

The cam grooves $55a_1$ and $55a_2$ have a shape so that the mirror 54b and the concave lens 54e do not interfere each other when the mirror 54b rotates as the concave lens 54e moves in the direction of the arrow C. More specifically, the shape of the cam grooves $55a_1$ and $55a_2$ is designed so that after the mirror 54b rotates to be out of the insertion path of the concave lens 54e, the concave lens 54e moves deeper inside of the main body of the image sensing apparatus in the direction of the arrow C until the finder is completely settled inside of the main body of the image sensing apparatus.

According to the eighth embodiment of the present invention, the concave lens 54e can enter the space for the mirror 54b to rotate; therefore, the finder is completely inserted into the main body of the image sensing apparatus until the finder does not project from the image sensing apparatus at all.

Note, in the eighth embodiment, two lenses, namely the convex lens 54d and the concave lens 54e are used, however, the present invention is not limited to this, and a single convex spherical lens may replace the two lenses as described in the fifth to seventh embodiments.

According to the eighth embodiment as described above, since the finder is completely inserted into the main body of the image sensing apparatus, it does not disturb a user when directly watching the LCD. In addition, portability is improved.

Ninth Embodiment

Reduction of thickness and size of an image sensing apparatus has been considered as an important subject for improving portability and operability.

Figure 43:
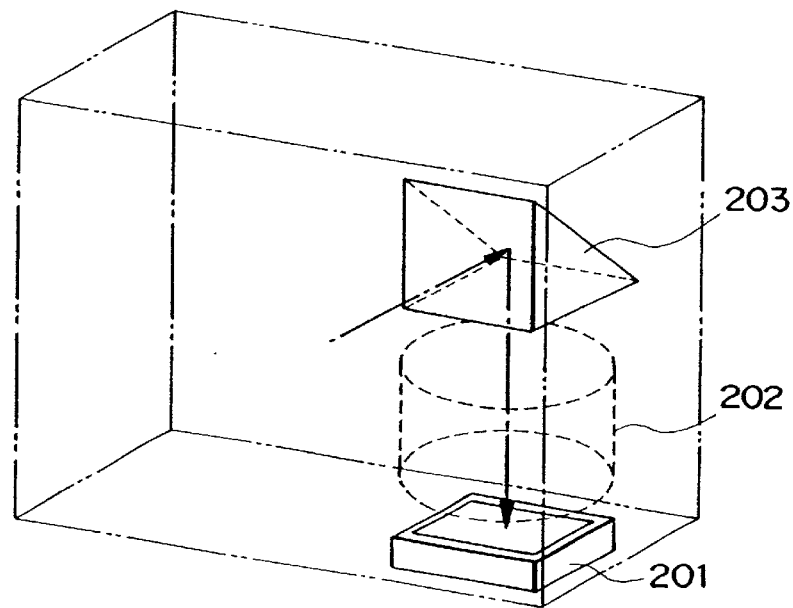
FIG. 43 is a brief perspective view of a conventional image sensing apparatus.
Figure 44:
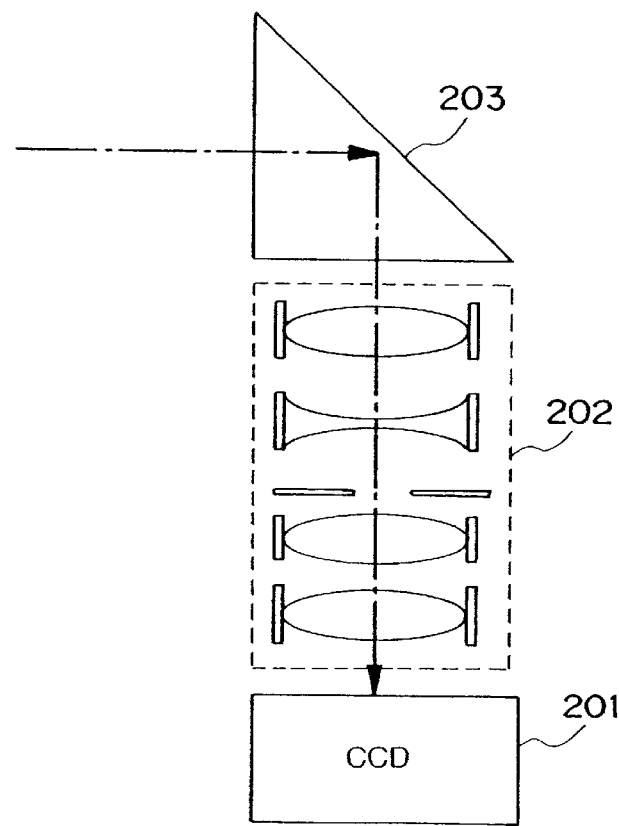
FIG. 44 is a schematic cross-sectional view of a conventional lens unit.

FIG. 43 is a schematic view of a conventional image sensing apparatus designed to decrease the thickness of the apparatus, and FIG. 44 is a schematic cross-sectional view of a lens system of the image sensing apparatus shown in FIG. 43. As shown in FIGS. 43 and 44, a prism 203 for reflecting incoming light at an right angle, approximately, is provided for decreasing the thickness of the image sensing apparatus, and a lens unit 202 is provided below the prism 203. An image of an object forms on an image sensing device 201, provided below the prism 203, via an iris diaphragm, a focus lens, and a zoom lens, for instance.

The ninth embodiment is addressed to providing an image sensing apparatus capable of using an image displayed on a relatively large liquid crystal monitor as an image observed through a finder without increasing the thickness of the image sensing apparatus as described above.

Figure 35:
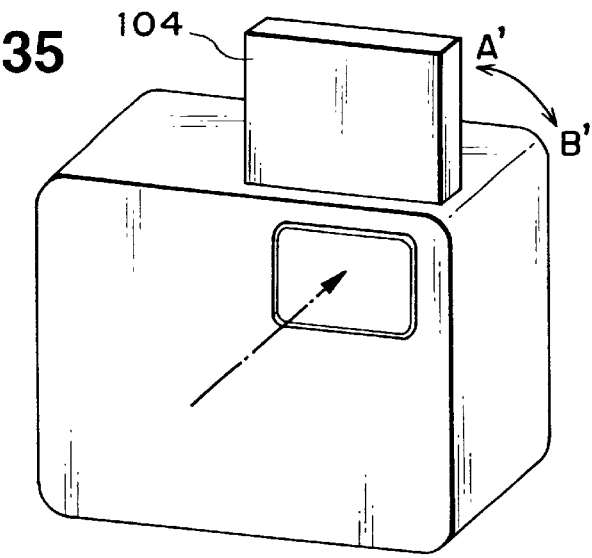
FIG. 35 is a brief external view of an image sensing apparatus according to a ninth embodiment of the present invention.
Figure 36:
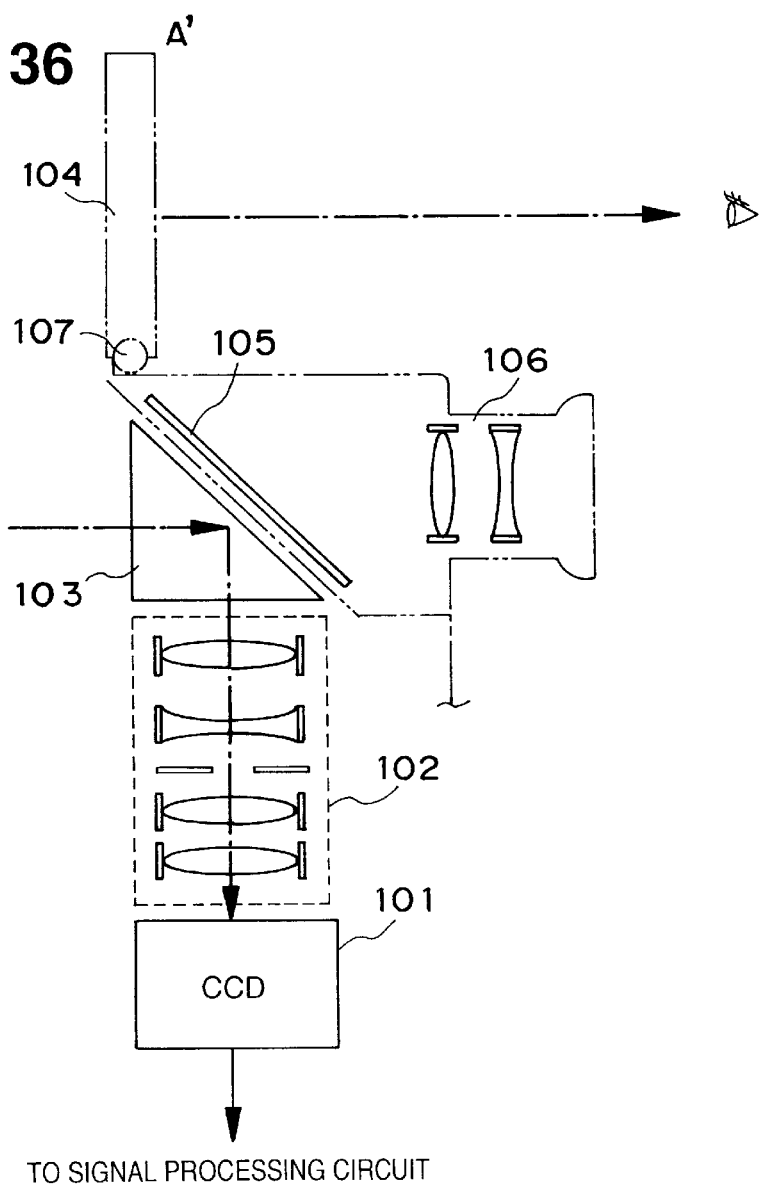
FIG. 36 is a perspective view of a part of the image sensing apparatus including a lens unit according to the ninth embodiment of the present invention.
Figure 37:
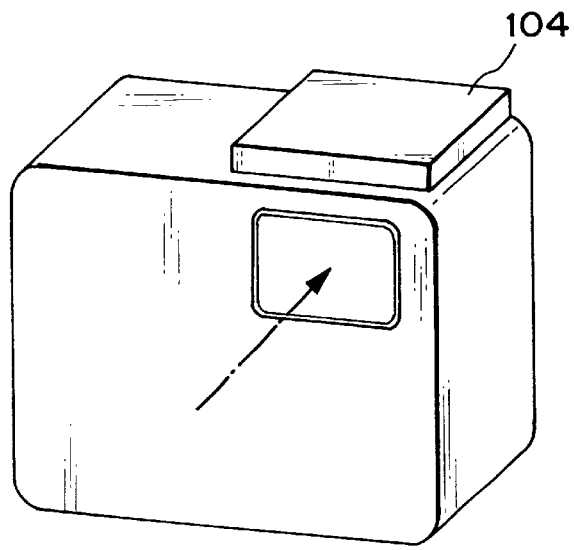
FIG. 37 is a brief external view of the image sensing apparatus according to the ninth embodiment of the present invention.
Figure 38:
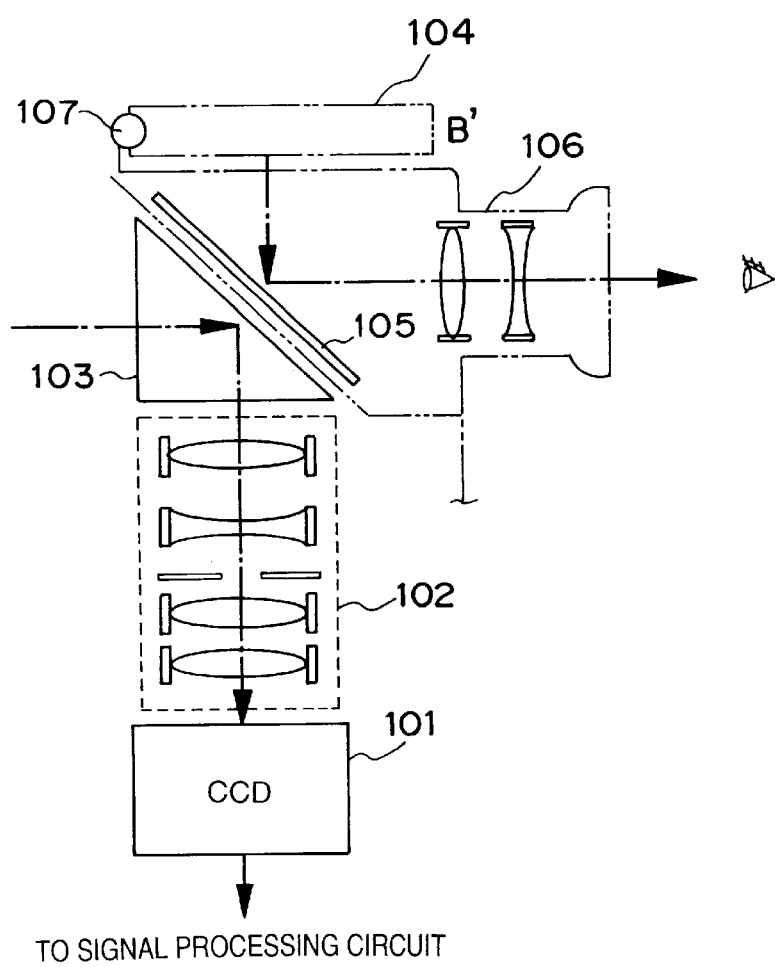
FIG. 38 is a perspective view of the part of the image sensing apparatus including the lens unit according to the ninth embodiment of the present invention.

FIGS. 35 and 37 are brief external views of an image sensing apparatus according to the ninth embodiment, and FIGS. 36 and 38 are perspective views of a part of the image sensing apparatus including a lens unit.

In FIGS. 35 to 38, reference numeral 101 denotes an image sensing device, such as CCD, for converting an optical image into electric signals; 102, a lens unit including an iris diaphragm, a focus lens, and a zoom lens; and 103, a prism which reflects light at a right angle toward downward.

Further, reference numeral 106 denotes a finder; 104, a liquid crystal display (LCD) for displaying a sensed image; and 105, a mirror, provided on the back of the prism to save space, for reflecting an image displayed on the LCD 104 at a right angle toward the finder 106 as shown in FIG. 38; and 107, a rotation member for allowing the LCD 104 freely rotate between the position A' (FIG. 36) and the position B' (FIG. 38).

In the state as shown in FIGS. 35 and 36, a displayed image on the LCD 104 is directly seen. In this case, it is possible for a plurality of individuals to see the image on the LCD 104 simultaneously.

Whereas, in the state as shown in FIGS. 37 and 38, an image displayed on the LCD 104 is reflected by the mirror 105, and the image can be seen through the finder 106. In this state, a sensed image is easily checked in the bright environment, such as outside during daytime.

Further, when the LCD 104 is in the position B', the order of image signals to be displayed on the LCD is changed upside-down by a signal processing circuit (not shown).

According to the ninth embodiment as described above, the mirror 105 for reflecting an image displayed on the LCD 104 is provided on the back of the prism 103 which reflects incoming light from an object. Accordingly, without increasing the thickness and size of the image sensing apparatus, the image sensing apparatus having both a large monitor and a finder is provided. Further, since an image displayed on the monitor is observed through the finder, energy consumption is kept relatively low.

Note, the mirror 105 is placed on the back of the prism 103, however, the present invention is not limited to this, and a mirror may be used instead of the prism 103.

Modification of the Ninth Embodiment

FIGS. 39 to 42 show an image sensing apparatus capable of enabling a user to take an image of an object in the user's side.

Figure 39:
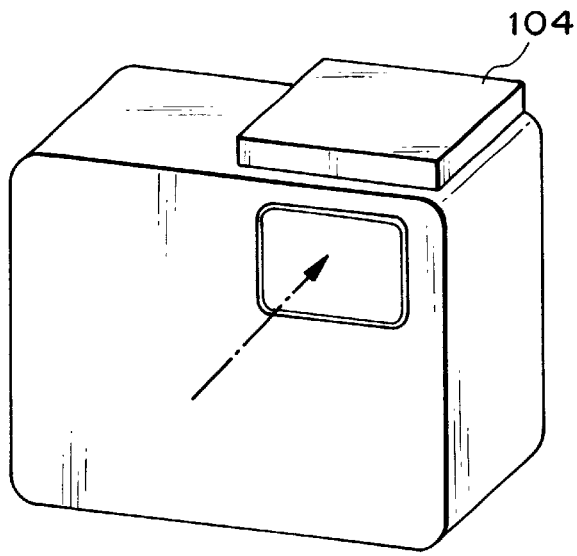
FIG. 39 is a brief external view of an image sensing apparatus according to a modification of the ninth embodiment of the present invention.
Figure 40:
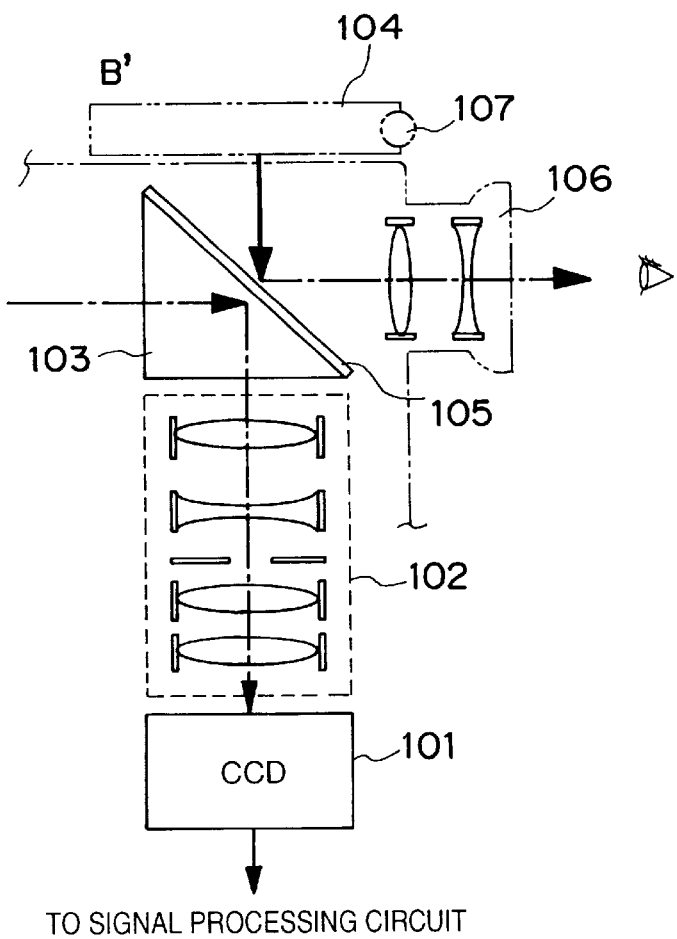
FIG. 40 is a perspective view of a part of the image sensing apparatus including a lens unit according to the modification of the ninth embodiment of the present invention.
Figure 41:
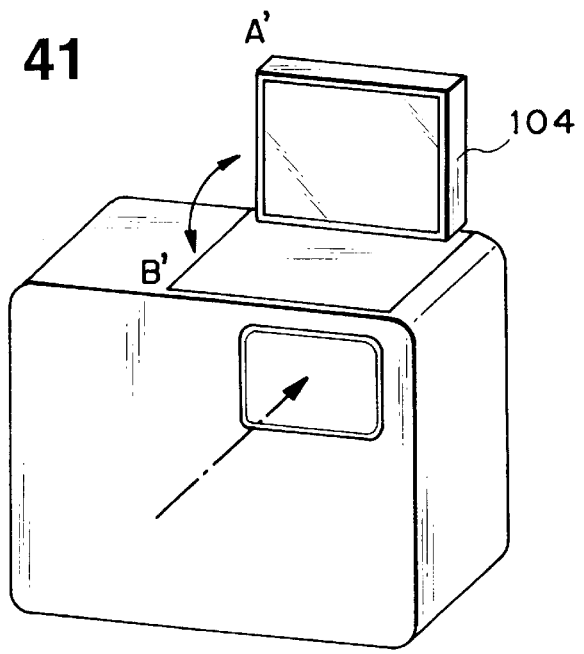
FIG. 41 is a brief external view of the image sensing apparatus according to the modification of the ninth embodiment of the present invention.
Figure 42:
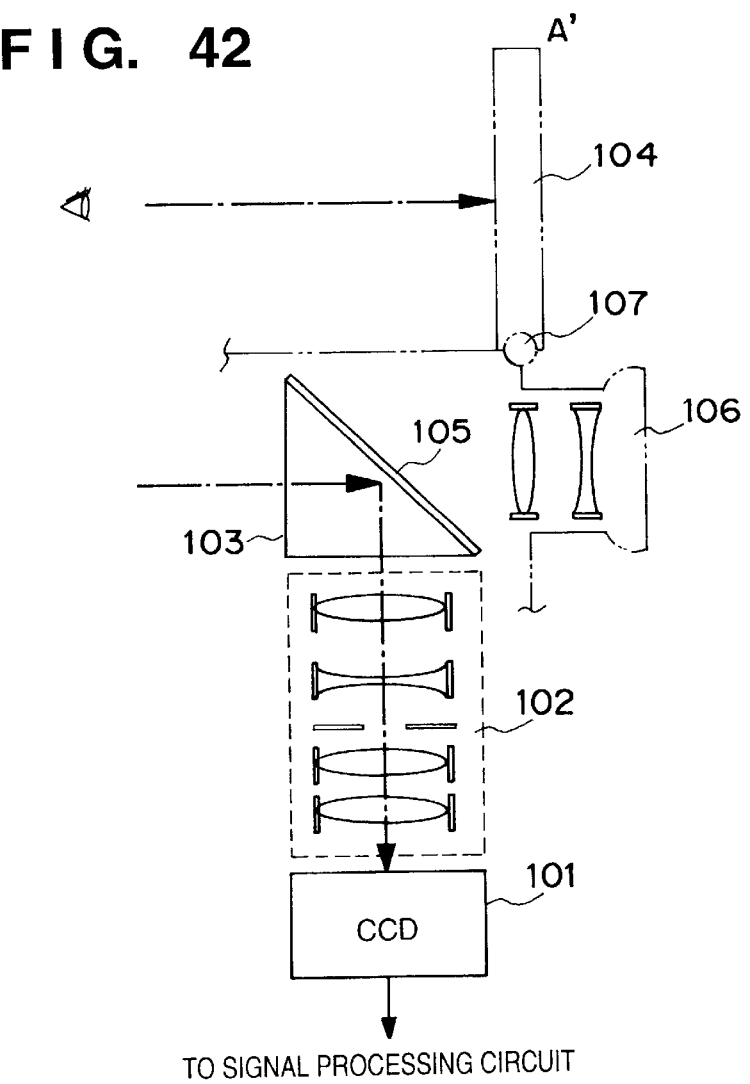
FIG. 42 is a perspective view of the part of the image sensing apparatus including the lens unit according to the modification of the ninth embodiment of the present invention.

FIG. 39 is a brief external view of an image sensing apparatus when a user checks a sensed image through a finder according to the modification of the ninth embodiment, and FIG. 40 is a perspective view of a part of the image sensing apparatus, shown in FIG. 39, including a lens unit. Further, FIG. 41 is a brief external view of the image sensing apparatus when a user checks a sensed image of an object that is in the user's side by watching the LCD 104. FIG. 42 is a perspective view of the part of the image sensing apparatus, shown in FIG. 41, including the lens unit. In FIGS. 39 to 42, the same units and elements as those shown in FIGS. 35 to 38 are referred to by the same reference numerals, and explanation of them is omitted.

Referring to FIGS. 39 to 42, the rotation member 107 is arranged in the side of the finder 106. Therefore, when the LCD 104 is in the position A', as shown in FIGS. 41 and 42, a screen of the LCD 104 faces an object. Whereas, when the LCD 104 is in the position B', an image displayed on the LCD 104 is reflected by the mirror 105, and the reflected image can be seen through the finder 106.

According to the modification of the ninth embodiment as described above, by providing the rotation member 107 near the finder 106, it is possible for the user to check a sensed image of an object which is in the user's side.

Note, in the Ninth embodiment and its modification, the LCD 104 is designed rotatable in the range between the positions A' and B'; however, it is obvious for those skilled in the art that the LCD 104 may be designed rotatable about an axis which is normal to the main body of the image sensing apparatus when the LCD 104 is in the position A'.

Tenth Embodiment

In the tenth embodiment, method for controlling the luminosity of back light of an LCD of an image sensing apparatus as described in the foregoing embodiments is explained.

Figure 46:
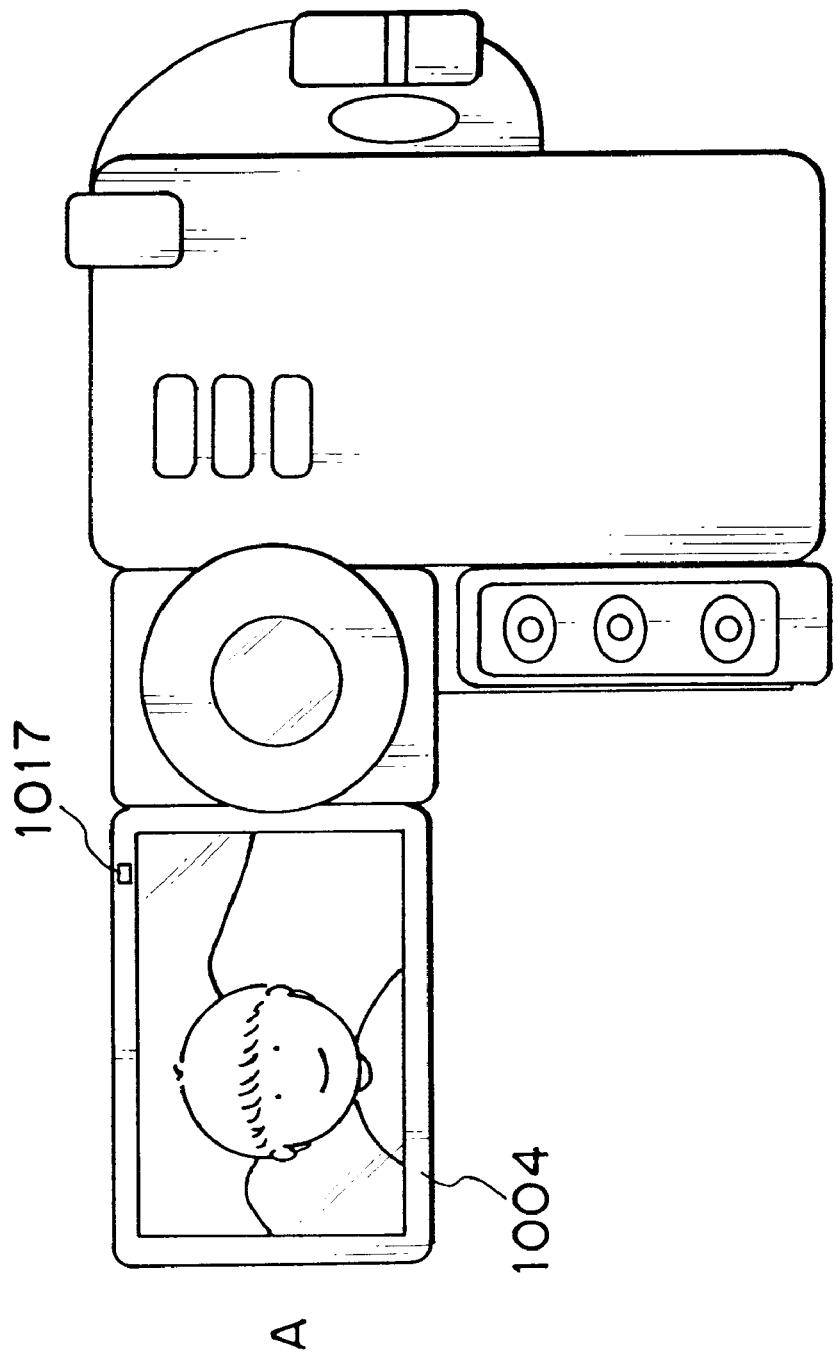
FIG. 46 is a back view of the image sensing apparatus according to the tenth embodiment of the present invention.

FIG. 46 is an external view of an image sensing apparatus, according to the tenth embodiment, seen from the back when a liquid crystal display (LCD) 1004 is at a position A where an image displayed on the LCD 1004 can be directly seen. In the tenth embodiment, a transparent type liquid crystal display is used as the LCD 1004, and a screen of the LCD 1004 is illuminated from the back by back light. In the state shown in FIG. 46, the screen of the LCD 1004 is approximately perpendicular to the optical axis of the image sensing apparatus.

Figure 47:
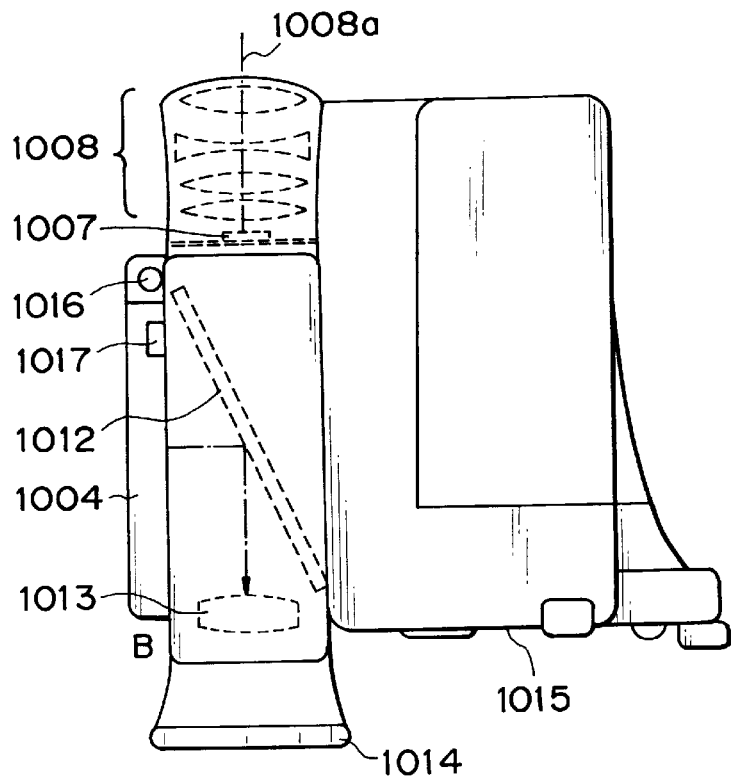
FIG. 47 is a top view of the image sensing apparatus according to the tenth embodiment of the present invention.
Figure 48:
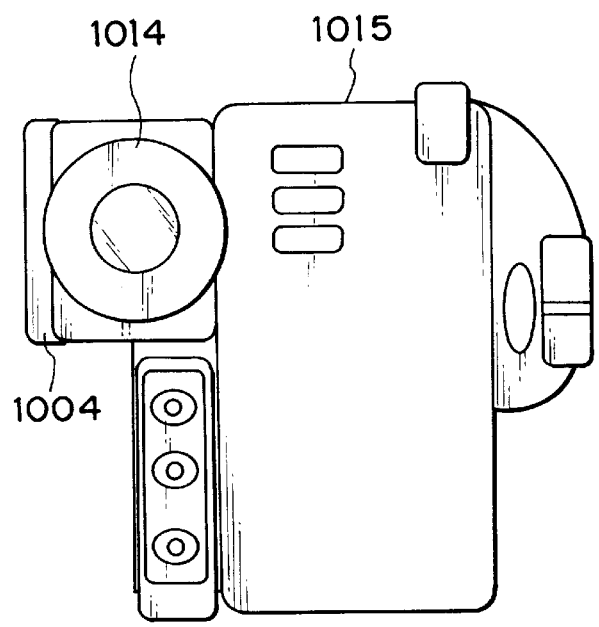
FIG. 48 is a back view of the image sensing apparatus according to the tenth embodiment of the present invention.

FIG. 47 is a top view and FIG. 48 is a back view of the image sensing apparatus when the LCD 1004 is folded up by the side of a main body 1015 of the image sensing apparatus (position B) and an image displayed on the LCD 1004 can be seen through a finder 1014.

In FIG. 47, reference numeral 1008 denotes a lens unit for adjusting, e.g., zooming and focusing; 1007, an image sensing device, such as a CCD, for converting light incoming through the lens unit 1008 into electric signals; and 1008a, an optical axis of the lens unit 1008.

Further, reference numeral 1012 denotes a mirror for reflecting an image displayed on the LCD 1004 at about a right angle in the direction parallel to the optical axis 1008a; 1013, a lens which enables a user o see the image reflected by the mirror 1012 at a proper size through the finder 1014; 1014, the finder which enables the user to see an displayed image on the LCD 1004; and 1015, the main body of the image sensing apparatus.

Furthermore, reference numeral 1016 denotes a rotation member for enabling the LCD 1004 to rotate from the position A as shown in FIG. 46 to the position B as shown in FIG. 47 of approximately 90 degrees; and 1017, a position detection switch which turns on when the LCD 1004 is in the position B, thereby detecting that the LCD 1004 is in the position B.

Figure 45:
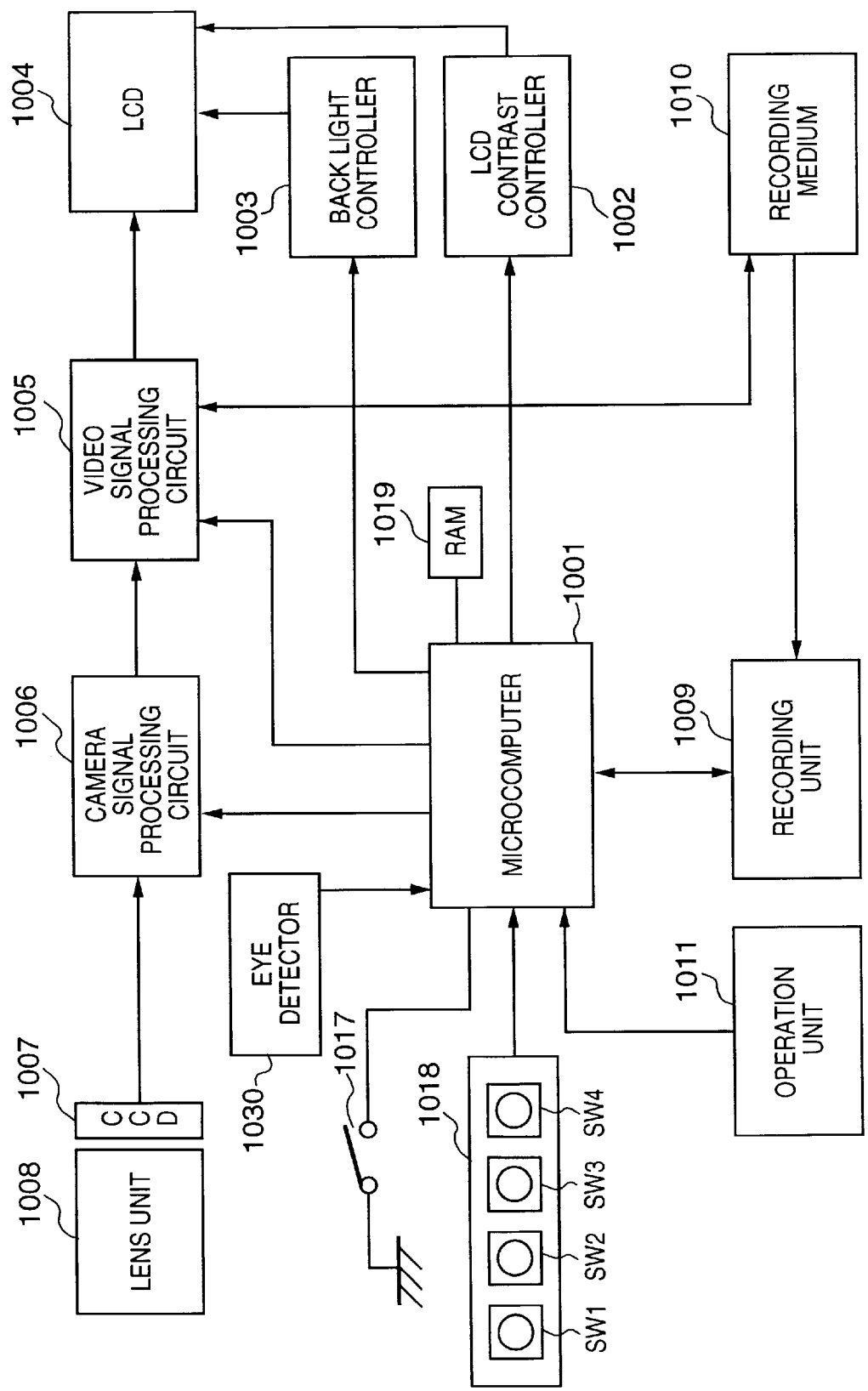
FIG. 45 is a block diagram illustrating a configuration of an image sensing apparatus according to a tenth embodiment of the present invention.

FIG. 45 is a block diagram illustrating a configuration of the image sensing apparatus according to the tenth embodiment.

Referring to FIG. 45, a microcomputer 1001 controls the overall operation of the image sensing apparatus. An LCD contrast controller 1002 controls contrast of the LCD 1004 in response to an instruction from the microcomputer 1001, and a back light controller 1003 controls the luminosity of back light, configured with, e.g., a fluorescence light (not shown) for illumination provided behind the LCD 1004, in response to an instruction from the microcomputer 1001. Further, the LCD 1004, the image sensing device 1007, and the lens unit 1007 are the same as those explained above.

A camera signal processing circuit 1006 is for converting signals obtained by the image sensing device 1007 into standardized image signals conforming to, e.g., NTSC. A video signal processing circuit 1005 is for converting the standardized image signals into data suitable to recording on a recording medium 1010 or displaying on the LCD 1004. The video signal processing circuit 1005 changes the order of image signals so as to display a mirror image of a sensed image on the LCD 1004 when the position detection switch 1017 detects that the LCD 1004 is in the position B.

Further, an eye detector 1030 detects that an eye of a user is in contact with or at the close position of the finder 1014. Details of the eye detector 1030 will be described in the twelfth embodiment.

The recording medium 1010 may be a detachable magnetic tape or semiconductor memory, and a recording unit 1009 writes and reads data to/from the recording medium 1010 in response to an instruction from the microcomputer 1001. Further, an operation unit 1011 is for transmitting instructions, such as start and stop instructions of recording, to the microcomputer 1001.

The position detection switch 1017 is the same as that shown in FIGS. 46 and 47.

Further, reference numeral 1018 denotes a back light/ contrast setting unit. In the setting unit 1018, SW1 is for instructing to increase the luminosity of back light; SW2 is for instructing to decrease the luminosity of back light; SW3 is for instructing to increase contrast of a displayed image on the LCD 1004; and SW4 is for instructing to decrease contrast of a displayed image on the LCD 1004.

In the image sensing apparatus having a configuration as described above, the luminosity of back light and contrast of an displayed image are controlled differently in a case where the position detection switch 1017 is on (i.e., LCD 1004 is in the position B) from a case where the position detection switch 1017 is turned off (i.e., LCD 1004 is in the position A or not in the position B).

Figure 49:
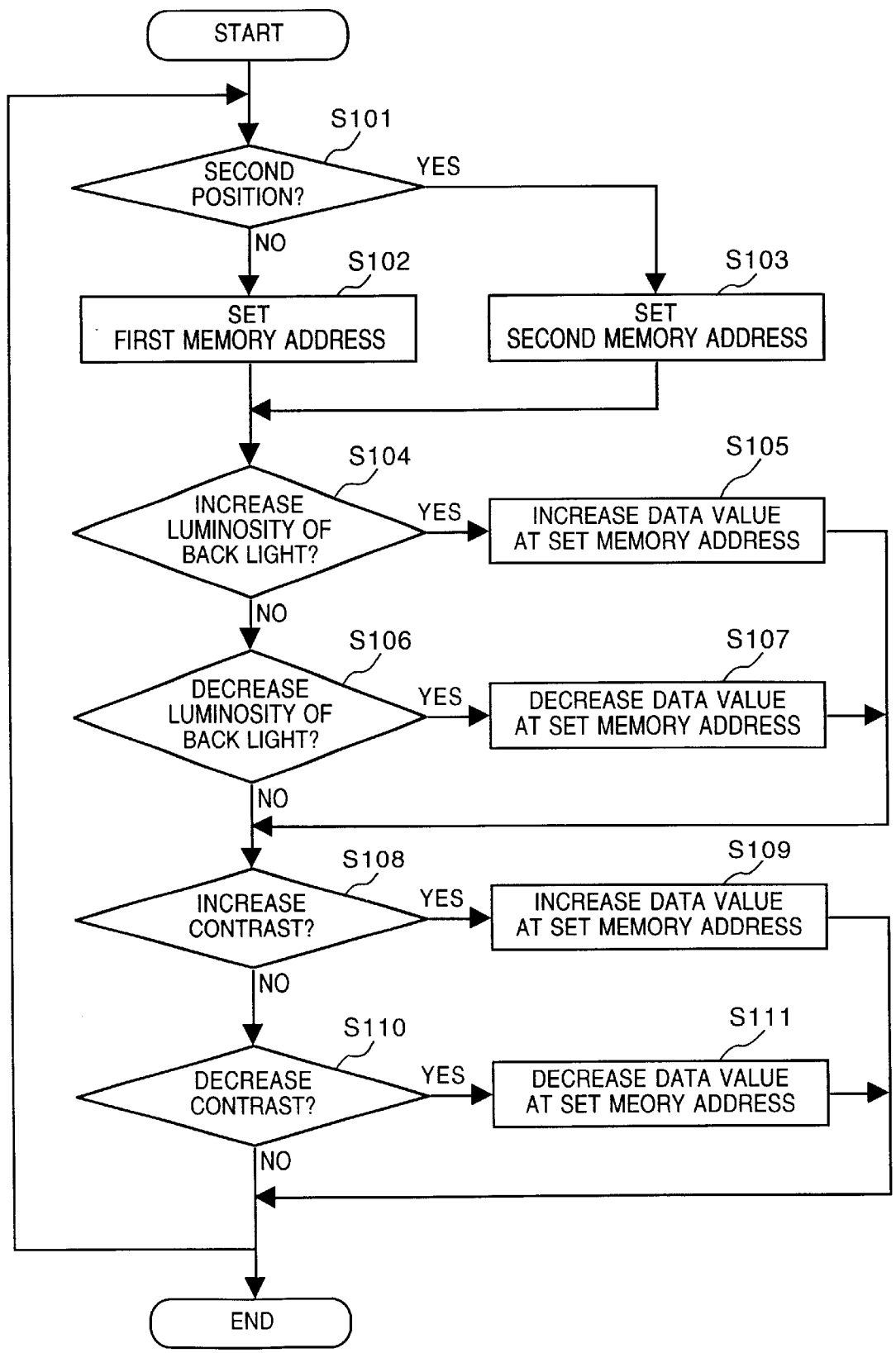
FIG. 49 is a flowchart showing an operation for setting back light luminosity and contrast of a liquid crystal display according to the tenth embodiment of the present invention.

FIG. 49 is a flowchart showing an operation of the microcomputer 1001 when setting the luminosity of back light and contrast of the LCD 1004.

Referring to FIG. 49, when the position detection switch 1017 detects that the LCD 1004 is in the position B in step S101, then the process proceeds to step S103 where a second memory address is set and preparation for writing of setting information of the luminosity of back light and contrast of the LCD 1004 at the second memory address is performed.

Whereas, when the position detection switch 1017 detects that the LCD 1004 is no in the position B in step S101, then the process proceeds to step S102 where a first memory address is set and preparation for writing of setting information of the luminosity of back light and contrast of the LCD 1004 at the first memory address is performed.

Next, in step S104, when it is determined that an increase in the luminosity of back light is instructed by the switch SW1, the process proceeds to step S105 and information on the increased luminosity of back light is written at the memory address set either in step S102 or S103. Then, the back light controller 1003 controls the LCD 1004 to increase the luminosity of back light corresponding to the amount instructed by the switch SW1.

When it is determined in step S106 that a decrease in the luminosity of the back light is instructed by the switch SW2, the process proceeds to step S107 and information on the decreased luminosity of back light is written at the memory address set either in step S102 or S103. Then, the back light controller 1003 controls the LCD 1004 to decrease the luminosity of back light corresponding to the amount instructed by the switch SW2.

When it is determined in step S108 that an increase in contrast of a displayed image is instructed by the switch SW3, the process proceeds to step S109 and information on the increased contrast is written at the memory address set either in step S102 or S103. Then, the LCD contrast controller 1002 controls the LCD 1004 to increase the contrast of a displayed image corresponding to the amount instructed by the switch SW3.

When it is determined in step S110 that a decrease in contrast of a displayed image is instructed by the switch SW4, the process proceeds to step Sill and information on the decreased contrast is written at the memory address set either in step S102 or S103. Then, the LCD contrast controller 1002 controls the LCD 1004 to decrease the contrast of a displayed image corresponding to the amount instructed by the switch SW4.

For example, when the LCD 1004 is in the position B and the luminosity of back light and/or contrast of an image is controlled by the setting unit 1018, the setting information is stored in RAM 1019. Once the setting information is stored, if the LCD 1004 is rotated to the position A where the luminosity of back light and/or contrast is changed and the LCD 1004 is rotated back to the position B, the setting information stored in the RAM 1019 is read out, and the microcomputer 1001 controls the back light controller 1003 and/or the LCD contrast controller 1002 to respectively control the luminosity of back light and/or contrast of a displayed image on the basis of the read information. In order to change the setting, the luminosity of back light and/or contrast of an image is controlled from the setting unit 1018, and the setting information in RAM 1019 is updated. Further, when the position detection switch 1017 is turned off, the setting of the luminosity of back light and/or contrast of an image is controlled in the similar manner.

As described above, an image displayed on the LCD 1004 can be seen through the finder 1014, therefore, energy consumption of the image sensing apparatus of the present invention is lower than that of a conventional image sensing apparatus having both an electric view finder and a liquid crystal display.

In addition, the luminosity of back light and/or contrast of an image displayed on the LCD 1004 is differently set in the position A where the displayed image on the LCD 1004 is directly seen, from in the position B where the displayed image is seen through the finder 1014. Therefore, the image is displayed in proper brightness and contrast depending upon whether the LCD 1004 is in the position A or the LCD 1004 is in the position B. More specifically, the luminosity of back light is increased when the LCD 1004 is in the position A, whereas, when in the position B, the luminosity of back light is decreased, for example.

Eleventh Embodiment

In the eleventh embodiment, a reflection type liquid crystal display is used as the LCD 1004.

A reflection type liquid crystal display has a defect that a displayed image looks very dark in a dark circumstance because it uses a polarizing plate. The eleventh embodiment is addressed to provide a good image when the image is seen through a finder.

Figure 50:
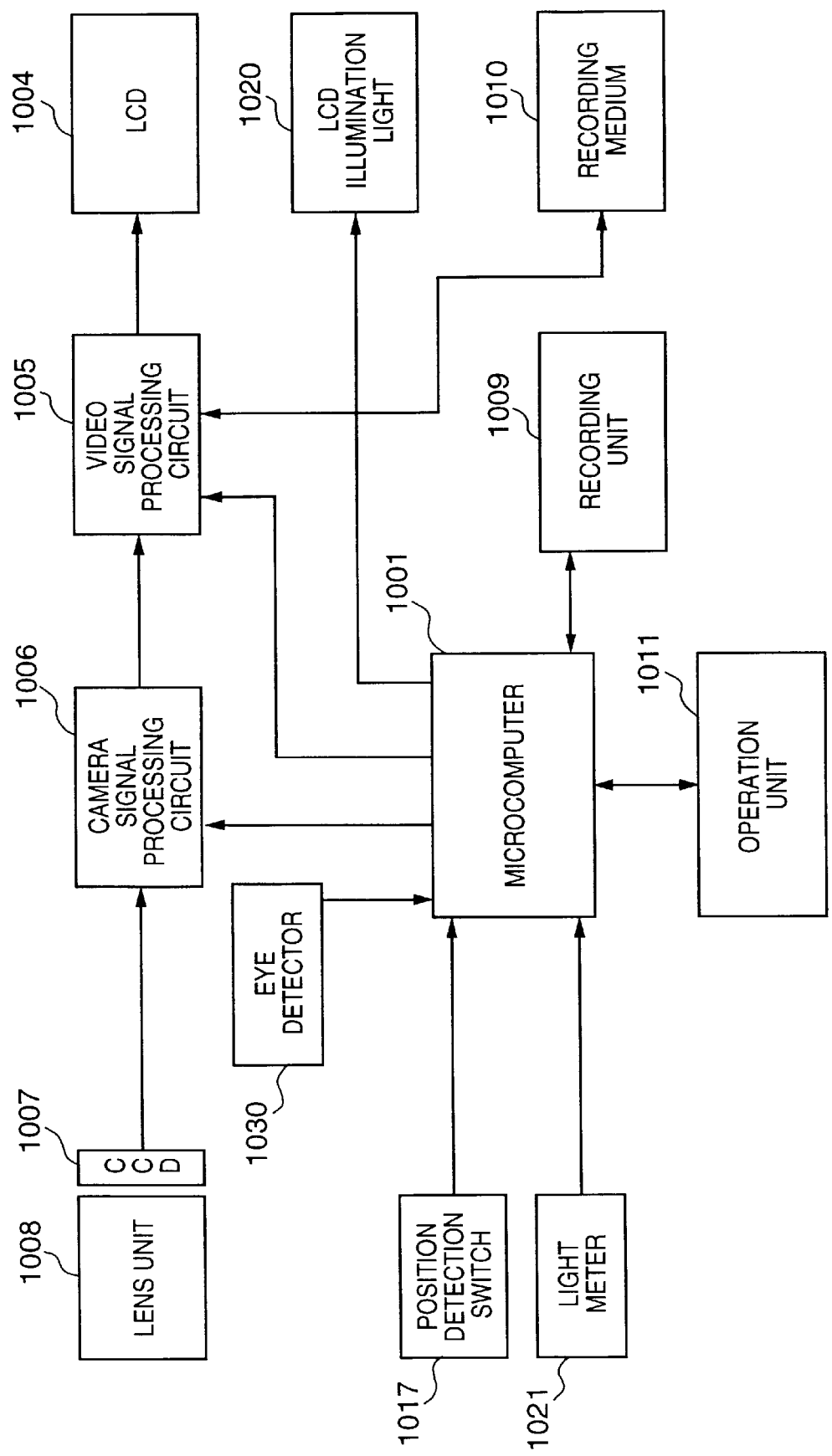
FIG. 50 is a block diagram illustrating a configuration of an image sensing apparatus according to an eleventh embodiment of the present invention.

FIG. 50 is a block diagram illustrating a configuration of an image sensing apparatus according to the eleventh embodiment of the present invention. In FIG. 50, the LCD 1004 is of a reflection type. In FIG. 50, elements and units as those described in the tenth embodiment with reference to FIG. 45 are referred to by the same reference numerals, and explanation of them is omitted. An LCD illumination light 1020 illuminates the LCD 1004 in response to an instruction from the microcomputer 1001. A light meter 1021 measures brightness.

Figure 51:
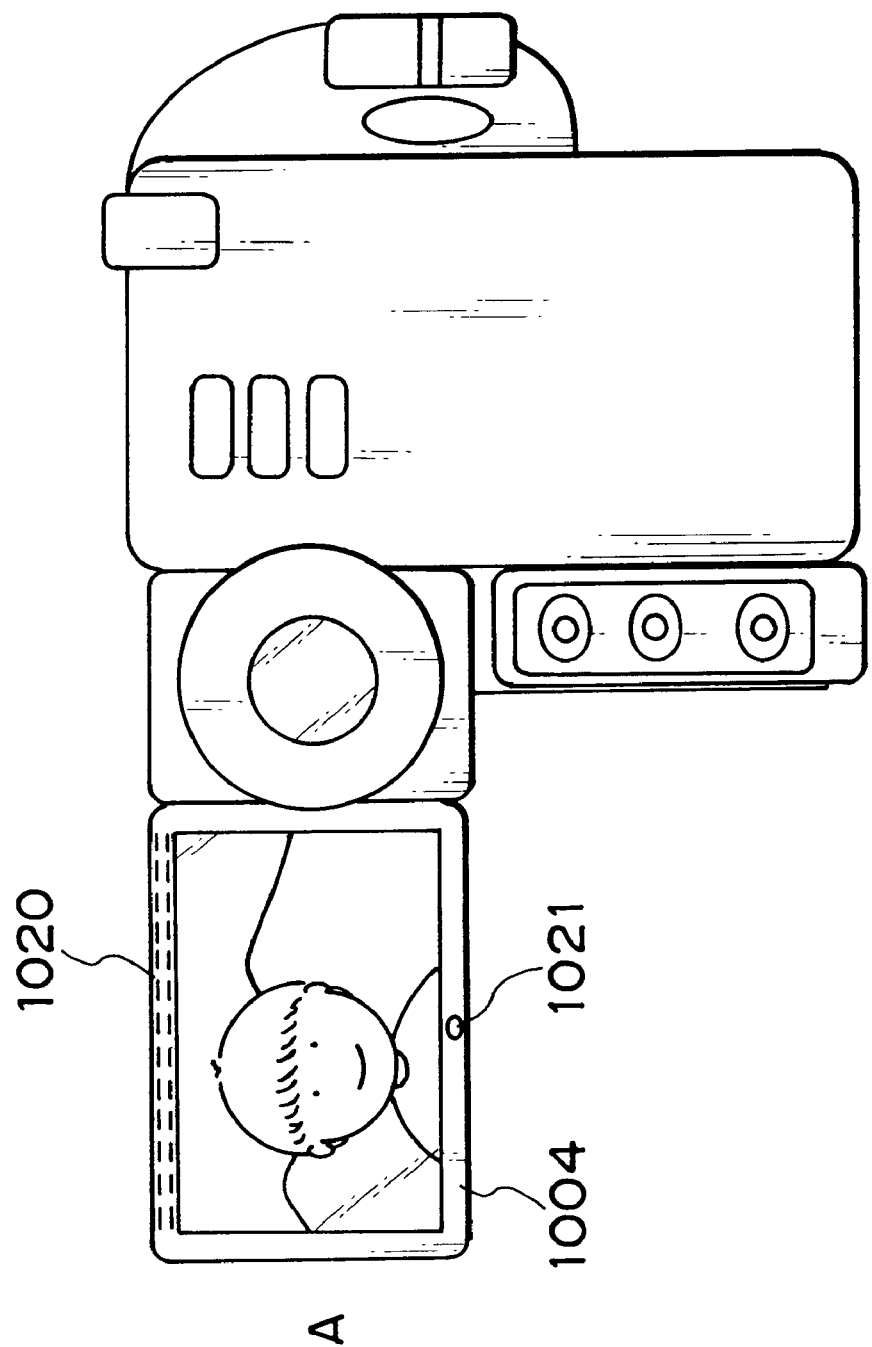
FIG. 51 is a back view of the image sensing apparatus according to the eleventh embodiment of the present invention.

FIG. 51 is a back view of the image sensing apparatus when the LCD 1004 is in the position A where a displayed image is seen directly. In FIG. 51, reference numeral 1020 denotes the LCD illumination light and 1021 denotes the light meter.

Figure 52:
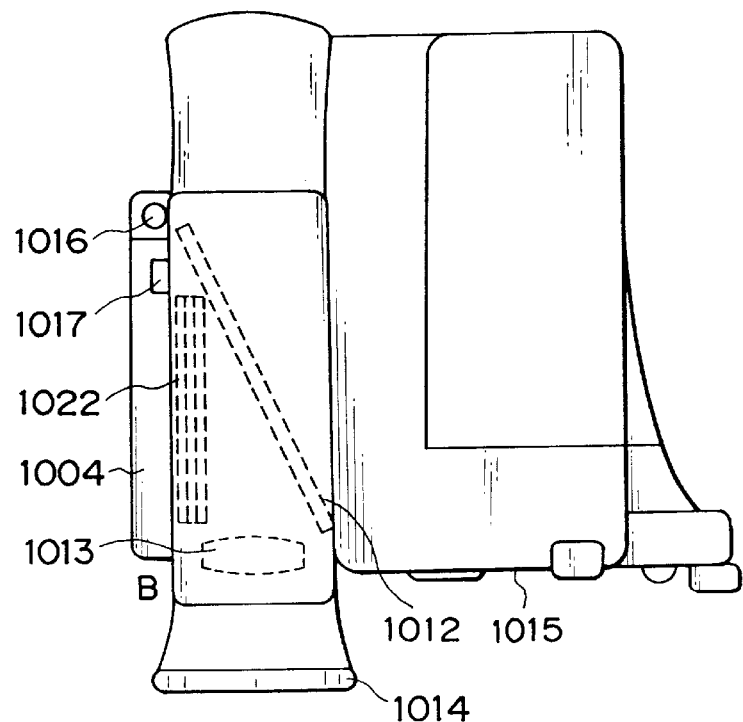
FIG. 52 is a top view of the image sensing apparatus according to the eleventh embodiment of the present invention.
Figure 53:
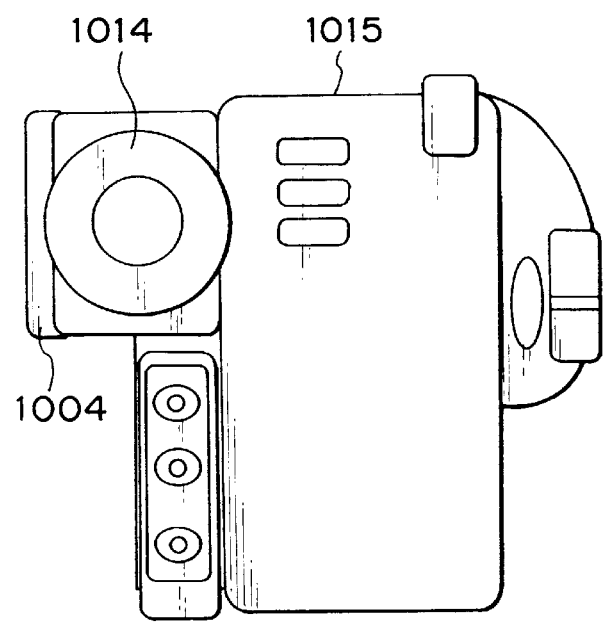
FIG. 53 is a back view of the image sensing apparatus according to the eleventh embodiment of the present invention.

FIG. 52 is a top view and FIG. 53 is a back view of the image sensing apparatus when the LCD 1004 is folded up by the side of a main body 1015 of the image sensing apparatus (position B) and an image displayed on the LCD 1004 can be seen through the finder 1014.

In FIG. 52, reference numeral 1022 denotes a window for letting light enter the main body 1015 of the image sensing apparatus and enabling a user to see an image displayed on the LCD 1004 through the finder 1014 when the LCD 1004 is in the position B. Other elements and units are the same as those described in the tenth embodiment, therefore, explanation of them is omitted.

Figure 54:
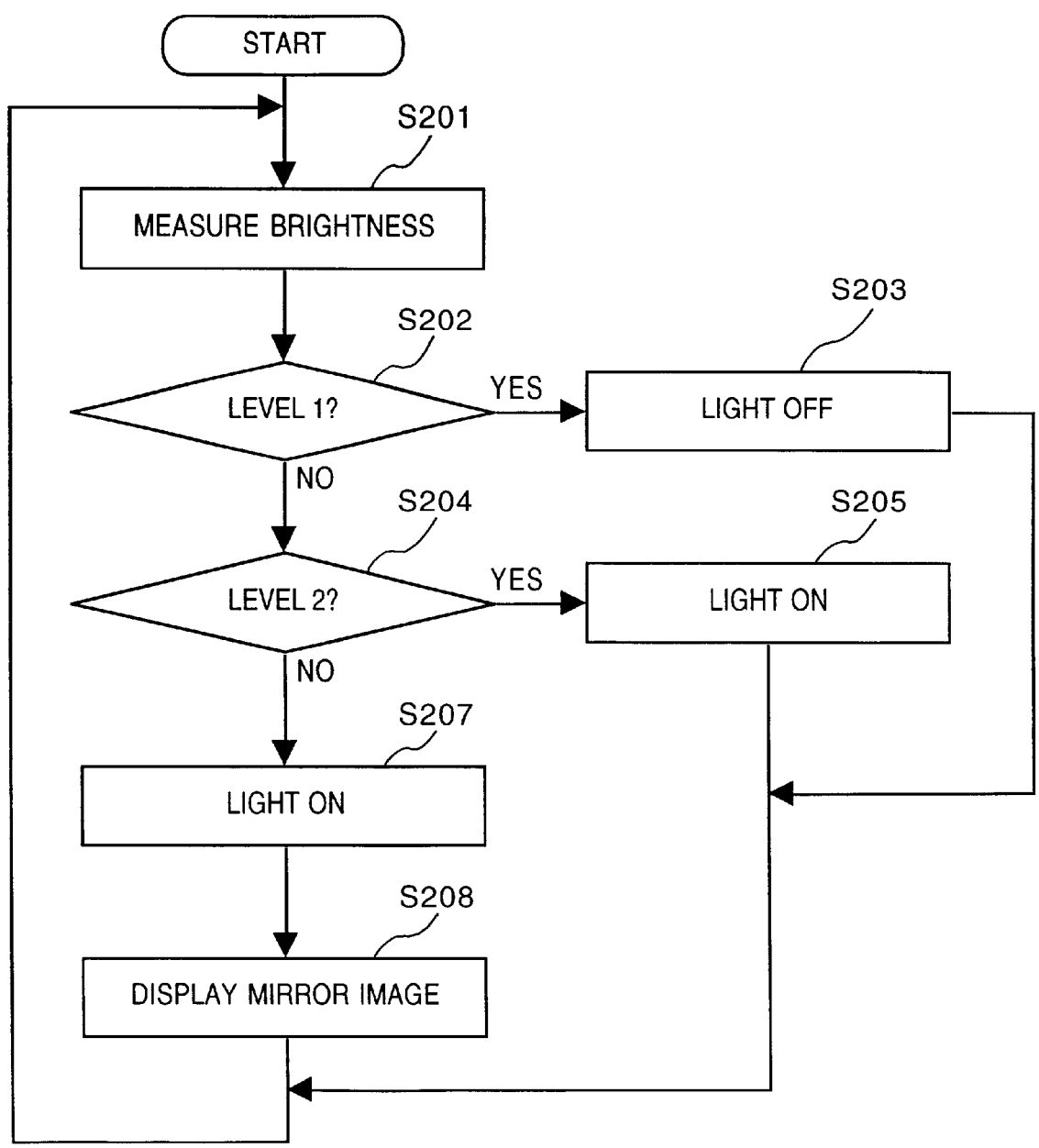
FIG. 54 is a flowchart showing an operation according to the eleventh embodiment of the present invention.
Figure 55:
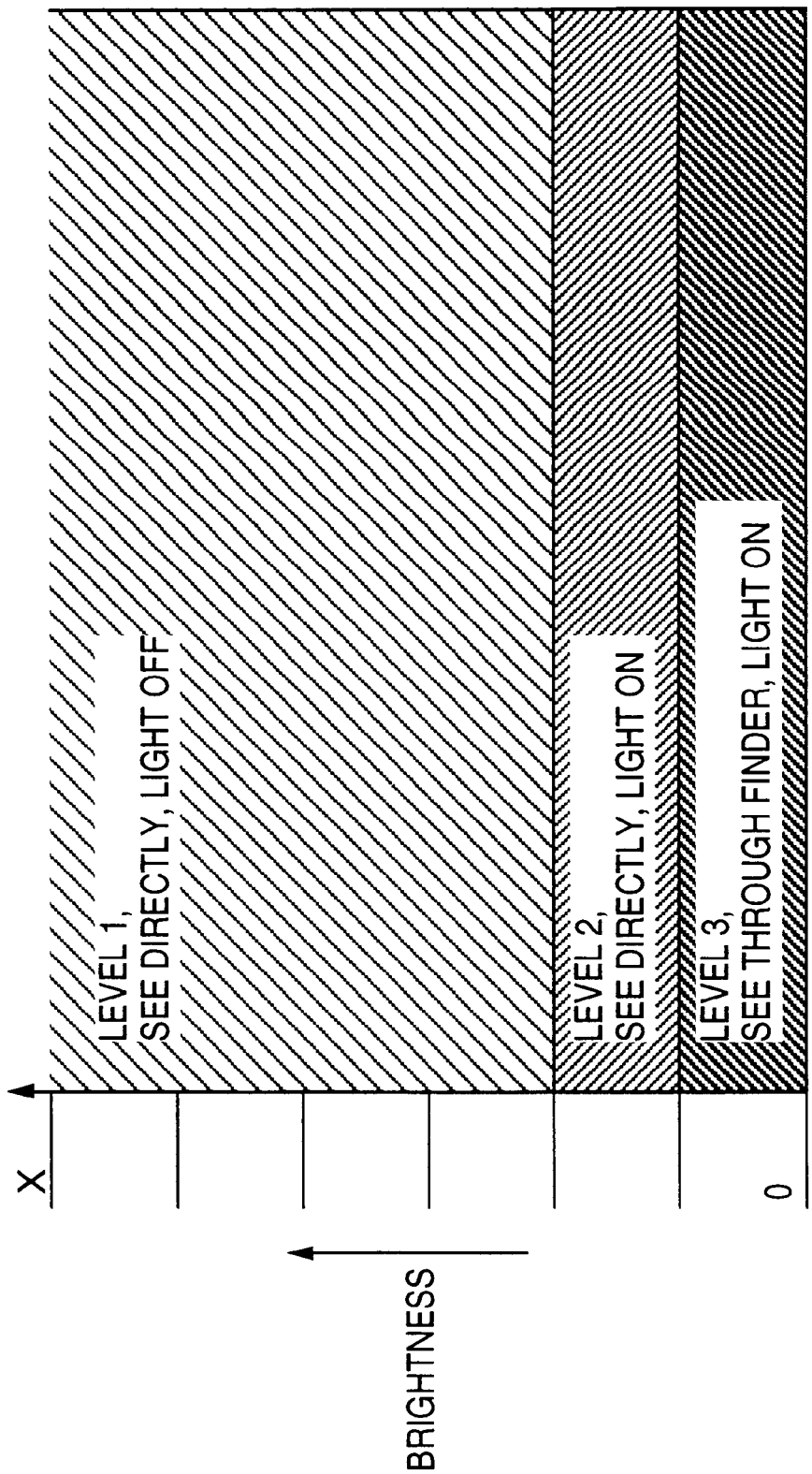
FIG. 55 shows relationship between brightness levels and operations according to the eleventh embodiment of the present invention.

FIG. 55 shows relationship between a luminosity level obtained by an A/D port in the microcomputer 1001 on the basis of an output voltage of the light meter 1021, a state of the LCD 1004, and control to be performed on the LCD illumination light 1020. Further, FIG. 54 is a flowchart showing an operation of the microcomputer 1001. An operation of the eleventh embodiment will be described below with reference to FIGS. 54 and 55.

In step S201, brightness is determined on the basis of an output from the light meter 1021. If it is determined in step S202 that the brightness is in level 1, shown in FIG. 55, then the process proceeds to step S203 and it is determined that the LCD 1004 is not in the position B, and the light 1020 is kept or turned off.

Whereas, if it is determined in step S201 that the brightness is not in level 1, then the process proceeds to step S204 where whether or not the brightness is in level 2 is determined. The level 2 indicates the brightness that it is not bright enough to clearly see an image displayed on the LCD 1004, however, it is not too dark to see the image. In this case, the process proceeds to step S205 where it is determined that the LCD 1004 is not in the position B, however, the circumstance is somewhat dark, as in the twilight, therefore, the light 1020 is turned on.

If it is determined in step S204 that the brightness is not in level 2, then the process proceeds to step S207. In step S207, it is determined that the brightness is in level 3 and that the LCD 1004 is in the position B, and the light 1029 is turned on. Further, in step S208, the order of image signals are changed by the video signal processing circuit 1005 so as to display a mirror image of a sensed image.

As described above, since an image displayed on the LCD 1004 can be seen through the finder 1014, energy consumption of the image sensing apparatus of the present invention is lower than that of a conventional image sensing apparatus having both an electric view finder and a liquid crystal display.

Further, when a reflection type liquid crystal display is used, a light for illuminating the display is lit when seeing an image displayed on the display through the finder or in the dark circumstance, therefore, an image on the display is always seen in a good condition.

In the eleventh embodiment, the light 1020 is controlled on the basis of brightness measured by the light meter 1021, however, it is possible to control the light 1020 on the basis of a detection result of the position detection switch 1017. In such cases, when the position detection switch 1017 detects that the LCD 1004 is in the position B, the light 1020 is controlled to be on and a mirror image of a sensed image is displayed on the LCD 1004. Further, when the position detection switch 1017 detects that the LCD 1004 is not in the position B, the light 1020 is controlled to be off.

Further it is also possible to use both the detection result by the light meter 1021 and the detection result by the position detection switch 1017. In such cases, whether the light 1020 is to be turned on or off is determined on the basis of the brightness detected by the light meter 1021, and whether to display a mirror image or a sensed image on the LCD 1004 is determined on the basis of the detection result by the position detection switch 1017. More specifically, if brightness detected by the light meter 1021 is higher than a predetermined level, then the light 1020 is turned off, whereas if equal or lower than the predetermined level, then the light 1020 is turned on. Further, when the light 1020 is on and the position detection switch 1017 detects that the LCD 1004 is in the position B, then the video signal processing circuit 1005 changes the order of image signals to display a mirror image of it on the LCD 1004.

Twelfth Embodiment

In the twelfth embodiment, in the image sensing apparatus as explained in the tenth or eleventh embodiment, when the position detection switch 1017 determines that the LCD 1004 is in the position B (an image is seen through the finder 1014) and the eye detector 1030 detects that the eye of the user is not contact with the finder 1014, operation of the LCD 1004 is stopped for saving energy.

The eye detector 1030 is provided near the finder 1014. An infrared light emit diode of the eye detector 1030 emits infrared light, and the eye detector 1030 receives reflected light and converts it into electric signals using a photoelectric conversion device, if there is anything near the finder 1014, and determines whether or not the reflecting matter is an eye.

Figure 56:
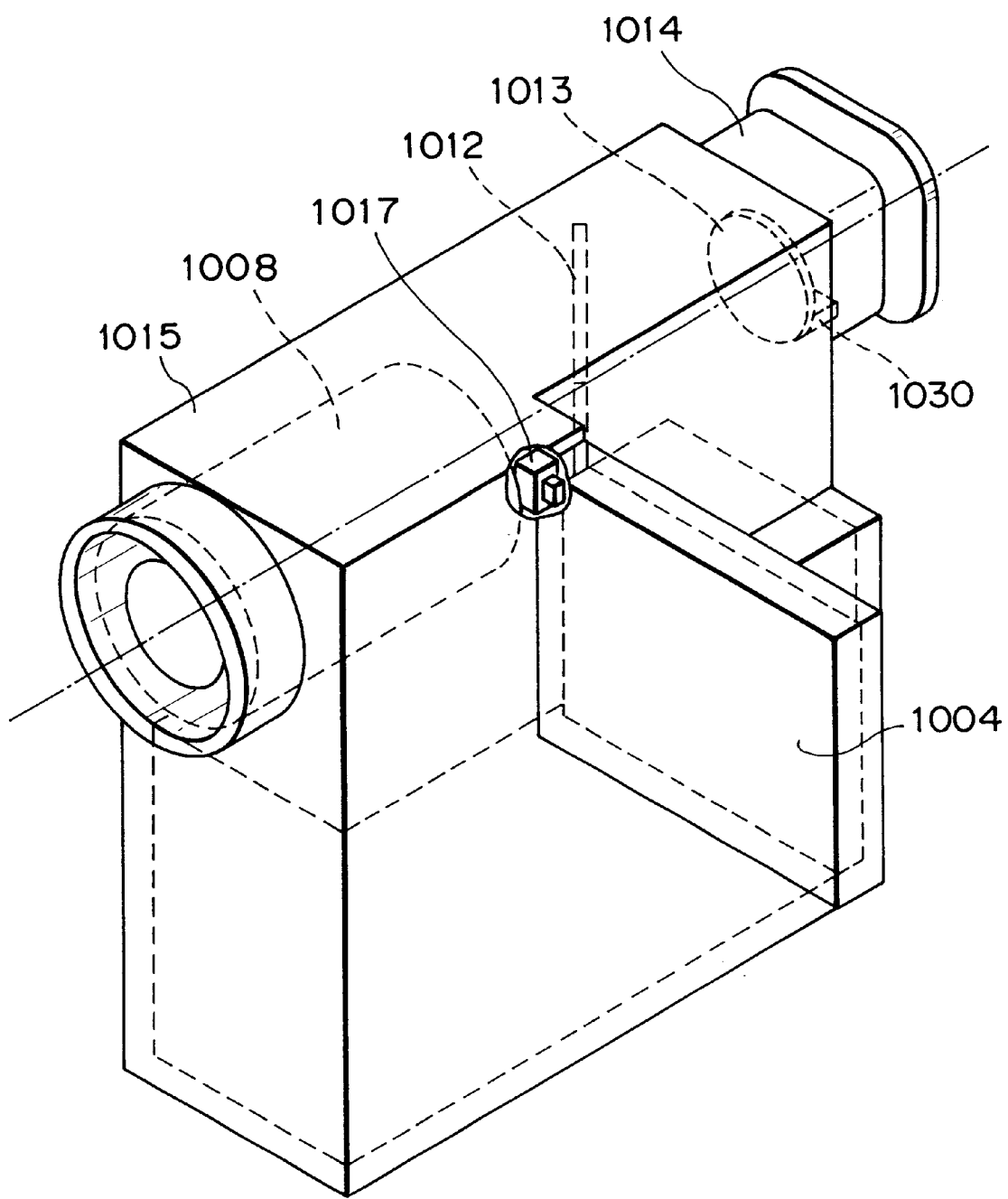
FIG. 56 is a perspective view of an image sensing apparatus according to a twelfth embodiment of the present invention.
Figure 57:
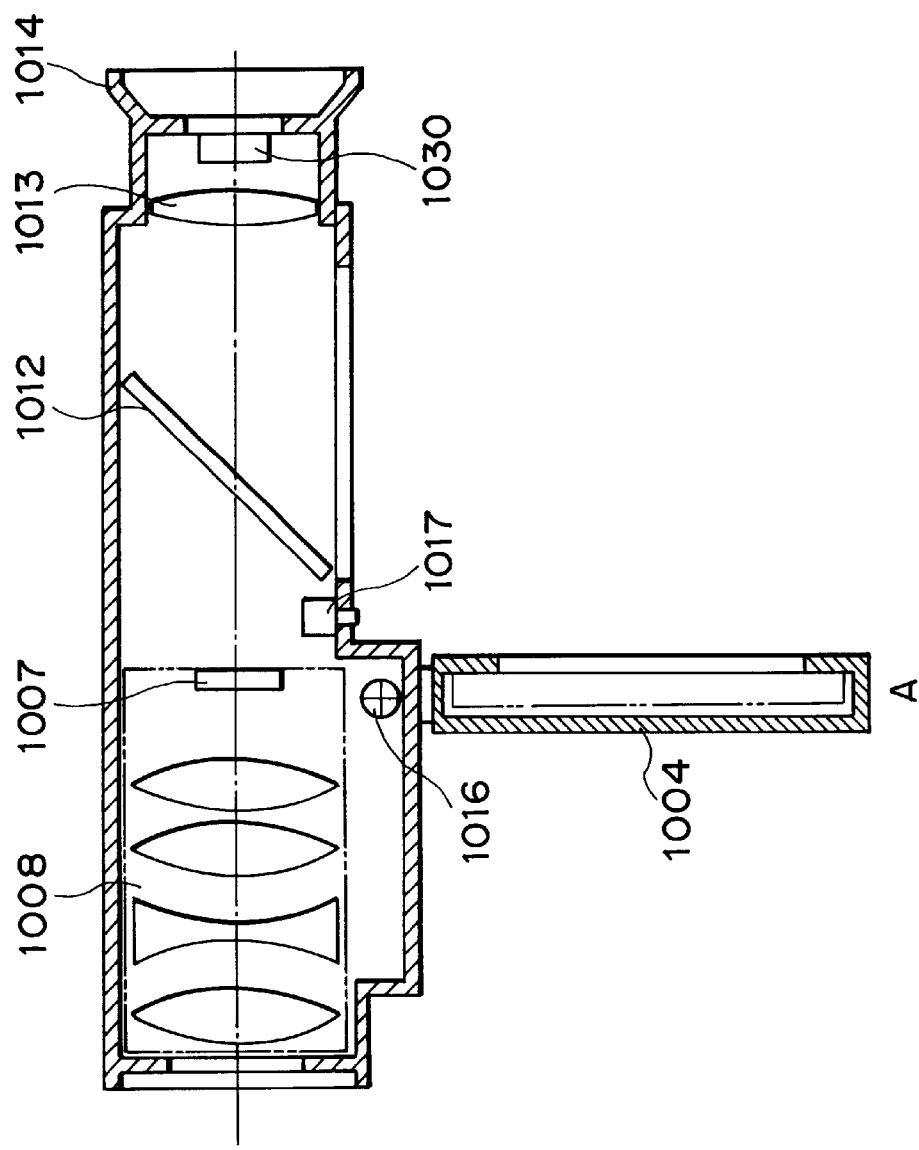
FIG. 57 is a perspective view of the image sensing apparatus seen from the top according to the twelfth embodiment of the present invention.
Figure 58:
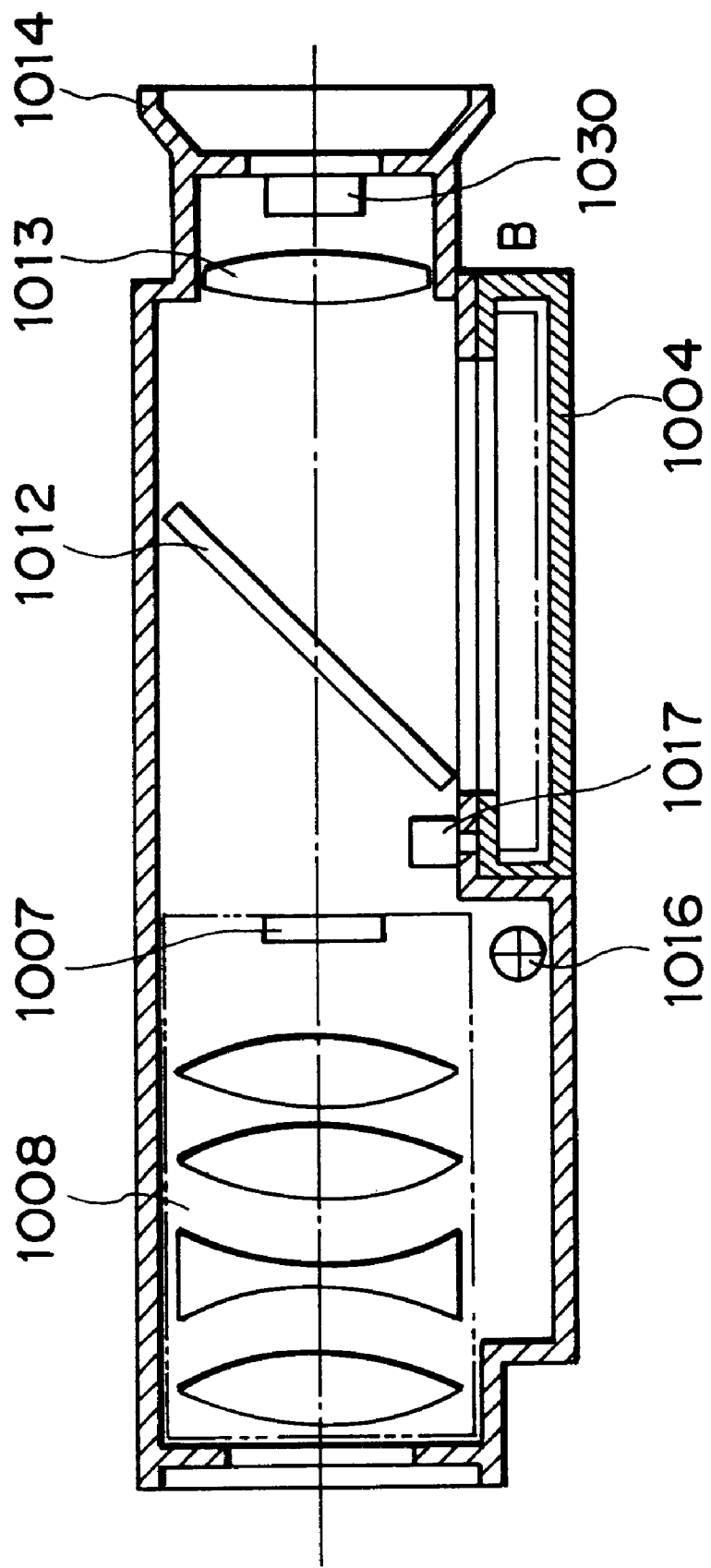
FIG. 58 is a perspective view of the image sensing apparatus seen from the top according to the twelfth embodiment of the present invention.

FIG. 56 is a perspective view of an image sensing apparatus according to the twelfth embodiment. FIG. 57 is a perspective view of the image sensing apparatus seen from the top when the LCD 1004 is in the position A where an image displayed on the LCD 1004 can be directly seen. FIG. 58 is a perspective view of the image sensing apparatus seen from the top when the LCD 1004 is in the position B where an image displayed on the LCD 1004 is seen through the finder 1014. In these figures, elements and units except the eye detector 1030 are the same as those explained in the tenth and eleventh embodiments, therefore, the explanation of them are omitted. Note, the configuration of the image sensing apparatus according to the twelfth embodiment is the same as that described in either FIG. 45 or 50.

Figure 59:
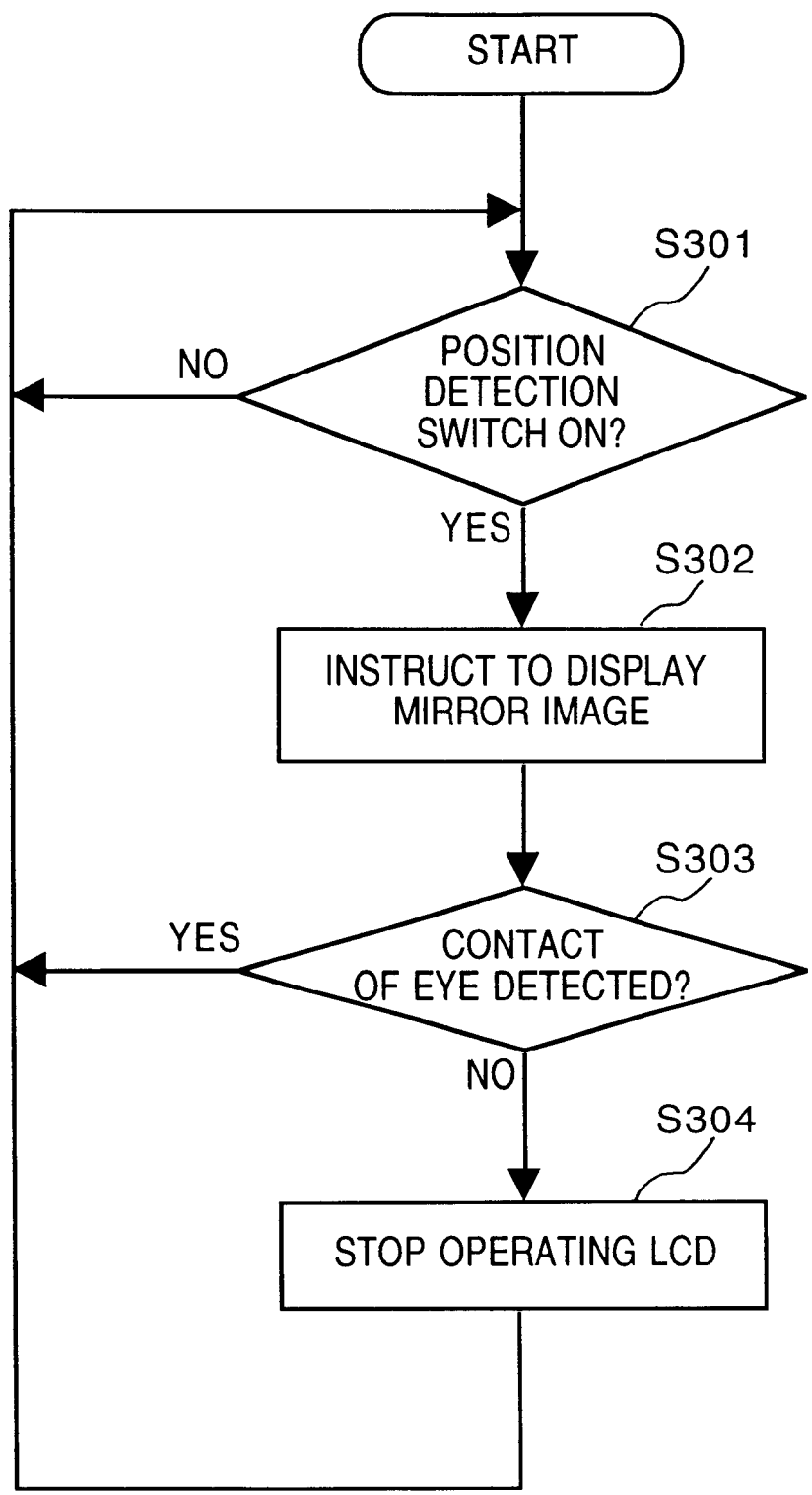
FIG. 59 is a flowchart showing an operation according to the twelfth embodiment of the present invention.

FIG. 59 is a flowchart showing an operation of the microcomputer 1001 according to the twelfth embodiment. First in step S301, if the position detection switch 1017 is on, which indicates that the LCD 1004 is in the position B as shown in FIG. 58, then the process proceeds to step S302 where the microcomputer 1001 instructs the video signal processing circuit 1005 to change the order of image signals to display a mirror image of a sensed image on the LCD 1004.

In step S303, the LCD 1004 is in the position B and if contact of eye with the finder 1014 is not detected (i.e., a user is not looking into the finder 1014), then operation of the LCD 1004 is stopped. If the image sensing apparatus has a configuration as explained in the tenth embodiment, the back light of the LCD 1004 may be turned off. If the image sensing apparatus has a configuration as explained in the eleventh embodiment, then the LCD 1004 as well as the light 1020 may be turned off. Accordingly, energy consumption is further reduced.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:
a display device, mounted rotatable about an axis on a side of the image sensing apparatus, for displaying a sensed image;
a finder; and
a reflecting member which reflects an image displayed on said display device toward said finder when said display device is in a first state,
wherein the first state is that said display device is folded up by the side of the image sensing apparatus.

2. The image sensing apparatus according to claim 1, further comprising:
determination means for determining whether or not said display device is in the first state; and
image reversing means for causing the sensed image displayed as a mirror image on said display device when said determination means determines that said display device is in the first state.

3. The image sensing apparatus according to claim 1, wherein said reflecting member rotates in the same direction as a rotation of said display device, coupled with the rotation of said display device.

4. The image sensing apparatus according to claim 1, further comprising a shield,
wherein said shield blocks light from said finder when said display device is in a second state.

5. The image sensing apparatus according to claim 4, wherein, in the second state, said display device and the side of the image sensing apparatus makes an angle greater than a predetermined angle.

6. The image sensing apparatus according to claim 5, wherein the angle between said display in the second state and the side of the image sensing apparatus includes 90 degrees.

7. The image sensing apparatus according to claim 1, further comprising optical dispersion means provided between said display device and said reflecting member.

8. The image sensing apparatus according to claim 7, wherein said optical dispersion means is a dispersion glass.

9. The image sensing apparatus according to claim 1, wherein said finder is configured so as to be inserted into the image sensing apparatus.

10. The image sensing apparatus according to claim 9, further comprising a lock means for locking said display device in the first state,
wherein, when said finder is settled inside of the image sensing apparatus, said lock means releases said display device.

11. The image sensing apparatus according to claim 10, further comprising a shield for blocking light when said finder is settled inside of the image sensing apparatus.

12. The image sensing apparatus according to claim 11, wherein said shield is configured with a plurality of slide plates.

13. The image sensing apparatus according to claim 11, wherein said shield is moved outside of a path of the finder when said finder is inserted into the image sensing apparatus.

14. The image sensing apparatus according to claim 1, further comprising:
determination means for determining whether or not said display device is in the first state; and
control means for controlling display conditions of said display device depending upon a determination result by said determination means.

15. The image sensing apparatus according to claim 14, further comprising storage means for storing the display conditions, controlled by said control means, of said display device separately when said display device is in the first state and when in a second state.

16. The image sensing apparatus according to claim 14, wherein said display device is a liquid crystal display and the display conditions are luminosity of back light and contrast information.

17. The image sensing apparatus according to claim 15, wherein, in the second state, said display device and the side of the image sensing apparatus makes an angle greater than a predetermined angle.

18. The image sensing apparatus according to claim 1, further comprising:
determination means for determining whether or not said display device is in the first state; and
illumination means for illuminating said display device when said determination means determines that said display device is in the first state.

19. The image sensing apparatus according to claim 18, further comprising:
eye-position determination means for determining whether or not an eye is contact with or near said finder; and
illumination control means for turning off said illumination means when said eye-position determination means determines that no eye is contact with or near said finder.

20. The image sensing apparatus according to claim 1, further comprising:
luminosity measurement device for measuring luminosity in the vicinity of said display device; and
illumination means for illuminating said display device when the luminosity measured by said luminosity measurement device is lower than a predetermined level.

21. The image sensing apparatus according to claim 20, further comprising:
eye-position determination means for determining whether or not an eye is contact with or near said finder; and
illumination control means for turning off said illumination means when said eye-position determination means determines that no eye is contact with or near said finder.

22. The image sensing apparatus according to claim 1, wherein the image sensing apparatus has an opening for letting light entering the image sensing apparatus when said display device is in the first state.

* * * * *

UNITED STATES PATENT AND TRADEMARK OFFICE
CERTIFICATE OF CORRECTION

PATENT NO.     : 6,549,237 B1
DATED          : April 15, 2003
INVENTOR(S)    : Mutsumi Inuma et al.

It is certified that error appears in the above-identified patent and that said Letters Patent is hereby corrected as shown below:

Column 6,
Line 41, "it an be" should read -- it can be --

Column 8,
Line 55, "position D." should read -- position B. --

Column 10,
Line 14, "the LCD the" should read -- the LCD 3, the --

Column 15,
Line 20, "the LCD is changed" should read -- the LCD 104 is changed --
Line 66, "A'and B';" should read -- A' and B'; --

Column 18,
Line 3, "Sill" should read -- S111 --

Column 19,
Line 32, "to.see" should read -- to see --

Signed and Sealed this

Twenty-eighth Day of October, 2003

JAMES E. ROGAN
*Director of the United States Patent and Trademark Office*